(12) United States Patent
Schaetzer et al.

(10) Patent No.: US 12,528,788 B2
(45) Date of Patent: Jan. 20, 2026

(54) PESTICIDALLY ACTIVE BENZENE- AND AZINE-AMIDE COMPOUNDS

(71) Applicant: SYNGENTA CROP PROTECTION AG, Basel (CH)

(72) Inventors: Jürgen Harry Schaetzer, Stein (CH); Andrew Edmunds, Stein (CH); Daniel Emery, Stein (CH); Julien Daniel Henri Gagnepain, Stein (CH); Amandine Kolleth Krieger, Stein (CH); Thomas Pitterna, Stein (CH); Sebastian Rendler, Stein (CH)

(73) Assignee: SYNGENTA CROP PROTECTION AG, Basel (CH)

( * ) Notice: Subject to any disclaimer, the term of this patent is extended or adjusted under 35 U.S.C. 154(b) by 1265 days.

(21) Appl. No.: 17/281,725

(22) PCT Filed: Sep. 30, 2019

(86) PCT No.: PCT/EP2019/076402
§ 371 (c)(1),
(2) Date: Mar. 31, 2021

(87) PCT Pub. No.: WO2020/070049
PCT Pub. Date: Apr. 9, 2020

(65) Prior Publication Data
US 2021/0395228 A1    Dec. 23, 2021

(30) Foreign Application Priority Data

Oct. 2, 2018   (EP) .................................... 18198097
Feb. 4, 2019   (EP) .................................... 19155263

(51) Int. Cl.
| | | |
|---|---|---|
| *C07D 403/04* | (2006.01) | |
| *A01N 43/40* | (2006.01) | |
| *A01N 43/54* | (2006.01) | |
| *A01N 43/58* | (2006.01) | |
| *A01N 43/60* | (2006.01) | |
| *C07D 213/56* | (2006.01) | |
| *C07D 401/04* | (2006.01) | |

(52) U.S. Cl.
CPC .......... *C07D 403/04* (2013.01); *A01N 43/40* (2013.01); *A01N 43/54* (2013.01); *A01N 43/58* (2013.01); *A01N 43/60* (2013.01); *C07D 213/56* (2013.01); *C07D 401/04* (2013.01)

(58) Field of Classification Search
None
See application file for complete search history.

(56) References Cited

U.S. PATENT DOCUMENTS

| 8,268,754 B2 | 9/2012 | Mita et al. |
| 2005/0020643 A1 | 1/2005 | Foor et al. |
| 2017/0101569 A1 | 4/2017 | Yana et al. |

FOREIGN PATENT DOCUMENTS

| JP | 2005521697 A | 7/2005 |
| JP | 2018517716 A | 7/2018 |
| JP | 2018535296 A | 11/2018 |
| WO | 2003080576 | 10/2003 |
| WO | 2004047744 A2 | 6/2004 |
| WO | 2009072621 A1 | 6/2009 |
| WO | 2012117000 A1 | 9/2012 |
| WO | 2017174158 A1 | 10/2017 |
| WO | 2017192385 A1 | 11/2017 |

OTHER PUBLICATIONS

Written Opinion of the International Searching Authority and International Search Report for PCT/EP2019/076402, mailed on Dec. 2, 2019.
Extended European Search Report for EP18198097.0, mailed on Jan. 3, 2019.

*Primary Examiner* — David J Blanchard
*Assistant Examiner* — Sarah J Chickos
(74) *Attorney, Agent, or Firm* — BakerHostetler; Toni-Junell Herbert

(57) ABSTRACT

Compounds of formula (I) wherein the substituents are as defined in claim 1, and the agrochemically acceptable salts, stereoisomers, enantiomers, tautomers and N-oxides of those compounds, can be used as insecticides.

15 Claims, No Drawings

PESTICIDALLY ACTIVE BENZENE- AND AZINE-AMIDE COMPOUNDS

CROSS-REFERENCE TO RELATED APPLICATIONS

This application is a 371 National Stage application of International Application No. PCT/EP2019/076402 filed Sep. 30, 2019 which claims priority to EP 18198097.0, filed Oct. 2, 2018, and EP 19155263.7, filed Feb. 4, 2019, the entire contents of these applications are hereby incorporated by reference.

The present invention relates to pesticidally active, in particular insecticidally active benzene- and azine-amide compounds, to processes for their preparation, to compositions comprising those compounds, and to their use for controlling animal pests, including arthropods and in particular insects or representatives of the order Acarina.

WO2017192385 describes certain heteroaryl-1,2,4-triazole and heteroaryl-tetrazole compounds for use for controlling ectoparasites in animals (such as a mammal and a non-mammal animal). There have now been found novel pesticidally active benzene- and azine-amide compounds.

The present invention accordingly relates, in a first aspect, to a compound of the formula I

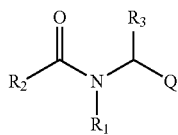

wherein:
Q is

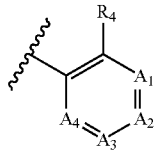

$A_1$, $A_2$, $A_3$ and $A_4$ are independently $CR_5$ or N, provided not more than three of $A_1$, $A_2$, $A_3$ and $A_4$ are N;

$R_1$ is hydrogen, $C_1$-$C_6$alkyl, $C_1$-$C_6$cyanoalkyl, aminocarbonyl$C_1$-$C_6$alkyl, hydroxycarbonyl$C_1$-$C_6$alkyl, $C_1$-$C_6$nitroalkyl, trimethylsilane$C_1$-$C_6$alkyl, $C_1$-$C_6$haloalkyl, $C_2$-$C_6$alkenyl, $C_2$-$C_6$haloalkenyl, $C_2$-$C_6$alkynyl, $C_2$-$C_6$haloalkynyl; $C_3$-$C_4$cycloalkyl$C_1$-$C_2$alkyl- wherein the $C_3$-$C_4$cycloalkyl is optionally substituted with 1 or 2 halo atoms; oxetan-3-yl-$CH_2$—; or benzyl optionally substituted with halo or $C_1$-$C_6$haloalkyl;

$R_2$ is phenyl, pyridine, pyrimidine, pyrazine or pyridazine, wherein the phenyl, pyridine, pyrimidine, pyrazine or pyridazine is optionally substituted with one to three substituents, provided the substituent(s) are not on either carbon adjacent to the carbon C=O is attached, and each substituent is independently selected from: $C_1$-$C_3$alkyl, $C_1$-$C_3$haloalkyl, $C_1$-$C_3$haloalkylthio, $C_1$-$C_3$alkoxy, $C_1$-$C_3$haloalkoxy, halogen, $NO_2$, $SF_5$, CN, $CONH_2$, COOH and $C(S)NH_2$;

$R_3$ is $C_1$-$C_3$alkyl or $C_1$-$C_3$haloalkyl;

$R_4$ is pyridine, pyrimidine, pyrazine or pyridazine, wherein the pyridine, pyrimidine, pyrazine or pyridazine is optionally substituted with one to three substituents, independently selected, from $C_1$-$C_3$alkyl, $C_1$-$C_3$haloalkyl, $C_1$-$C_3$alkoxy, $C_3$-$C_4$cycloalkyl, halogen or hydroxy;

$R_5$ is hydrogen, halogen, CN, $C_1$-$C_3$alkyl, $C_1$-$C_3$haloalkyl, $C_3$-$C_4$cycloalkyl, $C_1$-$C_3$alkoxy, $C_1$-$C_3$haloalkoxy, $C_1$-$C_3$alkoxycarbonyl, or di($C_1$-$C_3$alkoxy)methane; with the proviso that $R_4$ is not pyridin-3-yl, if $A_1$, $A_2$, $A_3$ and $A_4$ are all CH; or a stereoisomer, enantiomer, tautomer and N-oxide of the compound of formula I, or agrochemically acceptable salt thereof.

Compounds of formula I which have at least one basic centre can form, for example, acid addition salts, for example with strong inorganic acids such as mineral acids, for example perchloric acid, sulfuric acid, nitric acid, nitrous acid, a phosphorus acid or a hydrohalic acid, with strong organic carboxylic acids, such as $C_1$-$C_4$alkanecarboxylic acids which are unsubstituted or substituted, for example by halogen, for example acetic acid, such as saturated or unsaturated dicarboxylic acids, for example oxalic acid, malonic acid, succinic acid, maleic acid, fumaric acid or phthalic acid, such as hydroxycarboxylic acids, for example ascorbic acid, lactic acid, malic acid, tartaric acid or citric acid, or such as benzoic acid, or with organic sulfonic acids, such as $C_1$-$C_4$alkane- or arylsulfonic acids which are unsubstituted or substituted, for example by halogen, for example methane- or p-toluenesulfonic acid. Compounds of formula I which have at least one acidic group can form, for example, salts with bases, for example mineral salts such as alkali metal or alkaline earth metal salts, for example sodium, potassium or magnesium salts, or salts with ammonia or an organic amine, such as morpholine, piperidine, pyrrolidine, a mono-, di- or tri-lower-alkylamine, for example ethyl-, diethyl-, triethyl- or dimethylpropylamine, or a mono-, di- or trihydroxy-lower-alkylamine, for example mono-, di- or triethanolamine.

In each case, the compounds of formula I according to the invention are in free form, in oxidized form as a N-oxide or in salt form, e.g. an agronomically usable salt form.

N-oxides are oxidized forms of tertiary amines or oxidized forms of nitrogen containing heteroaromatic compounds. They are described for instance in the book "Heterocyclic N-oxides" by A. Albini and S. Pietra, CRC Press, Boca Raton 1991.

The compounds of formula I according to the invention also include hydrates which may be formed during the salt formation.

The term "$C_1$-$C_n$alkyl" as used herein refers to a saturated straight-chain or branched hydrocarbon radical attached via any of the carbon atoms having 1 to n carbon atoms, for example, any one of the radicals methyl, ethyl, n-propyl, 1-methylbutyl, 2-methylbutyl, 3-methylbutyl, 2,2-dimethylpropyl, 1-ethylpropyl, n-hexyl, n-pentyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethyl butyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, or 1-ethyl-2-methylpropyl.

The term "$C_1$-$C_n$haloalkyl" as used herein refers to a straight-chain or branched saturated alkyl radical attached via any of the carbon atoms having 1 to n carbon atoms (as mentioned above), where some or all of the hydrogen atoms in these radicals may be replaced by fluorine, chlorine, bromine and/or iodine, i.e., for example, any one of chloromethyl, dichloromethyl, trichloromethyl, fluoromethyl, difluoromethyl, trifluoromethyl, chlorofluoromethyl, dichlorofluoromethyl, chlorodifluoromethyl, 2-fluoroethyl, 2-chloroethyl, 2-bromoethyl, 2-iodoethyl, 2,2-difluoroethyl, 2,2,2-trifluoroethyl, 2-chloro-2-fluoroethyl, 2-chloro-2,2-difluoroethyl, 2,2-dichloro-2-fluoroethyl, 2,2,2-trichloroethyl, pentafluoroethyl, 2-fluoropropyl, 3-fluoropropyl, 2,2-difluoropropyl, 2,3-difluoropropyl, 2-chloropropyl, 3-chloropropyl, 2,3-dichloropropyl, 2-bromopropyl, 3-bromopropyl, 3,3,3-trifluoropropyl, 3,3,3-trichloropropyl, 2,2,3,3,3-pentafluoropropyl, heptafluoropropyl, 1-(fluoromethyl)-2-fluoroethyl, 1-(chloromethyl)-2-chloroethyl, 1-(bromomethyl)-2-bromoethyl, 4-fluorobutyl, 4-chlorobutyl, 4-bromobutyl or nonafluorobutyl. According a term "$C_1$-$C_2$fluoroalkyl" would refer to a $C_1$-$C_2$alkyl radical which carries 1, 2, 3, 4, or 5 fluorine atoms, for example, any one of difluoromethyl, trifluoromethyl, 1-fluoroethyl, 2-fluoroethyl, 2,2-difluoroethyl, 2,2,2-trifluoroethyl, 1,1,2,2-tetrafluoroethyl or pentafluoroethyl.

The term "$C_1$-$C_n$alkoxy" as used herein refers to a straight-chain or branched saturated alkyl radical having 1 to n carbon atoms (as mentioned above) which is attached via an oxygen atom, i.e., for example, anyone of the radicals methoxy, ethoxy, n-propoxy, 1-methylethoxy, n-butoxy, 1-methylpropoxy, 2-methylpropoxy or 1,1-dimethylethoxy. The term "halo$C_1$-$C_n$alkoxy" as used herein refers to a $C_1$-$C_n$alkoxy radical where one or more hydrogen atoms on the alkyl radical is replaced by the same or different halo atom(s)—examples include trifluoromethoxy, 2-fluoroethoxy, 3-fluoropropoxy, 3,3,3-trifluoropropoxy, 4-chlorobutoxy.

The term "$C_1$-$C_n$cyanoalkyl" as used herein refers to a straight chain or branched saturated $C_1$-$C_n$alkyl radical having 1 to n carbon atoms (as mentioned above), where one of the hydrogen atoms in these radicals is be replaced by a cyano group: for example, cyanomethyl, 2-cyanoethyl, 2-cyanopropyl, 3-cyanopropyl, 1-(cyanomethyl)-2-ethyl, 1-(methyl)-2-cyanoethyl, 4-cyanobutyl, and the like.

The term "$C_3$-$C_n$cycloalkyl" as used herein refers to 3-n membered cycloalkyl groups such as cyclopropane, cyclobutane, cyclopropane, cyclopentane and cyclohexane.

The term "$C_3$-$C_4$cycloalkyl-$C_1$-$C_2$alkyl-" as used herein refers to 3 or 4 membered cycloalkyl group with either a methylene or ethylene group, which methylene or ethylene group is connected to the rest of the molecule. In the instance, the $C_3$-$C_4$cycloalkyl-$C_1$-$C_2$alkyl- group is substituted, the substituent(s) can be on the cycloalkyl group or the alkyl chain.

The term "aminocarbonyl$C_1$-$C_n$alkyl" as used herein refers to an alkyl radical where one of the hydrogen atoms in the radical is replaced by $CONH_2$ group.

The term "hydroxycarbonyl$C_1$-$C_n$alkyl" as used herein refers to an alkyl radical where one of the hydrogen atoms in the radical is replaced by COOH group.

The term "$C_1$-$C_n$nitroalkyl" as used herein refers to an alkyl radical where one of the hydrogen atoms in the radical is replaced by NO2 group.

The term "$C_1$-$C_n$haloalkylthio" (or "$C_1$-$C_n$haloalkylsulfanyl") as used herein refers to a $C_1$-$C_3$haloalkyl moiety linked through a sulfur atom.

The term "trimethylsilane$C_1$-$C_n$alkyl" as used herein refers to an alkyl radical where one of the hydrogen atoms in the radical is replaced by a —$Si(CH_3)_3$ group.

The term "$C_2$-$C_n$alkenyl" as used herein refers to a straight or branched alkenyl chain having form two to n carbon atoms and one or two double bonds, for example, ethenyl, prop-1-enyl, but-2-enyl.

The term "$C_2$-$C_n$haloalkenyl" as used herein refers to a $C_2$-$C_n$alkenyl moiety substituted with one or more halo atoms which may be the same or different.

The term "$C_2$-$C_n$alkynyl" as used herein refers to a straight or branched alkynyl chain having from two to n carbon atoms and one triple bond, for example, ethynyl, prop-2-ynyl, but-3-ynyl, The term "$C_2$-$C_n$haloalkynyl" as used herein refers to a $C_2$-$C_n$alkynyl moiety substituted with one or more halo atoms which may be the same or different.

Halogen is generally fluorine, chlorine, bromine or iodine. This also applies, correspondingly, to halogen in combination with other meanings, such as haloalkyl The pyridine, pyrimidine, pyrazine and pyridazine groups (unsubstituted or substituted) for $R_2$ and $R_4$ are each connected via a carbon atom on the respective ring to the rest of the compound.

As used herein, the term "controlling" refers to reducing the number of pests, eliminating pests and/or preventing further pest damage such that damage to a plant or to a plant derived product is reduced.

The staggered line as used herein, for example, in Q-1; and $R_4$-1, represent the point of connection/attachment to the rest of the compound.

As used herein, the term "pest" refers to insects, and molluscs that are found in agriculture, horticulture, forestry, the storage of products of vegetable origin (such as fruit, grain and timber); and those pests associated with the damage of man-made structures. The term pest encompasses all stages in the life cycle of the pest.

As used herein, the term "effective amount" refers to the amount of the compound, or a salt thereof, which, upon single or multiple applications provides the desired effect.

An effective amount is readily determined by the skilled person in the art, by the use of known techniques and by observing results obtained under analogous circumstances. In determining the effective amount a number of factors are considered including, but not limited to: the type of plant or derived product to be applied; the pest to be controlled & its lifecycle; the particular compound applied; the type of application; and other relevant circumstances.

As one of ordinary skill in the art will appreciate, compounds of formula I contain a stereogenic centre which is indicated with an asterisk in the structure below:

where $R_1$, $R_2$, $R_3$, and Q are as defined in the first aspect.

The present invention contemplates both racemates and individual enantiomers. Compounds having preferred stereochemistry are set out below.

Particularly preferred compounds of the present invention are compounds of formula I'a:

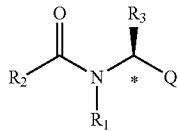

where $R_1$, $R_2$, $R_3$, and Q are as defined in the first aspect, and stereoisomers, enantiomers, tautomers and N-oxides of the compounds of formula (I'a), and agrochemically acceptable salts thereof.

The term "optionally substituted" as used herein means that the group referenced is is either unsubstituted or is substituted by a designated substituent, for example, "$C_3$-$C_4$cycloalkyl is optionally substituted with 1 or 2 halo atoms" means $C_3$-$C_4$cycloalkyl, $C_3$-$C_4$cycloalkyl substituted with 1 halo atom and $C_3$-$C_4$cycloalkyl substituted with 2 halo atoms.

Embodiments according to the invention are provided as set out below.

In an embodiment of each aspect of the invention, Q is

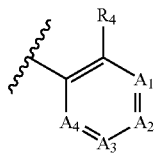

A. wherein $A_1$, $A_2$, $A_3$ and $A_4$ are independently $CR_5$ or N, provided not more than three of $A_1$, $A_2$, $A_3$ and $A_4$ are N; $R_5$, independently of each other, is hydrogen, halogen, CN, $C_1$-$C_3$alkyl, $C_1$-$C_3$haloalkyl or $C_3$-$C_4$cycloalkyl; and $R_4$ is pyridine, pyrimidine, pyrazine or pyridazine, wherein the pyridine, pyrimidine, pyrazine or pyridazine is optionally substituted with one to three substituents, independently selected, from $C_1$-$C_3$alkyl, $C_1$-$C_3$haloalkyl, $C_1$-$C_3$alkoxy, $C_3$-$C_4$cycloalkyl, halogen or hydroxy; or B. wherein $A_1$, $A_2$, $A_3$ and $A_4$ are independently $CR_5$ or N, provided not more than three of $A_1$, $A_2$, $A_3$ and $A_4$ are N; $R_5$, independently of each other, is hydrogen, fluoro, chloro, CN, methyl, trifluoromethyl or cyclopropyl; and $R_4$ is pyridine, pyrimidine, pyrazine or pyridazine, wherein the pyridine, pyrimidine, pyrazine or pyridazine is optionally substituted with one to three substituents, independently selected, from $C_1$-$C_3$alkyl, $C_1$-$C_3$haloalkyl, $C_1$-$C_3$alkoxy, $C_3$-$C_4$cycloalkyl, halogen or hydroxy; or C. wherein $A_1$, $A_2$, $A_3$ and $A_4$ are independently $CR_5$ or N, provided not more than three of $A_1$, $A_2$, $A_3$ and $A_4$ are N; $R_5$, independently of each other, is hydrogen, fluoro, chloro, CN, methyl, trifluoromethyl or cyclopropyl; and $R_4$ is pyridine, pyrimidine, pyrazine or pyridazine, wherein the pyridine, pyrimidine, pyrazine or pyridazine is optionally substituted with one to three substituents, independently selected, from methyl, trifluoromethyl, methoxy, cyclopropyl, chloro, fluoro, or hydroxy; or D. wherein $A_1$, $A_2$, $A_3$ and $A_4$ are independently $CR_5$ or N, provided not more than three of $A_1$, $A_2$, $A_3$ and $A_4$ are N; $R_5$, independently of each other, is hydrogen, fluoro, chloro, CN, methyl, trifluoromethyl or cyclopropyl; and $R_4$ is pyridine, pyrimidine, pyrazine or pyridazine, wherein the pyridine, pyrimidine, pyrazine or pyridazine is optionally substituted with one substituent selected from methyl, trifluoromethyl, methoxy, cyclopropyl, chloro, fluoro, or hydroxy; or E. wherein $A_1$, $A_2$, $A_3$ and $A_4$ are independently $CR_5$ or N; $R_5$, independently of each other, is hydrogen, fluoro, chloro, CN, methyl, trifluoromethyl or cyclopropyl, provided not more than three of $A_1$, $A_2$, $A_3$ and $A_4$ are N and not more than one of $A_1$, $A_2$, $A_3$ and $A_4$ is $CR_5$ where $R_5$ is fluoro, chloro, CN, methyl, trifluoromethyl or cyclopropyl; and $R_4$ is pyridine, pyrimidine, pyrazine or pyridazine, wherein the pyridine, pyrimidine, pyrazine or pyridazine is optionally substituted with one substituent selected from methyl, trifluoromethyl, methoxy, cyclopropyl, chloro, fluoro, or hydroxy; or F. selected from Q-1 to Q-12

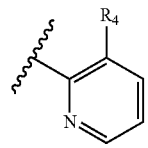

Q-1

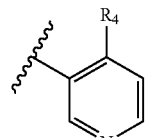

Q-2

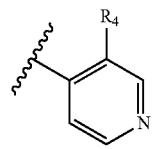

Q-3

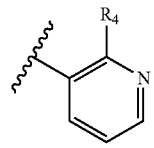

Q-4

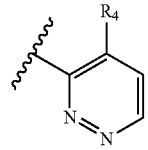

Q-5

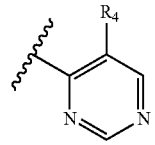

Q-6

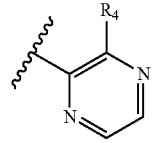

Q-7

-continued

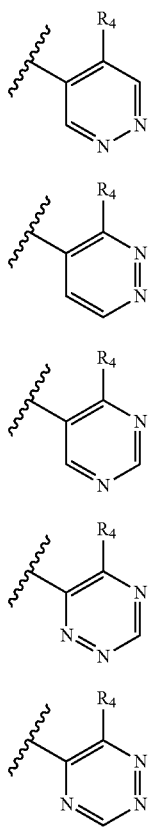

Q-8

Q-9

Q-10

Q-11

Q-12 wherein $R_4$, independently of the Q, is selected from pyridine, pyrimidine, pyrazine or pyridazine, wherein the pyridine, pyrimidine, pyrazine or pyridazine is optionally substituted with one to three substituents, independently selected, from $C_1$-$C_3$alkyl, $C_1$-$C_3$haloalkyl, $C_1$-$C_3$alkoxy, $C_3$-$C_4$cycloalkyl, halogen or hydroxyl; or G. selected from Q-1 to Q-12, wherein $R_4$ is pyridine, pyrimidine, pyrazine or pyridazine, wherein the pyridine, pyrimidine, pyrazine or pyridazine is optionally substituted with one to three substituents, independently selected, from methyl, trifluoromethyl, methoxy, cyclopropyl, chloro, fluoro, or hydroxy; or H. selected from Q-1 to Q-12, wherein $R_4$ is pyridine, pyrimidine, pyrazine or pyridazine, wherein the pyridine, pyrimidine, pyrazine or pyridazine is optionally substituted with one substituent selected from methyl, trifluoromethyl, methoxy, cyclopropyl, chloro, fluoro, or hydroxyl; or I. selected from Q-1, Q-5, Q-6, Q-7, Q-11 and Q-12 wherein $R_4$, independently of the Q, is selected from pyridine, pyrimidine, pyrazine or pyridazine, wherein the pyridine, pyrimidine, pyrazine or pyridazine is optionally substituted with one to three substituents, independently selected, from $C_1$-$C_3$alkyl, $C_1$-$C_3$haloalkyl, $C_1$-$C_3$alkoxy, $C_3$-$C_4$cycloalkyl, halogen or hydroxyl; or J. selected from Q-1, Q-5, Q-6, Q-7, Q-11 and Q-12 wherein $R_4$ is pyridine, pyrimidine, pyrazine or pyridazine, wherein the pyridine, pyrimidine, pyrazine or pyridazine is optionally substituted with one to three substituents, independently selected, from methyl, trifluoromethyl, methoxy, cyclopropyl, chloro, fluoro, or hydroxy; or K. selected from Q-1, Q-5, Q-6, Q-7, Q-11 and Q-12 wherein $R_4$ is pyridine, pyrimidine, pyrazine or pyridazine, wherein the pyridine, pyrimidine, pyrazine or pyridazine is optionally substituted with one substituent selected from methyl, trifluoromethyl, methoxy, cyclopropyl, chloro, fluoro, or hydroxyl; or L. selected from Q-1, Q-5, Q-6, Q-7, Q-11 and Q-12 wherein $R_4$ is selected and $R_4$-1 to and $R_{4-7}$

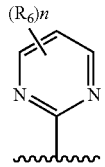

$R_4$-1

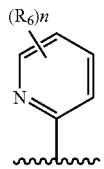

$R_4$-2

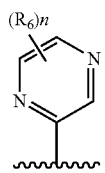

$R_4$-3

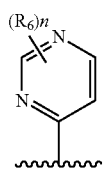

$R_4$-4

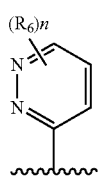

$R_4$-5

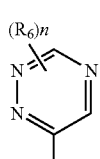

$R_4$-6

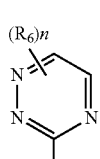

$R_4$-7 where n is 0, 1, 2 or 3 and $R_6$, independent of each other when n is 2 or 3, is selected from $C_1$-$C_3$alkyl, $C_1$-$C_3$haloalkyl, $C_3$-$C_4$cycloalkyl, and halogen; or M. selected from Q-1, Q-5, Q-6, Q-7, Q-11 and Q-12, wherein $R_4$ is selected $R_4$-1 to and $R_4$-3, n is 0, 1, 2 or 3; and $R_6$, independent of each other when n is 2 or 3, is selected from $C_1$-$C_3$alkyl, $C_1$-$C_3$haloalkyl, $C_3$-$C_4$cycloalkyl, and halogen; or
N. selected from Q-1, Q-5, Q-6, Q-7, Q-11 and Q-12, wherein $R_4$ is selected $R_4$-1 to and $R_4$-3, n is 0, 1, 2 or 3; and $R_6$, independent of each other when n is 2 or 3, is selected from methyl, trifluoromethyl, methoxy, cyclopropyl, chloro, and fluoro; or
O. selected from Q-1, Q-5, Q-6, Q-7, Q-11 and Q-12, wherein $R_4$ is selected $R_4$-1 to and $R_4$-3, n is 0 or 1; and $R_6$, when is 1, is selected from methyl, trifluoromethyl, methoxy, cyclopropyl, chloro, and fluoro; or
P. selected from Q-1, Q-6, and Q-7 wherein $R_4$ is selected and $R_4$-1, $R_4$-2 and $R_4$-3, where n is 0, 1, 2 or 3 and $R_6$, independent of each other when n is 2 or 3, is selected from cylcopropyl, fluorine and chlorine; or
Q. selected from Q-1, Q-6, and Q-7 wherein $R_4$ is selected and $R_4$-1, $R_4$-2 and $R_4$-3, where n is 0, or 1 and $R_6$, is selected from cylcopropyl, fluorine and chlorine; or
R. is Q-7, wherein $R_4$ is selected and $R_4$-1, $R_4$-2 and $R_4$-3, where n is 0 or 1 and $R_6$ is selected from cylcopropyl, fluorine and chlorine.

In each embodiment above of Q, $R_5$ is fluorine or hydrogen, preferably hydrogen.

In an embodiment of each aspect of the invention, $R_1$ is
A. hydrogen; $C_1$-$C_6$alkyl optionally substituted with one substituent selected from: CN, $CONH_2$, COOH, $NO_2$, and —$Si(CH_3)_3$; $C_1$-$C_6$haloalkyl; $C_2$-$C_6$alkenyl; $C_2$-$C_6$alkynyl; $C_2$-$C_6$haloalkynyl; $C_3$-$C_4$cycloalkyl-$C_1$-$C_2$alkyl- wherein the $C_3$-$C_4$cycloalkyl- is optionally substituted with 1 or 2 halo atoms; oxetan-3-yl-$CH_2$—; or benzyl optionally substituted with halo or $C_1$-$C_3$haloalkyl; or
B. hydrogen; $C_1$-$C_6$haloalkyl; $C_1$-$C_6$alkyl optionally substituted with CN or $Si(CH_3)_3$; $C_3$-$C_6$alkynyl; $C_3$-$C_4$cycloalkyl-$C_1$-$C_2$alkyl wherein the $C_3$-$C_4$cycloalkyl is optionally substituted with 1 or 2 halo atoms; oxetan-3-yl-$CH_2$—; or benzyl optionally substituted with halo; or
C. hydrogen, $C_1$-$C_6$alkyl, $C_3$-$C_4$cycloalkyl$C_1$-$C_2$alkyl- wherein the $C_3$-$C_4$cycloalkyl is optionally substituted with 1 or 2 halo atoms, or oxetan-3-yl-$CH_2$—; or
D. hydrogen, $C_1$-$C_6$alkyl, or $C_3$-$C_4$cycloalkyl$C_1$-$C_2$alkyl-; or
E. hydrogen; $C_1$-$C_6$haloalkyl; $C_1$-$C_6$alkyl optionally substituted with CN or $Si(CH_3)_3$; $C_3$-$C_6$alkynyl; or $C_3$-$C_4$cycloalkyl-$C_1$-$C_2$alkyl wherein the $C_3$-$C_4$cycloalkyl is optionally substituted with 1 or 2 halo atoms; or
F. hydrogen; $C_1$-$C_6$haloalkyl; $C_1$-$C_6$alkyl; $C_3$-$C_6$alkynyl; or $C_3$-$C_4$cycloalkyl-$C_1$-$C_2$alkyl wherein the $C_3$-$C_4$cycloalkyl is optionally substituted with 1 or 2 halo atoms; or
G. cyclopropyl-$CH_2$—, n-propyl, CH≡$CCH_2$—, $CF_3CH_2CH_2$—, $FCH_2CH_2$—, $FCH_2CH_2CH_2$—, 2,2-difluorocyclopropyl-$CH_2$—, 2,2-dichlorocyclopropyl-$CH_2$—, hydrogen, $CH_3$, $(CH_3)_3SiCH_2$—, $CH_3CH_2$—, or $CNCH_2$—; or
H. cyclopropyl-$CH_2$—, n-propyl, CH≡$CCH_2$—, $CF_3CH_2CH_2$—, $FCH_2CH_2$—, $FCH_2CH_2CH_2$—, 2,2-difluorocyclopropyl-$CH_2$— or 2,2-dichlorocyclopropyl-$CH_2$—; or
I. cyclopropyl-$CH_2$—, n-propyl, CH≡$CCH_2$—, $CF_3CH_2CH_2$—, $FCH_2CH_2$—, $FCH_2CH_2CH_2$—, 2,2-difluorocyclopropyl-$CH_2$—, hydrogen, $CH_3$, $(CH_3)SiCH_2$—, or $CH_3CH_2$—; or
J. cyclopropyl-$CH_2$—, n-propyl, CH≡$CCH_2$—, $CF_3CH_2CH_2$—, $FCH_2CH_2$—, $FCH_2CH_2CH_2$—, or 2,2-difluorocyclopropyl-$CH_2$—; or
K. cyclopropyl-$CH_2$—, n-propyl, CH≡$CCH_2$—, $CF_3CH_2CH_2$—, $FCH_2CH_2$—, or $FCH_2CH_2CH_2$—; or
L. cyclopropyl-$CH_2$—, CH≡$CCH_2$—, hydrogen or $CH_3$; or
M. CH≡$CCH_2$—or cyclopropyl-$CH_2$—; or
N. hydrogen, methyl or cyclopropyl-$CH_2$—; or
O. hydrogen or cyclopropyl-$CH_2$—.

In an embodiment of each aspect of the invention, $R_2$ is
A. phenyl, pyridine, pyrimidine, pyrazine or pyridazine, wherein the phenyl, pyridine, pyrimidine, pyrazine or pyridazine is optionally substituted with one to three substituents, provided the substituent(s) are not on either carbon adjacent to the carbon bonded to the —C(O)— group, each independently selected from: $C_1$-$C_3$alkyl, $C_1$-$C_3$haloalkyl, $C_1$-$C_3$haloalkylthio, $C_1$-$C_3$alkoxy, $C_1$-$C_3$haloalkoxy, halo, $NO_2$, $SF_5$, CN, $CONH_2$, COOH and $C(S)NH_2$; or
B. phenyl, pyridine, pyrimidine, pyrazine or pyridazine, wherein the phenyl, pyridine, pyrimidine, pyrazine or pyridazine is optionally substituted with one to two substituents, provided the substituent(s) are not on either carbon adjacent to the carbon C═O is attached too, and each substituent is independently selected from: $C_1$-$C_3$alkyl, $C_1$-$C_3$haloalkyl, $C_1$-$C_3$alkoxy, $C_1$-$C_3$haloalkoxy, halogen or CN; or
C. phenyl, 3-pyridine or 4-pyridine substituted with one or two substituents independently selected from: $C_1$-$C_3$haloalkyl, $C_1$-$C_3$haloalkoxy, halo, CN, or $C(S)NH_2$, provided the substituent(s) are not on either carbon adjacent to the carbon bonded to the —C(O)— group; or
D. phenyl, 3-pyridine or 4-pyridine substituted with one or two substituents independently selected from: $C_1$-$C_3$haloalkyl, $C_1$-$C_3$haloalkoxy, halo, or CN, provided the substituent(s) are not on either carbon adjacent to the carbon bonded to the —C(O)— group; or
E. phenyl, or 3-pyridine substituted with one or two substituents independently selected from: $C_1$-$C_3$haloalkyl, $C_1$-$C_3$haloalkoxy, halo, or CN, provided the substituent(s) are not on either carbon adjacent to the carbon bonded to the —C(O)— group; or
F. 3,5-bis(trifluoromethyl)phenyl, 3,5-dichlorophenyl, 3-trifluoromethoxyphenyl, 3-chloro-5-trifluoromethylphenyl, 3-cyanophenyl, 3-chloro-5-trifluoromethoxyphenyl, 5-trifluoromethylpyridin-3-yl, 3-bromo-5-trifluoromethylphenyl, 3-cyano-5-trifluoromethylphenyl or 2,6-bis(trifluoromethyl)pyridin-4-yl; or
G. 3,5-bis(trifluoromethyl)phenyl, 3,5-dichlorophenyl, 3-trifluoromethoxyphenyl, 3-chloro-5-trifluoromethylphenyl, 3-cyanophenyl, 3-chloro-5-trifluoromethoxyphenyl, 5-trifluoromethylpyridi-3-yl, 3-bromo-5-trifluoromethylphenyi or 3-cyano-5-trifluoromethyl-phenyl; or
H. 3,5-bis(trifluoromethyl)phenyl, 3,5-dichlorophenyl, 3-trifluoromethoxyphenyl, 3-chloro-5-trifluoromethylphenyl, 3-cyanophenyl, 3-chloro-5-trifluoromethoxyphenyl, or 5-trifluoromethylpyridin-3-yl; or
I. is 3,5-bis(trifluoromethyl)phenyl, 3-chloro-5-trifluoromethylphenyl, 3-cyanophenyL 3-chloro-5-trifluoromethoxyphenyl, 5-trifluoromethylpyridin-3-yl or 3-cyano-5-trifluoromethylphenyl; or J. 3,5-bis(trifluoromethyl)phenyl, 3-chloro-5-trifluoromethylphenyl, 3-chloro-5-trifluoromethoxyphenyl or 5-trifluoromethpyridin-3-yl; or
K. 3,5-bis(trifluoromethyl)phenyl; or
L. one of $Z_1$ to $Z_{14}$; or
$Z_1$
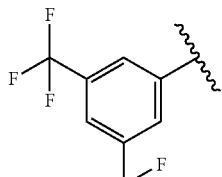
$Z_2$
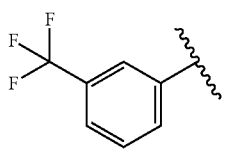
$Z_3$
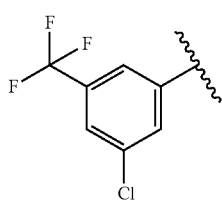
$Z_4$
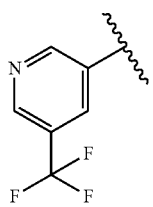
$Z_5$
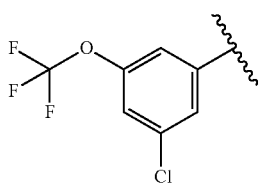
$Z_6$
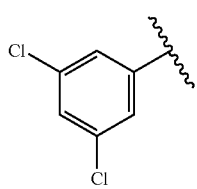
$Z_7$
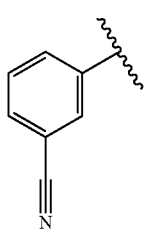
-continued
$Z_8$
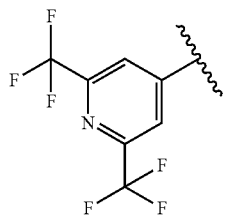
$Z_9$
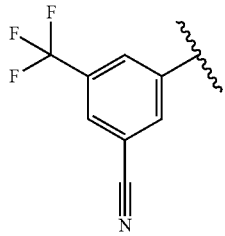
$Z_{10}$
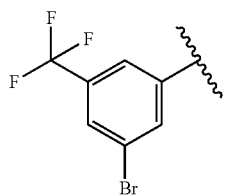
$Z_{11}$
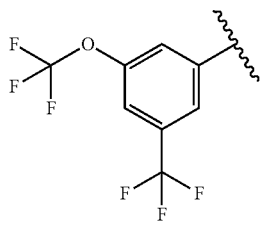
$Z_{12}$
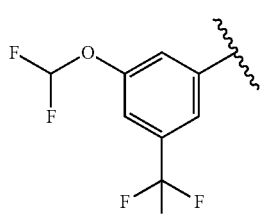
$Z_{13}$
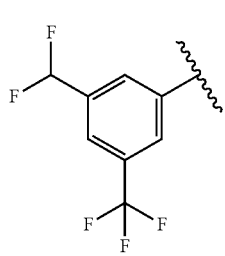

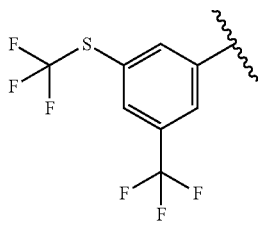
Z₁₄

M. one of $Z_1$, $Z_2$, $Z_3$, $Z_5$, $Z_6$, $Z_{10}$, $Z_{11}$, $Z_{12}$, or $Z_{14}$; or N. one of $Z_1$, $Z_3$, $Z_5$, $Z_{10}$, $Z_{11}$, $Z_{12}$, or $Z_{14}$; or O. one of $Z_1$, $Z_{10}$, $Z_{12}$, or $Z_{14}$; or

P. $Z_1$.

In an embodiment of each aspect of the invention, $R_3$ is

A. $C_1$-$C_3$alkyl or $C_1$-$C_3$haloalkyl; or

B. $C_1$-$C_3$alkyl; or

C. methyl.

In an embodiment, the present invention makes available a compound of formulae Ia to IL, where $R_1$, $R_2$, $R_3$ and $R_4$ are as defined for formula I.

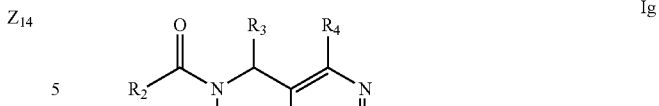
Ia

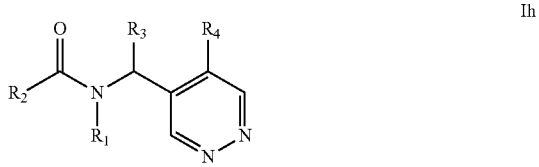
Ib

Ic

Id

Ie

If

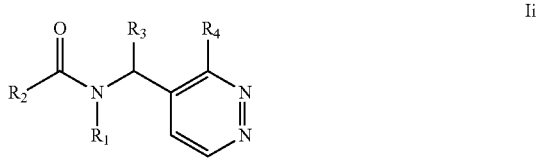
Ig

Ih

Ii

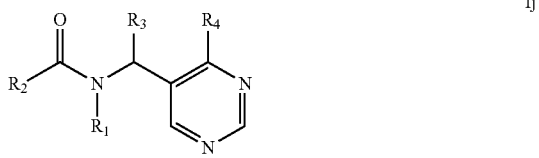
Ij

Ik

IL

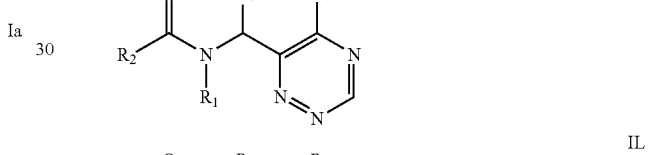

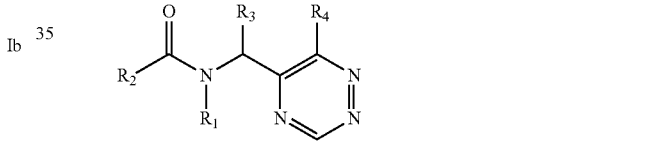

Whenever a reference or remark is made herein to a compound of formula I, such a reference o remark equally applies to a compound of formulae Ia to IL. Accordingly, the embodiments of $R_1$, $R_2$, $R_3$ and $R_4$ for a compound formula I are also equally applicable to a compound of each of formulae Ia to IL. In an embodiment, a compound of formulae Ia, Ie, If, Ig, Ik and IL are preferred, preferably, a compound of formula Ig is preferred.

The present invention, accordingly, makes available a compound of formula I having the substituents $R_1$, $R_2$, $R_3$, and Q (with $R_4$, and $A_1$ to $A_4$) as defined above in all combinations/each permutation. Accordingly, made available, for example, is a compound of formula I with Q being embodiment A (i.e. wherein Q is $A_1$, $A_2$, $A_3$ and $A_4$ are independently $CR_5$ or N, provided not more than three of $A_1$, $A_2$, $A_3$ and $A_4$ are N; $R_5$, independently of each other, is hydrogen, halogen, CN, $C_1$-$C_3$alkyl, or $C_1$-$C_3$haloalkyl; and $R_4$ is pyridine, pyrimidine, pyrazine or pyridazine, wherein the pyridine, pyrimidine, pyrazine or pyridazine is optionally substituted with one to three substituents, independently selected, from $C_1$-$C_3$alkyl, $C_1$-$C_3$haloalkyl, $C_1$-$C_3$alkoxy, $C_3$-$C_4$cycloalkyl, halogen or hydroxy); $R_1$ being embodiment D (i.e. $R_1$ is hydrogen, $C_1$-$C_6$alkyl, or $C_3$-$C_4$cycloalkyl$C_1$-$C_2$alkyl-); $R_2$ being an embodiment H (i.e. $R_2$ is 3,5-bis(trifluoromethyl)phenyl, 3,5-dichlorophenyl, 3-trifluoromethoxyphenyl, 3-chloro-5-trifluoromethylphenyl, 3-cyanophenyl, 3-chloro-5-trifluoromethoxyphenyl, or 5-trifluoromethylpyridin-3-yl); and $R_3$ being embodiment C (i.e. $R_3$ is methyl).

In an embodiment of each aspect of the invention, the compound of formula I has as $R_1$ hydrogen, $C_1$-$C_6$alkyl, $C_2$-$C_6$alkenyl, $C_2$-$C_6$alkynyl, $C_3$-$C_4$cycloalkyl$C_1$-$C_2$alkyl- wherein the $C_3$-$C_4$cycloalkyl is optionally substituted with 1 or 2 halo atoms, or oxetan-3-yl-$CH_2$—; as $R_2$ phenyl, pyridine, pyrimidine, pyrazine or pyridazine, wherein the phenyl, pyridine, pyrimidine, pyrazine or pyridazine is optionally substituted with one to two substituents, provided the substituent(s) are not on either carbon adjacent to the carbon C=O is attached too, and each substituent is independently selected from: $C_1$-$C_3$alkyl, $C_1$-$C_3$haloalkyl, $C_1$-$C_3$haloalkylthio, $C_1$-$C_3$alkoxy, $C_1$-$C_3$haloalkoxy, halogen or CN; as $R_3$ $C_1$-$C_3$alkyl; as Q Q-1 to Q-12, wherein $R_4$ on the Q is pyridine, pyrimidine, pyrazine or pyridazine, wherein the pyridine, pyrimidine, pyrazine or pyridazine is optionally substituted with one to three substituents, independently selected, from methyl, trifluoromethyl, methoxy, cyclopropyl, chloro, fluoro, or hydroxyl.

In an embodiment of each aspect of the invention, the compound of formula I has as $R_1$ hydrogen, $C_1$-$C_6$alkyl, $C_2$-$C_6$alkenyl, $C_2$-$C_6$alkynyl, $C_3$-$C_4$cycloalkyl$C_1$-$C_2$alkyl- wherein the $C_3$-$C_4$cycloalkyl is optionally substituted with 1 or 2 halo atoms, or oxetan-3-yl-$CH_2$—; as $R_2$ one of $Z_1$ to $Z_{14}$; as $R_3$ $C_1$-$C_3$alkyl, as Q Q-1 to Q-12, wherein $R_4$ on the Q is pyridine, pyrimidine, pyrazine or pyridazine, wherein the pyridine, pyrimidine, pyrazine or pyridazine is optionally substituted with one to three substituents, independently selected, from methyl, trifluoromethyl, methoxy, cyclopropyl, chloro, fluoro, or hydroxy.

In an embodiment of each aspect of the invention, the compound of formula I has as $R_1$ hydrogen, $C_1$-$C_6$alkyl, $C_3$-$C_6$alkenyl, $C_3$-$C_6$alkynyl or $C_3$-$C_4$cycloalkyl$C_1$-$C_2$alkyl-; as $R_2$ one of $Z_1$ to $Z_{14}$; as $R_3$ $C_1$-$C_3$alkyl; as Q Q-1 to Q-12, wherein wherein $R_4$ on the Q is selected $R_4$-1 to $R_4$-3, n is 0, 1, 2 or 3; and $R_6$, independent of each other when n is 2 or 3, is selected from $C_1$-$C_3$alkyl, $C_1$-$C_3$haloalkyl, $C_3$-$C_4$cycloalkyl, and halogen.

In an embodiment of each aspect of the invention, the compound of formula I has as $R_1$ cyclopropyl-$CH_2$—, $CH_2$=$CHCH_2$—, $CH$≡$CCH_2$—, hydrogen or $CH_3$; as $R_2$ one of $Z_1$, $Z_2$, $Z_3$, $Z_5$, $Z_6$, $Z_{10}$, $Z_{11}$, $Z_{12}$ or $Z_{14}$; as $R_3$ $C_1$-$C_3$alkyl; as Q Q-1 to Q-12, wherein $R_4$ on the Q is selected $R_4$-1 and $R_4$-3, n is 0 or 1; and Re, when is 1, is selected from methyl, trifluoromethyl, methoxy, cyclopropyl, chloro, and fluoro.

In an embodiment of each aspect of the invention, the compound of formula I has as $R_1$ cyclopropyl-$CH_2$—, $CH_2$=$CHCH_2$—, $CH$=$CCH_2$—, hydrogen or $CH_3$; as $R_2$ one of $Z_1$, $Z_2$, $Z_3$, $Z_5$, $Z_6$, $Z_{10}$, $Z_{11}$, $Z_{12}$ or $Z_{14}$; as $R_3$ $C_1$-$C_3$alkyl; as Q Q-1, Q-5, Q-6, Q-7, Q-11 and Q-12, wherein $R_4$ on the Q is selected from $R_4$-1 to $R_4$-3, n is 0, 1, 2 or 3; and Re, independent of each other when n is 2 or 3, is selected from methyl, trifluoromethyl, methoxy, cyclopropyl, chloro, and fluoro.

In an embodiment of each aspect of the invention, the compound of formula I has as $R_1$ cyclopropyl-$CH_2$—, $CH_2$=$CHCH_2$—, $CH$≡$CCH_2$—, hydrogen or $CH_3$; as $R_2$ one of $Z_1$, $Z_2$, $Z_3$, $Z_5$, $Z_6$, $Z_{10}$, $Z_{11}$, $Z_{12}$ or $Z_{14}$; as $R_3$ methyl; as Q Q-1, Q-5, Q-6, Q-7, Q-11 and Q-12, wherein $R_4$ on the Q is selected from $R_4$-1 to $R_4$-3, n is 0 or 1; and Re, when n is 1, is selected from methyl, trifluoromethyl, methoxy, cyclopropyl, chloro, and fluoro.

In an embodiment of each aspect of the invention, the compound of formula I has as $R_1$ cyclopropyl-$CH_2$—, hydrogen or $CH_3$; as $R_2$ one of $Z_1$, $Z_3$, $Z_5$, $Z_{10}$, Zn, $Z_{12}$ or $Z_{14}$; as $R_3$ methyl; as Q Q-1, Q-6 and Q-7, wherein $R_4$ on the Q is selected from $R_4$-1 to and $R_4$-3, n is 0 or 1; and Re, when n is 1, is selected from methyl, trifluoromethyl, methoxy, cyclopropyl, chloro, and fluoro.

In an embodiment of each aspect of the invention, the compound of formula I has as $R_1$ cyclopropyl-$CH_2$—, hydrogen or $CH_3$; as $R_2$ one of $Z_1$, $Z_{10}$, $Z_{12}$, or $Z_{14}$; as $R_3$ methyl; as Q Q-1, Q-6 and Q-7, wherein $R_4$ on the Q is selected from $R_4$-1 to $R_4$-3, n is 0 or 1; and Re, when n is 1, is selected from methyl, trifluoromethyl, methoxy, cyclopropyl, chloro, and fluoro.

In an embodiment of each aspect of the invention, the compound of formula I has as $R_1$ cyclopropyl-$CH_2$—, hydrogen or $CH_3$; as $R_2$ one of $Z_1$, $Z_3$, $Z_5$, $Z_{10}$, Zn, $Z_{12}$ or $Z_{14}$; as $R_3$ methyl; as Q Q-7, wherein $R_4$ on the Q is selected from $R_4$-1 to $R_4$-3, n is 0 or 1; and Re, when n is 1, is selected from methyl, trifluoromethyl, methoxy, cyclopropyl, chloro, and fluoro.

In an embodiment of each aspect of the invention, the compound of formula I has as $R_1$ cyclopropyl-$CH_2$—, hydrogen or $CH_3$; as $R_2$ one of $Z_1$, $Z_{10}$, $Z_{12}$, or $Z_{14}$; as $R_3$ methyl; as Q Q-7, wherein $R_4$ on the Q is selected from $R_4$-1 to $R_4$-3, n is 0 or 1; and Re, when n is 1, is selected from methyl, trifluoromethyl, methoxy, cyclopropyl, chloro, and fluoro.

In an embodiment of each aspect of the invention, the compound of formula I has as $R_1$ hydrogen, $C_1$-$C_6$alkyl, $C_2$-$C_6$alkenyl, $C_2$-$C_6$alkynyl, $C_3$-$C_4$cycloalkyl$C_1$-$C_2$alkyl- wherein the $C_3$-$C_4$cycloalkyl is optionally substituted with 1 or 2 halo atoms, or oxetan-3-yl-$CH_2$—; as $R_2$ one of $Z_1$, $Z_{10}$, $Z_{12}$, or $Z_{14}$; as $R_3$ $C_1$-$C_3$alkyl, as Q Q-7, wherein $R_4$ on the Q is selected from $R_4$-1 to $R_4$-3, n is 0 or 1; and Re, when n is 1, is selected from methyl, trifluoromethyl, methoxy, cyclopropyl, chloro, and fluoro.

In an embodiment of each aspect of the invention, the compound of formula I has as $R_1$ cyclopropyl-$CH_2$—, or hydrogen; as $R_2$ $Z_1$; as $R_3$ methyl; as Q Q-7, wherein $R_4$ on the Q is $R_4$-1, n is 0 or 1; and Re, when n is 1, is selected from cyclopropyl, chloro, and fluoro.

In an embodiment, the compound of formula I is selected from a compound of formulae Ia, Ie, If, Ig, Ik, and IL, wherein $R_1$, $R_2$, $R_3$ and $R_4$ are as defined herein.

In an embodiment, the compound of formula I is Ig, wherein $R_1$ is cyclopropyl-$CH_2$—, hydrogen or $CH_3$; $R_2$ is $Z_1$, $Z_3$, $Z_5$, $Z_{10}$, $Z_{11}$, $Z_{12}$ or $Z_{14}$; $R_3$ methyl; $R_4$ is selected from $R_4$-1 to $R_4$-3, n is 0 or 1; and $R_6$, when n is 1, is selected from methyl, trifluoromethyl, methoxy, cyclopropyl, chloro, and fluoro.

In an embodiment, the compound of formula I is Ig, wherein $R_1$ is cyclopropyl-$CH_2$— or hydrogen; $R_2$ is $Z_1$, $Z_{10}$, $Z_{12}$, or $Z_{14}$; $R_3$ methyl; $R_4$ is selected from $R_4$-1 to $R_4$-3, n is 0 or 1; and Re, when n is 1, is selected from methyl, trifluoromethyl, methoxy, cyclopropyl, chloro, and fluoro.

In an embodiment, the compound of formula I is Ig, wherein $R_1$ is cyclopropyl-$CH_2$— or hydrogen; $R_2$ is $Z_1$; $R_3$ methyl; $R_4$ is selected from $R_4$-1 to $R_4$-3, n is 0 or 1; and Re, when n is 1, is selected from cyclopropyl, chloro, and fluoro.

In a second aspect, the present invention makes available a composition comprising a compound of formula I as defined in the first aspect, one or more auxiliaries and diluent, and optionally one more other active ingredient.

In a third aspect, the present invention makes available a method of combating and controlling insects, acarines, nematodes or molluscs which comprises applying to a pest, to a locus of a pest, or to a plant susceptible to attack by a pest an insecticidally, acaricidally, nematicidally or molluscicidally effective amount of a compound as defined in the first aspect or a composition as defined in the second aspect.

In a fourth aspect, the present invention makes available a method for the protection of plant propagation material from the attack by insects, acarines, nematodes or molluscs, which comprises treating the propagation material or the site, where the propagation material is planted, with an effective amount of a compound of formula I as defined in the first aspect or a composition as defined in the second aspect.

In a fifth aspect, the present invention makes available a plant propagation material, such as a seed, comprising, or treated with or adhered thereto, a compound of formula I as defined in the first aspect or a composition as defined in the second aspect.

The present invention in a further aspect provides a method of controlling parasites in or on an animal in need thereof comprising administering an effective amount of a compound of the first aspect. The present invention further provides a method of controlling ectoparasites on an animal in need thereof comprising administering an effective amount of a compound of formula I as defined om the first aspect. The present invention further provides a method for preventing and/or treating diseases transmitted by ectoparasites comprising administering an effective amount of a compound of formula I as defined in the first aspect, to an animal in need thereof.

Compounds of formula I can be prepared by those skilled in the art following methods known. More specifically compounds of formulae I, and I'a, and intermediates therefor can be prepared as described below in the schemes and examples. Certain stereogenic centers have been left unspecified for the clarity and are not intended to limit the teaching of the schemes in any way.

The processes for preparing compounds of formula I can be carried out by methods known to those skilled in the art. Compounds of formula I

where $R_1$, $R_2$, $R_3$ and Q are as defined in the first aspect, can be prepared by reaction of an amine of formula II

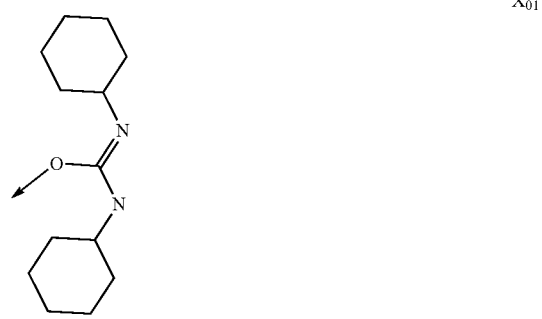

wherein $R_1$, $R_3$, and Q are as defined for compound of formula I, with a carboxylic acid derivative of formula III

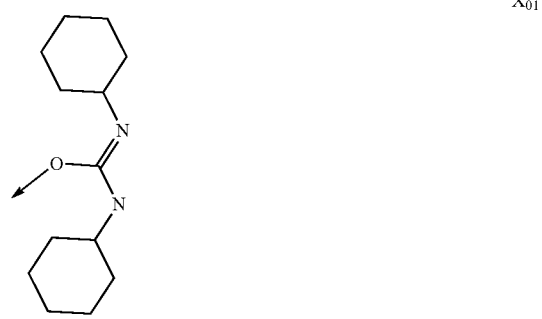

wherein $R_2$ is as defined for compound of formula I. The chemistry is described in more detail in Scheme 1.

Scheme 1

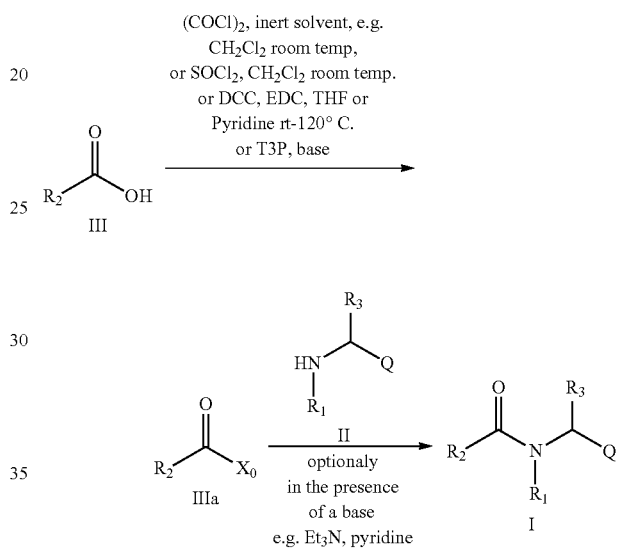

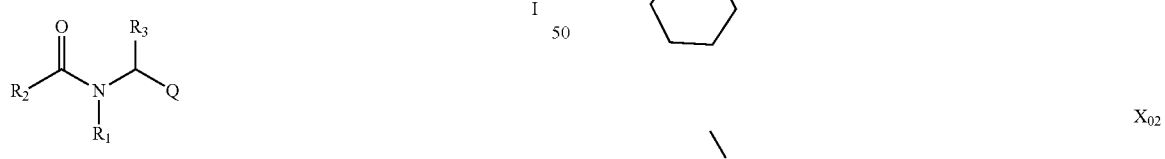

$X_{01}$

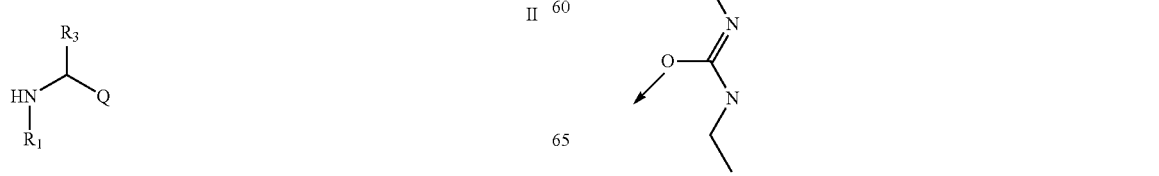

$X_{02}$

-continued

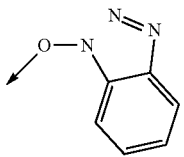

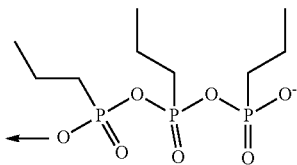

$X_0$ = Halogen,

In Scheme 1, compounds of formula III wherein $R_2$ is as defined in formula I, are activated to compounds of formula IIIa by methods known to those skilled in the art and described for example in Tetrahedron, 61 (46), 10827-10852, 2005. For example, compounds where $X_0$ is halogen are formed by treatment of compounds of formula III with for example, oxallyl chloride or thionyl chloride in the presence of catalytic quantities of DMF in inert solvents such as methylene dichloride or THF at temperatures between 20° C. to 100° C., preferably 25° C. Treatment of IIIa with compounds of formula II wherein $R_1$, $R_3$, and Q are defined as above, optionally in the presence of a base, e.g. triethylamine or pyridine leads to compounds of formula I. Alternatively, compounds of formula I can be prepared by treatment of compounds of formula III with dicyclohexyl carbodiimide (DCC), 1-Ethyl-3-(3-dimethylaminopropyl) carbodiimide (EDC) or 1-[Bis(dimethylamino)methylene]-1H-1,2,3-triazolo[4,5-b]pyridinium 3-oxide hexafluorophosphate (HATU) to give the activated species IIIa, wherein $X_0$ is $X_{01}$, $X_{02}$ and $X_{03}$ respectively, in an inert solvent, e.g. pyridine, DMF, acetonitrile, $CH_2Cl_2$ or THF optionally in the presence of a base, e.g. triethylamine, at temperatures between 50-180° C. Finally, an acid of the formula III can also be activated by reaction with a coupling reagent such as propanephosphonic acid anhydride (T3P®) to provide compounds of formula IIIa wherein $X_0$ is $X_{04}$ as described for example in Synthesis 2013, 45, 1569. Further reaction with an amine of the formula II provides compounds of formula I.

Compounds of formula II, wherein $R_1$, $R_3$, and Q are as defined in formula I (which correspond to compounds of formula IIa when definition of Q is structurally incorporated) can be prepared according to Scheme 2:

Scheme 2.

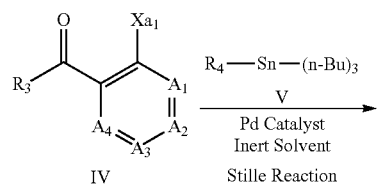

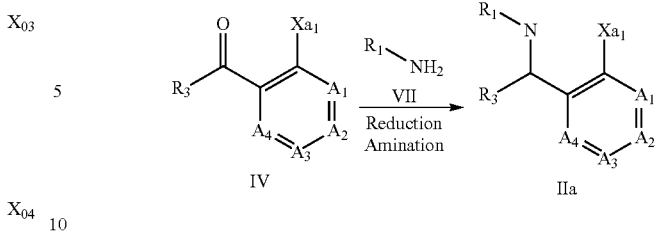

In scheme 2, a Stille reaction of compounds of formula IV (wherein Xa1 is halogen or an aryl- or alkylsulfonate such as trifluoromethanesulfonate and $R_3$, $A_1$, $A_2$, $A_3$ and $A_4$ are as defined in formula I), are reacted with tin compounds of formula V (where $R_4$ is as defined in formula I), in the presence of a palladium catalyst, for example tetrakis(triphenylphosphine)palladium(0), or (1,1'bis(diphenylphosphino)-ferrocene)dichloropalladium-dichloromethane (1:1 complex), in an inert solvent such as DMF, acetonitrile, or dioxane, optionally in the presence of an additive, such as potassium or cesium fluoride, or lithium chloride, and optionally in the presence of a further catalyst, for example copper(I)iodide to give compounds of formula VI (where $R_3$, $R_4$, $A_1$, $A_2$, $A_3$ and $A_4$ are as defined in formula I). Such Stille couplings are also well known to those skilled in the art, and have been described in for example J. Org. Chem., 2005, 70, 8601-8604, J. Org. Chem., 2009, 74, 5599-5602, and Angew. Chem. Int. Ed., 2004, 43, 1132-1136. Compounds of formula VI can be treated with compounds of formula VII (where $R_1$ is as defined in formula I), e.g. in the presence of $NaBH(OAc)_3$ or $NaBH_3CN$, preferable with $NaBH_3CN$ as reductive reagent, in a suitable solvent, preferable in acetic acid at room temperature analog to WO2002/088073, page 35 to form compounds of formula IIa (where where $R_1$, $R_3$, $R_4$, $A_1$, $A_2$, $A_3$ and $A_4$ are as defined in formula I). Another reagent system for the reductive amination uses a combination of Ti(i-OPr) and $NaBH_4$ in the presence of an amine of formula VII to provide compounds of formula II (see Synthesis 2003 (14), 2206).

Compounds of formula VI (where $R_3$, $R_4$, $A_1$, $A_2$, $A_3$ and $A_4$ are as defined in formula I) can also be prepared by a Suzuki reaction (scheme 3), which involves for example, reacting compounds of formula IV (where $R_3$, $A_1$, $A_2$, $A_3$ and $A_4$ are as defined in formula I and $Xa_1$ is a leaving group like, for example, chlorine, bromine or iodine, or an aryl- or alkylsulfonate such as trifluoromethanesulfonate) with compounds of formula VIIIa, wherein $Y_{b1}$ can be a boron-derived functional group, as for example $B(OH)_2$ or $B(OR_{b1})_2$ wherein $R_{b1}$ can be a $C_1$-$C_4$alkyl group or the two groups $OR_{b1}$ can form together with the boron atom a five membered ring, as for example a pinacol boronic ester. The reaction can be catalyzed by a palladium based catalyst, for example tetrakis(triphenylphosphine)-palladium or (1,1'bis (diphenylphosphino)-ferrocene)dichloropalladium-dichloromethane (1:1 complex), in presence of a base, like sodium carbonate or cesium fluoride, in a solvent or a solvent mixture, like, for example a mixture of 1,2-dimethoxyethane and water, dioxane and water, or DMF and water preferably under inert atmosphere. The reaction temperature can preferentially range from room temperature to the boiling point of the reaction mixture. Such Suzuki reactions are well known to those skilled in the art and have been reviewed, for example *J. Orgmet. Chem.* 576, 1999, 147-168.

Scheme 3

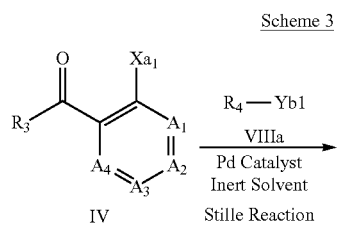

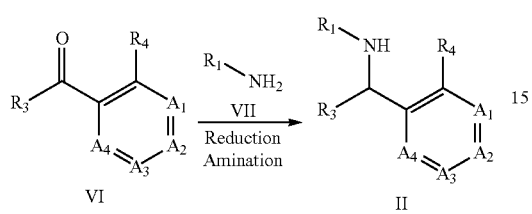

Reductive amination as described in scheme 2 leads to compounds of formula IIa. Compounds of formula IV are generally commercially available.

In an alternative process (scheme 4), compounds of formula VI (where $R_3$, $R_4$, $A_1$, $A_2$, $A_3$ and $A_4$ are as defined in formula I) can be reduced to compounds of formula IX by reduction with for example with $NaBH_4$ in the usual manner (see e.g. WO2012/082997, page 141), for example in MeOH, to afford alcohols formula IX, which are activated with compounds of formula $R_A SO_2 Cl$ wherein $R_A$ is $CH_3$ or p-$CH_3$—$C_6 H_4$ in an inert solvent, preferable in methylene dichloride in the presence of a base, e.g. triethyl amine to give compounds of formula X, wherein $Xb_2$ is —$OSO_2 R_A$, or converted to alkyl halides by treatment with phosphorous compounds of formula $P(Xb_2)_3$, wherein $Xb_2$ is halogen, by methods known to those skilled in the art, to prepare compounds of formula X wherein $Xb_2$ is halogen, and described for example in *Organische Chemie*. 4. Auflage, Wiley-VCH Verlag, Weinheim 2005, p. 393 ff. Finally, reaction of compound of formula X with amines of formula VII furnishes compounds of formula IIa wherein $R_1$, $R_3$, $R_4$ and $A_1$ to $A_4$ are defined as in formula I.

Scheme 4

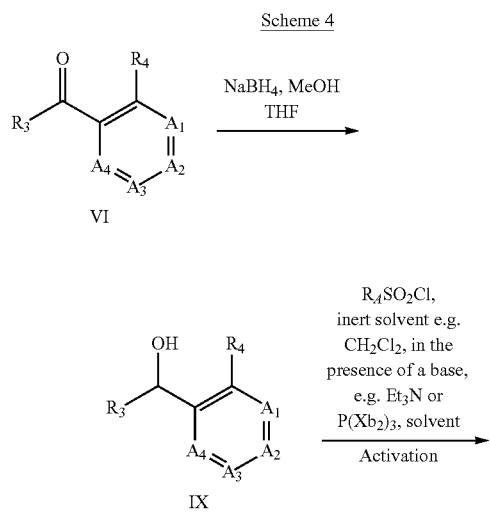

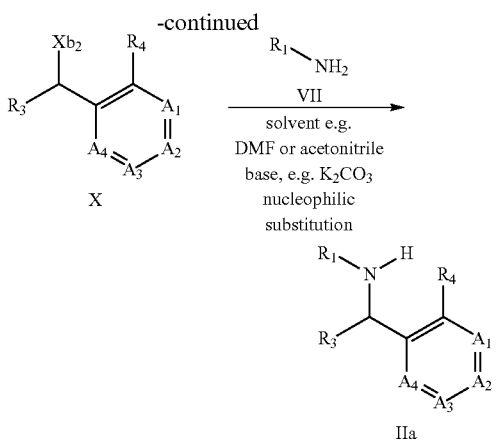

Compounds of formula VI are either commercially available or can be prepared as shown in Scheme 5:

Scheme 5

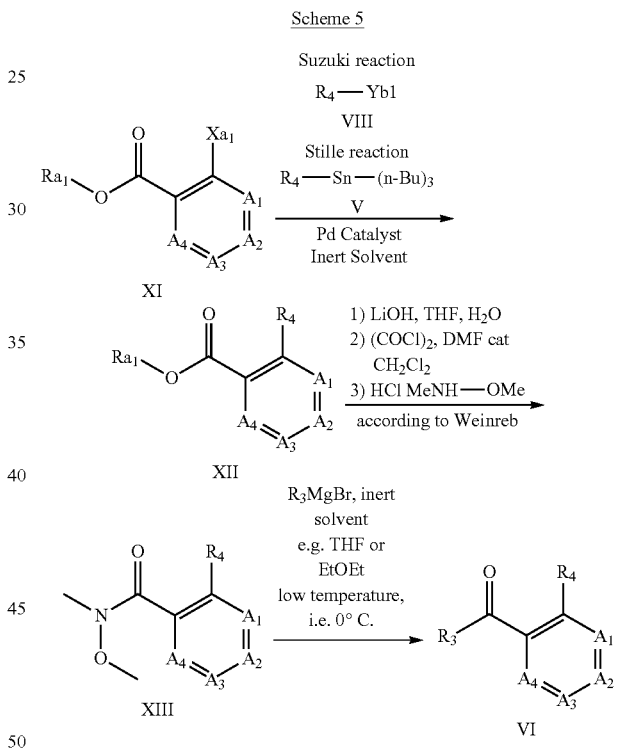

As shown in scheme 5, compounds of formula XI (wherein $A_1$ to $A_4$ are as defined in formula I, Rai is $C_1$-$C_6$alkyl, and $X_{a1}$ is a leaving group as previously defined) can be converted to compounds of formula XII (wherein $R_4$, and $A_1$ to $A_4$ are as defined in formula I and Rai is $C_1$-$C_6$alkyl) by reaction with compounds of formula V (Stille reaction) or compounds of formula VIII (Suzuki reaction) in the presence of a palladium catalyst as described in schemes 2 and 3. Compounds of formula XII are then converted to carboxylic acids by methods known in the art (see e.g. WO2011/143365, page 138). Activation (see Scheme 1) of the carboxylic acids and treatment with N-methoxy-N-methylamine (according to Weinreb et al. *Tet. Lett.* 1981, 39, 3815) lead to Weinreb amides of formula XIII (wherein $R_4$, and $A_1$ to $A_4$ are as defined in formula I). Treatment of compounds XIII with a Grignard reagent $R_3MgBr$, e.g. MeMgBr at lower temperatures, preferable at 0 to 25° C., gives alkyl ketones of formula VI (wherein $R_3$, $R_4$ and $A_1$ to $A_4$ are as defined in formula I).

Depending on the procedure or the reaction conditions, the reactants can be reacted in the presence of a base. Examples of suitable bases are alkali metal or alkaline earth metal hydroxides, alkali metal or alkaline earth metal hydrides, alkali metal or alkaline earth metal amides, alkali metal or alkaline earth metal alkoxides, alkali metal or alkaline earth metal acetates, alkali metal or alkaline earth metal carbonates, alkali metal or alkaline earth metal dialkylamides or alkali metal or alkaline earth metal alkylsilylamides, alkylamines, alkylenediamines, free or N-alkylated saturated or unsaturated cycloalkylamines, basic heterocycles, ammonium hydroxides and carbocyclic amines. Examples which may be mentioned are sodium hydroxide, sodium hydride, sodium amide, sodium methoxide, sodium acetate, sodium carbonate, potassium tert-butoxide, potassium hydroxide, potassium carbonate, potassium hydride, lithium diisopropylamide, potassium bis(trimethylsilyl)amide, calcium hydride, triethylamine, diisopropylethylamine, triethylenediamine, cyclohexylamine, N-cyclohexyl-N,N-dimethylamine, N,N-diethylaniline, pyridine, 4-(N,N-dimethylamino)pyridine, quinuclidine, N-methylmorpholine, benzyltrimethylammonium hydroxide and 1,8-diazabicyclo[5.4.0]undec-7-ene (DBU).

The reactants can be reacted with each other as such, i.e. without adding a solvent or diluent. In most cases, however, it is advantageous to add an inert solvent or diluent or a mixture of these. If the reaction is carried out in the presence of a base, bases which are employed in excess, such as triethylamine, pyridine, N-methylmorpholine or N,N-diethylaniline, may also act as solvents or diluents.

The reactions are advantageously carried out in a temperature range from approximately –80° C. to approximately +140° C., preferably from approximately –30° C. to approximately +100° C., in many cases in the range between ambient temperature and approximately +80° C.

Depending on the choice of the reaction conditions and starting materials which are suitable in each case, it is possible, for example, in one reaction step only to replace one substituent by another substituent according to the invention, or a plurality of substituents can be replaced by other substituents according to the invention in the same reaction step.

Salts of compounds of formula I can be prepared in a manner known perse. Thus, for example, acid addition salts of compounds of formula I are obtained by treatment with a suitable acid or a suitable ion exchanger reagent and salts with bases are obtained by treatment with a suitable base or with a suitable ion exchanger reagent.

Salts of compounds of formula I can be converted in the customary manner into the free compounds I, acid addition salts, for example, by treatment with a suitable basic compound or with a suitable ion exchanger reagent and salts with bases, for example, by treatment with a suitable acid or with a suitable ion exchanger reagent.

Salts of compounds of formula I can be converted in a manner known per se into other salts of compounds of formula I, acid addition salts, for example, into other acid addition salts, for example by treatment of a salt of inorganic acid such as hydrochloride with a suitable metal salt such as a sodium, barium or silver salt, of an acid, for example with silver acetate, in a suitable solvent in which an inorganic salt which forms, for example silver chloride, is insoluble and thus precipitates from the reaction mixture.

Depending on the procedure or the reaction conditions, the compounds of formula I, which have salt-forming properties can be obtained in free form or in the form of salts.

The compounds of formula I and, where appropriate, the tautomers thereof, in each case in free form or in salt form, can be present in the form of one of the isomers which are possible or as a mixture of these, for example in the form of pure isomers, such as antipodes and/or diastereomers, or as isomer mixtures, such as enantiomer mixtures, for example racemates, diastereomer mixtures or racemate mixtures, depending on the number, absolute and relative configuration of asymmetric carbon atoms which occur in the molecule and/or depending on the configuration of non-aromatic double bonds which occur in the molecule; the invention relates to the pure isomers and also to all isomer mixtures which are possible and is to be understood in each case in this sense hereinabove and hereinbelow, even when stereochemical details are not mentioned specifically in each case.

Diastereomer mixtures or racemate mixtures of compounds of formula I, in free form or in salt form, which can be obtained depending on which starting materials and procedures have been chosen can be separated in a known manner into the pure diasteromers or racemates on the basis of the physicochemical differences of the components, for example by fractional crystallization, distillation and/or chromatography.

Enantiomer mixtures, such as racemates, which can be obtained in a similar manner can be resolved into the optical antipodes by known methods, for example by recrystallization from an optically active solvent, by chromatography on chiral adsorbents, for example high-performance liquid chromatography (HPLC) on acetyl cellulose, with the aid of suitable microorganisms, by cleavage with specific, immobilized enzymes, via the formation of inclusion compounds, for example using chiral crown ethers, where only one enantiomer is complexed, or by conversion into diastereomeric salts, for example by reacting a basic end-product racemate with an optically active acid, such as a carboxylic acid, for example camphor, tartaric or malic acid, or sulfonic acid, for example camphorsulfonic acid, and separating the diastereomer mixture which can be obtained in this manner, for example by fractional crystallization based on their differing solubilities, to give the diastereomers, from which the desired enantiomer can be set free by the action of suitable agents, for example basic agents.

Pure diastereomers or enantiomers can be obtained according to the invention not only by separating suitable isomer mixtures, but also by generally known methods of diastereoselective or enantioselective synthesis, for example by carrying out the process according to the invention with starting materials of a suitable stereochemistry.

N-oxides can be prepared by reacting a compound of the formula I with a suitable oxidizing agent, for example the $H_2O_2$/urea adduct in the presence of an acid anhydride, e.g. trifluoroacetic anhydride. Such oxidations are known from the literature, for example from J. Med. Chem., 32 (12), 2561-73, 1989 or WO 2000/15615.

It is advantageous to isolate or synthesize in each case the biologically more effective isomer, for example enantiomer or diastereomer, or isomer mixture, for example enantiomer mixture or diastereomer mixture, if the individual components have a different biological activity.

The compounds of formula I and, where appropriate, the tautomers thereof, in each case in free form or in salt form, can, if appropriate, also be obtained in the form of hydrates and/or include other solvents, for example those which may have been used for the crystallization of compounds which are present in solid form.

The compounds of formula I according to the following Tables A-1 to A-15 can be prepared according to the methods described above. The examples which follow are intended to illustrate the invention and show preferred compounds of formula I, in the form of a compound of formula Ia.

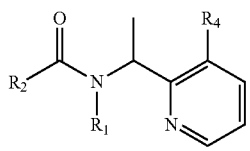

Ia

Table A-1 provides 14 compounds A-1.001 to A-1.014 of formula a wherein wherein $R_1$ is H, $R_4$ is pyrimidin-2-yl and $R_2$ is as defined in table Z.

For example, compound A-1.010 is

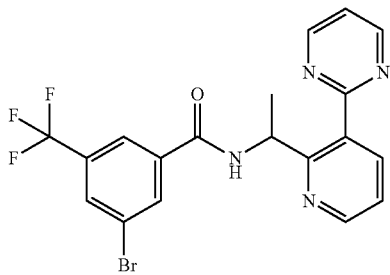 [SMILES: CC(NC(=O)c1cc(Br)cc(C(F)(F)F)c1)c1ncccc1-c1ncccn1]

TABLE Z

| Substituent definitions of $R_2$: | |
| --- | --- |
| Index | $R_2$ |
| 1 | 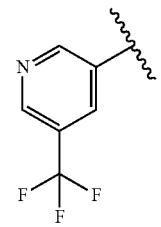 [SMILES: *c1cncc(C(F)(F)F)c1] |
| 2 | 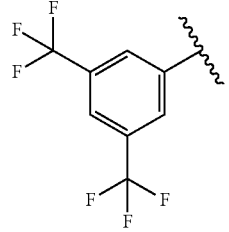 |
| 3 | 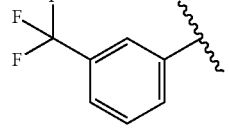 |

TABLE Z-continued

| Substituent definitions of $R_2$: | |
| --- | --- |
| Index | $R_2$ |
| 4 | 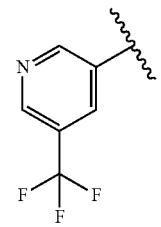 [SMILES: *c1cncc(C(F)(F)F)c1] |
| 5 | 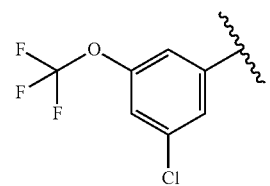 |
| 6 | 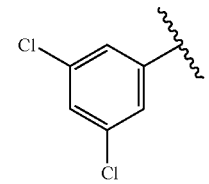 [SMILES: *c1cc(Cl)cc(Cl)c1] |
| 7 | 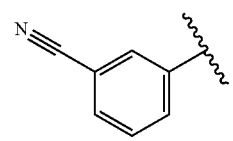 [SMILES: *c1cccc(C#N)c1] |
| 8 | 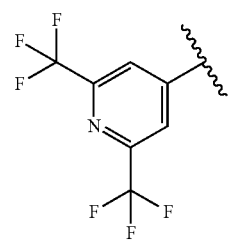 [SMILES: *c1cc(C(F)(F)F)nc(C(F)(F)F)c1] |
| 9 | 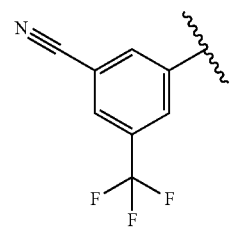 [SMILES: *c1cc(C#N)cc(C(F)(F)F)c1] |
| 10 | 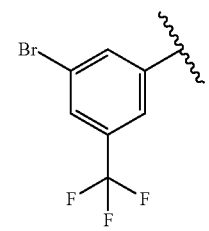 |

TABLE Z-continued

Substituent definitions of $R_2$:

| Index | $R_2$ |
|---|---|
| 11 | 3,5-bis-substituted phenyl with OCF$_3$ and CF$_3$ |
| 12 | 3,5-bis-substituted phenyl with OCHF$_2$ and CF$_3$ |
| 13 | 3,5-bis-substituted phenyl with CHF$_2$ and CF$_3$ |
| 14 | 3,5-bis-substituted phenyl with SCF$_3$ and CF$_3$ |

Table A-2 provides 14 compounds A-2.001 to A-2.014 of formula Ia wherein $R_1$ is H, $R_4$ is 2-pyridyl and $R_2$ is as defined in table Z.

Table A-3 provides 14 compounds A-3.001 to A-3.014 of formula Ia wherein $R_1$ is H, $R_4$ is (3-chloro-2-pyridyl) and $R_2$ is as defined in table Z.

Table A-4 provides 14 compounds A-4.001 to A-4.014 of formula Ia wherein $R_1$ is CH$_3$, $R_4$ is pyrimidin-2-yl and $R_2$ is as defined in table Z.

Table A-5 provides 14 compounds A-5.001 to A-5.014 of formula Ia wherein $R_1$ is CH$_3$, $R_4$ is 2-pyridyl and $R_2$ is as defined in table Z.

Table A-6 provides 14 compounds A-6.001 to A-6.014 of formula Ia wherein $R_1$ is CH$_3$, $R_4$ is (3-chloro-2-pyridyl) and $R_2$ is as defined in table Z.

Table A-7 provides 14 compounds A-7.001 to A-7.014 of formula Ia wherein $R_1$ is allyl, $R_4$ is pyrimidin-2-yl and $R_2$ is as defined in table Z.

Table A-8 provides 14 compounds A-8.001 to A-8.014 of formula Ia wherein $R_1$ is allyl, $R_4$ is 2-pyridyl and $R_2$ is as defined in table Z.

Table A-9 provides 14 compounds A-9.001 to A-9.014 of formula Ia wherein $R_1$ is allyl, $R_4$ is (3-chloro-2-pyridyl) and $R_2$ is as defined in table Z.

Table A-10 provides 14 compounds A-10.001 to A-10.014 of formula Ia wherein $R_1$ is prop-2-ynyl, $R_4$ is pyrimidin-2-yl and $R_2$ is as defined in table Z.

Table A-11 provides 14 compounds A-11.001 to A-11.014 of formula Ia wherein $R_1$ is prop-2-ynyl, $R_4$ is 2-pyridyl and $R_2$ is as defined in table Z.

Table A-12 provides 14 compounds A-12.001 to A-12.014 of formula Ia wherein $R_1$ is prop-2-ynyl, $R_4$ is (3-chloro-2-pyridyl) and $R_2$ is as defined in table Z.

Table A-13 provides 14 compounds A-13.001 to A-13.014 of formula Ia wherein $R_1$ is CH$_2$Cyp, $R_4$ is pyrimidin-2-yl and $R_2$ is as defined in table Z.

Table A-14 provides 14 compounds A-14.001 to A-14.014 of formula Ia wherein $R_1$ is CH$_2$Cyp, $R_4$ is 2-pyridyl and $R_2$ is as defined in table Z.

Table A-15 provides 14 compounds A-15.001 to A-15.014 of formula Ia wherein $R_1$ is CH$_2$Cyp, $R_4$ is (3-chloro-2-pyridyl) and $R_2$ is as defined in table Z.

The compounds of formula I according to the following Tables G-1 to G-15 can be prepared according to the methods described above. The examples which follow are intended to illustrate the invention and show preferred compounds of formula I, in the form of a compound of formula Ib.

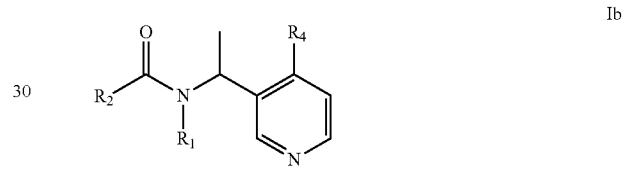

Ib

Table G-1 provides 14 compounds G-1.001 to G-1.014 of formula Ib wherein $R_1$ is H, $R_4$ is pyrimidin-2-yl and $R_2$ is as defined in table Z.

Table G-2 provides 14 compounds G-2.001 to G-2.014 of formula Ib wherein $R_1$ is H, $R_4$ is 2-pyridyl and $R_2$ is as defined in table Z.

Table G-3 provides 14 compounds G-3.001 to G-3.014 of formula Ib wherein $R_1$ is H, $R_4$ is (3-chloro-2-pyridyl) and $R_2$ is as defined in table Z.

Table G-4 provides 14 compounds G-4.001 to G-4.014 of formula Ib wherein $R_1$ is CH$_3$, $R_4$ is pyrimidin-2-yl and $R_2$ is as defined in table Z.

Table G-5 provides 14 compounds G-5.001 to G-5.014 of formula Ib wherein $R_1$ is CH$_3$, $R_4$ is 2-pyridyl and $R_2$ is as defined in table Z.

Table G-6 provides 14 compounds G-6.001 to G-6.014 of formula Ib wherein $R_1$ is CH$_3$, $R_4$ is (3-chloro-2-pyridyl) and $R_2$ is as defined in table Z.

Table G-7 provides 14 compounds G-7.001 to G-7.014 of formula Ib wherein $R_1$ is allyl, $R_4$ is pyrimidin-2-yl and $R_2$ is as defined in table Z.

Table G-8 provides 14 compounds G-8.001 to G-8.014 of formula Ib wherein $R_1$ is allyl, $R_4$ is 2-pyridyl and $R_2$ is as defined in table Z.

Table G-9 provides 14 compounds G-9.001 to G-9.014 of formula Ib wherein $R_1$ is allyl, $R_4$ is (3-chloro-2-pyridyl) and $R_2$ is as defined in table Z.

Table G-10 provides 14 compounds G-10.001 to G-10.014 of formula Ib wherein $R_1$ is prop-2-ynyl, $R_4$ is pyrimidin-2-yl and $R_2$ is as defined in table Z.

Table G-11 provides 14 compounds G-11.001 to G-11.014 of formula Ib wherein $R_1$ is prop-2-ynyl, $R_4$ is 2-pyridyl and $R_2$ is as defined in table Z.

Table G-12 provides 14 compounds G-12.001 to G-12.014 of formula Ib wherein $R_1$ is prop-2-ynyl, $R_4$ is (3-chloro-2-pyridyl) and $R_2$ is as defined in table Z.

Table G-13 provides 14 compounds G-13.001 to G-13.014 of formula Ib wherein $R_1$ is $CH_2Cyp$, $R_4$ is pyrimidin-2-yl and $R_2$ is as defined in table Z.

Table G-14 provides 14 compounds G-14.001 to G-14.014 of formula Ib wherein $R_1$ is $CH_2Cyp$, $R_4$ is 2-pyridyl and $R_2$ is as defined in table Z.

Table G-15 provides 14 compounds G-15.001 to G-15.014 of formula Ib wherein $R_1$ is $CH_2Cyp$, $R_4$ is (3-chloro-2-pyridyl) and $R_2$ is as defined in table Z.

The compounds of formula I according to the following Tables H-1 to H-15 can be prepared according to the methods described above. The examples which follow are intended to illustrate the invention and show preferred compounds of formula I, in the form of a compound of formula Ic.

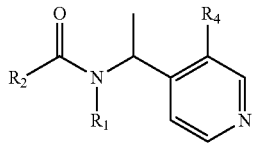

Ic

Table H-1 provides 14 compounds H-1.001 to H-1.014 of formula Ic wherein $R_1$ is H, $R_4$ is pyrimidin-2-yl and $R_2$ is as defined in table Z.

Table H-2 provides 14 compounds H-2.001 to H-2.014 of formula Ic wherein $R_1$ is H, $R_4$ is 2-pyridyl and $R_2$ is as defined in table Z.

Table H-3 provides 14 compounds H-3.001 to H-3.014 of formula Ic wherein $R_1$ is H, $R_4$ is (3-chloro-2-pyridyl) and $R_2$ is as defined in table Z.

Table H-4 provides 14 compounds H-4.001 to H-4.014 of formula Ic wherein $R_1$ is $CH_3$, $R_4$ is pyrimidin-2-yl and $R_2$ is as defined in table Z.

Table H-5 provides 14 compounds H-5.001 to H-5.014 of formula Ic wherein $R_1$ is $CH_3$, $R_4$ is 2-pyridyl and $R_2$ is as defined in table Z.

Table H-6 provides 14 compounds H-6.001 to H-6.014 of formula Ic wherein $R_1$ is $CH_3$, $R_4$ is (3-chloro-2-pyridyl) and $R_2$ is as defined in table Z.

Table H-7 provides 14 compounds H-7.001 to H-7.014 of formula Ic wherein $R_1$ is allyl, $R_4$ is pyrimidin-2-yl and $R_2$ is as defined in table Z.

Table H-8 provides 14 compounds H-8.001 to H-8.014 of formula Ic wherein $R_1$ is allyl, $R_4$ is 2-pyridyl and $R_2$ is as defined in table Z.

Table H-9 provides 14 compounds H-9.001 to H-9.014 of formula Ic wherein $R_1$ is allyl, $R_4$ is (3-chloro-2-pyridyl) and $R_2$ is as defined in table Z.

Table H-10 provides 14 compounds H-10.001 to H-10.014 of formula Ic wherein $R_1$ is prop-2-ynyl, $R_4$ is pyrimidin-2-yl and $R_2$ is as defined in table Z.

Table H-11 provides 14 compounds H-11.001 to H-11.014 of formula Ic wherein $R_1$ is prop-2-ynyl, $R_4$ is 2-pyridyl and $R_2$ is as defined in table Z.

Table H-12 provides 14 compounds H-12.001 to H-12.014 of formula Ic wherein $R_1$ is prop-2-ynyl, $R_4$ is (3-chloro-2-pyridyl) and $R_2$ is as defined in table Z.

Table H-13 provides 14 compounds H-13.001 to H-13.014 of formula Ic wherein $R_1$ is $CH_2Cyp$, $R_4$ is pyrimidin-2-yl and $R_2$ is as defined in table Z.

Table H-14 provides 14 compounds H-14.001 to H-14.014 of formula Ic wherein $R_1$ is $CH_2Cyp$, $R_4$ is 2-pyridyl and $R_2$ is as defined in table Z.

Table H-15 provides 14 compounds H-15.001 to H-15.014 of formula Ic wherein $R_1$ is $CH_2Cyp$, $R_4$ is (3-chloro-2-pyridyl) and $R_2$ is as defined in table Z.

The compounds of formula I according to the following Tables I-1 to I-15 can be prepared according to the methods described above. The examples which follow are intended to illustrate the invention and show preferred compounds of formula I, in the form of a compound of formula Id.

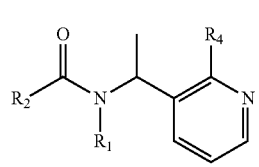

Id

Table I-1 provides 14 compounds I-1.001 to I-1.014 of formula Id wherein $R_1$ is H, $R_4$ is pyrimidin-2-yl and $R_2$ is as defined in table Z.

Table I-2 provides 14 compounds I-2.001 to I-2.014 of formula Id wherein $R_1$ is H, $R_4$ is 2-pyridyl and $R_2$ is as defined in table Z.

Table I-3 provides 14 compounds I-3.001 to I-3.014 of formula Id wherein $R_1$ is H, $R_4$ is (3-chloro-2-pyridyl) and $R_2$ is as defined in table Z.

Table I-4 provides 14 compounds I-4.001 to I-4.014 of formula Id wherein $R_1$ is $CH_3$, $R_4$ is pyrimidin-2-yl and $R_2$ is as defined in table Z.

Table I-5 provides 14 compounds I-5.001 to I-5.014 of formula Id wherein $R_1$ is $CH_3$, $R_4$ is 2-pyridyl and $R_2$ is as defined in table Z.

Table I-6 provides 14 compounds I-6.001 to I-6.014 of formula Id wherein $R_1$ is $CH_3$, $R_4$ is (3-chloro-2-pyridyl) and $R_2$ is as defined in table Z.

Table I-7 provides 14 compounds I-7.001 to I-7.014 of formula Id wherein $R_1$ is allyl, $R_4$ is pyrimidin-2-yl and $R_2$ is as defined in table Z.

Table I-8 provides 14 compounds I-8.001 to I-8.014 of formula Id wherein $R_1$ is allyl, $R_4$ is 2-pyridyl and $R_2$ is as defined in table Z.

Table I-9 provides 14 compounds I-9.001 to I-9.014 of formula Id wherein $R_1$ is allyl, $R_4$ is (3-chloro-2-pyridyl) and $R_2$ is as defined in table Z.

Table I-10 provides 14 compounds I-10.001 to I-10.014 of formula Id wherein $R_1$ is prop-2-ynyl, $R_4$ is pyrimidin-2-yl and $R_2$ is as defined in table Z.

Table I-11 provides 14 compounds I-11.001 to I-11.014 of formula Id wherein $R_1$ is prop-2-ynyl, $R_4$ is 2-pyridyl and $R_2$ is as defined in table Z.

Table I-12 provides 14 compounds I-12.001 to I-12.014 of formula Id wherein $R_1$ is prop-2-ynyl, $R_4$ is (3-chloro-2-pyridyl) and $R_2$ is as defined in table Z.

Table I-13 provides 14 compounds I-13.001 to I-13.014 of formula Id wherein $R_1$ is $CH_2Cyp$, $R_4$ is pyrimidin-2-yl and $R_2$ is as defined in table Z.

Table I-14 provides 14 compounds I-14.001 to I-14.014 of formula Id wherein $R_1$ is $CH_2Cyp$, $R_4$ is 2-pyridyl and $R_2$ is as defined in table Z.

Table I-15 provides 14 compounds I-15.001 to I-15.014 of formula Id wherein $R_1$ is $CH_2Cyp$, $R_4$ is (3-chloro-2-pyridyl) and $R_2$ is as defined in table Z.

The compounds of formula I according to the following Tables B-1 to B-15 can be prepared according to the methods described above. The examples which follow are intended to illustrate the invention and show preferred compounds of formula I, in the form of a compound of formula Ie.

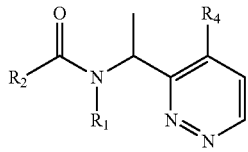

Ie

Table B-1 provides 14 compounds B-1.001 to B-1.014 of formula Ie wherein $R_1$ is H, $R_4$ is pyrimidin-2-yl and $R_2$ is as defined in table Z.

Table B-2 provides 14 compounds B-2.001 to B-2.014 of formula Ie wherein $R_1$ is H, $R_4$ is 2-pyridyl and $R_2$ is as defined in table Z.

Table B-3 provides 14 compounds B-3.001 to B-3.014 of formula Ie wherein $R_1$ is H, $R_4$ is (3-chloro-2-pyridyl) and $R_2$ is as defined in table Z.

Table B-4 provides 14 compounds B-4.001 to B-4.014 of formula Ie wherein $R_1$ is $CH_3$, $R_4$ is pyrimidin-2-yl and $R_2$ is as defined in table Z.

Table B-5 provides 14 compounds B-5.001 to B-5.014 of formula Ie wherein $R_1$ is $CH_3$, $R_4$ is 2-pyridyl and $R_2$ is as defined in table Z.

Table B-6 provides 14 compounds B-6.001 to B-6.014 of formula Ie wherein $R_1$ is $CH_3$, $R_4$ is (3-chloro-2-pyridyl) and $R_2$ is as defined in table Z.

Table B-7 provides 14 compounds B-7.001 to B-7.014 of formula Ie wherein $R_1$ is allyl, $R_4$ is pyrimidin-2-yl and $R_2$ is as defined in table Z.

Table B-8 provides 14 compounds B-8.001 to B-8.014 of formula Ie wherein $R_1$ is allyl, $R_4$ is 2-pyridyl and $R_2$ is as defined in table Z.

Table B-9 provides 14 compounds B-9.001 to B-9.014 of formula Ie wherein $R_1$ is allyl, $R_4$ is (3-chloro-2-pyridyl) and $R_2$ is as defined in table Z.

Table B-10 provides 14 compounds B-10.001 to B-10.014 of formula Ie wherein $R_1$ is prop-2-ynyl, $R_4$ is pyrimidin-2-yl and $R_2$ is as defined in table Z.

Table B-11 provides 14 compounds B-11.001 to B-11.014 of formula Ie wherein $R_1$ is prop-2-ynyl, $R_4$ is 2-pyridyl and $R_2$ is as defined in table Z.

Table B-12 provides 14 compounds B-12.001 to B-12.014 of formula Ie wherein $R_1$ is prop-2-ynyl, $R_4$ is (3-chloro-2-pyridyl) and $R_2$ is as defined in table Z.

Table B-13 provides 14 compounds B-13.001 to B-13.014 of formula Ie wherein $R_1$ is $CH_2Cyp$, $R_4$ is pyrimidin-2-yl and $R_2$ is as defined in table Z.

Table B-14 provides 14 compounds B-14.001 to B-14.014 of formula Ie wherein $R_1$ is $CH_2Cyp$, $R_4$ is 2-pyridyl and $R_2$ is as defined in table Z.

Table B-15 provides 14 compounds B-15.001 to B-15.014 of formula Ie wherein $R_1$ is $CH_2Cyp$, $R_4$ is (3-chloro-2-pyridyl) and $R_2$ is as defined in table Z.

The compounds of formula I according to the following Tables C-1 to C-15 can be prepared according to the methods described above. The examples which follow are intended to illustrate the invention and show preferred compounds of formula I, in the form of a compound of formula If

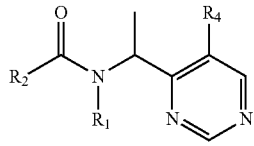

If

Table C-1 provides 14 compounds C-1.001 to C-1.014 of formula If wherein $R_1$ is H, $R_4$ is pyrimidin-2-yl and $R_2$ is as defined in table Z.

Table C-2 provides 14 compounds C-2.001 to C-2.014 of formula If wherein $R_1$ is H, $R_4$ is 2-pyridyl and $R_2$ is as defined in table Z.

Table C-3 provides 14 compounds C-3.001 to C-3.014 of formula If wherein $R_1$ is H, $R_4$ is (3-chloro-2-pyridyl) and $R_2$ is as defined in table Z.

Table C-4 provides 14 compounds C-4.001 to C-4.014 of formula If wherein $R_1$ is $CH_3$, $R_4$ is pyrimidin-2-yl and $R_2$ is as defined in table Z.

Table C-5 provides 14 compounds C-5.001 to C-5.014 of formula If wherein $R_1$ is $CH_3$, $R_4$ is 2-pyridyl and $R_2$ is as defined in table Z.

Table C-6 provides 14 compounds C-6.001 to C-6.014 of formula If wherein $R_1$ is $CH_3$, $R_4$ is (3-chloro-2-pyridyl) and $R_2$ is as defined in table Z.

Table C-7 provides 14 compounds C-7.001 to C-7.014 of formula If wherein $R_1$ is allyl, $R_4$ is pyrimidin-2-yl and $R_2$ is as defined in table Z.

Table C-8 provides 14 compounds C-8.001 to C-8.014 of formula If wherein $R_1$ is allyl, $R_4$ is 2-pyridyl and $R_2$ is as defined in table Z.

Table C-9 provides 14 compounds C-9.001 to C-9.014 of formula If wherein $R_1$ is allyl, $R_4$ is (3-chloro-2-pyridyl) and $R_2$ is as defined in table Z.

Table C-10 provides 14 compounds C-10.001 to C-10.014 of formula If wherein $R_1$ is prop-2-ynyl, $R_4$ is pyrimidin-2-yl and $R_2$ is as defined in table Z.

Table C-11 provides 14 compounds C-11.001 to C-11.014 of formula If wherein $R_1$ is prop-2-ynyl, $R_4$ is 2-pyridyl and $R_2$ is as defined in table Z.

Table C-12 provides 14 compounds C-12.001 to C-12.014 of formula If wherein $R_1$ is prop-2-ynyl, $R_4$ is (3-chloro-2-pyridyl) and $R_2$ is as defined in table Z.

Table C-13 provides 14 compounds C-13.001 to C-13.014 of formula If wherein $R_1$ is $CH_2Cyp$, $R_4$ is pyrimidin-2-yl and $R_2$ is as defined in table Z.

Table C-14 provides 14 compounds C-14.001 to C-14.014 of formula If wherein $R_1$ is $CH_2Cyp$, $R_4$ is 2-pyridyl and $R_2$ is as defined in table Z.

Table C-15 provides 14 compounds C-15.001 to C-15.014 of formula If wherein $R_1$ is $CH_2Cyp$, $R_4$ is (3-chloro-2-pyridyl) and $R_2$ is as defined in table Z.

The compounds of formula I according to the following Tables D-1 to D-30 can be prepared according to the methods described above. The examples which follow are intended to illustrate the invention and show preferred compounds of formula I, in the form of a compound of formula Ig

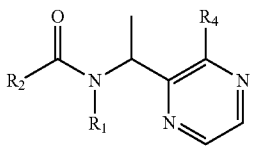

Ig

Table D-1 provides 14 compounds D-1.001 to D-1.014 of formula Ig wherein $R_1$ is H, $R_4$ is pyrimidin-2-yl and $R_2$ is as defined in table Z.

Table D-2 provides 14 compounds D-2.001 to D-2.014 of formula Ig wherein $R_1$ is H, $R_4$ is 2-pyridyl and $R_2$ is as defined in table Z.

Table D-3 provides 14 compounds D-3.001 to D-3.014 of formula Ig wherein $R_1$ is H, $R_4$ is (3-chloro-2-pyridyl) and $R_2$ is as defined in table Z.

Table D-4 provides 14 compounds D-4.001 to D-4.014 of formula Ig wherein $R_1$ is $CH_3$, $R_4$ is pyrimidin-2-yl and $R_2$ is as defined in table Z.

Table D-5 provides 14 compounds D-5.001 to D-5.014 of formula Ig wherein $R_1$ is $CH_3$, $R_4$ is 2-pyridyl and $R_2$ is as defined in table Z.

Table D-6 provides 14 compounds D-6.001 to D-6.014 of formula Ig wherein $R_1$ is $CH_3$, $R_4$ is (3-chloro-2-pyridyl) and $R_2$ is as defined in table Z.

Table D-7 provides 14 compounds D-7.001 to D-7.014 of formula Ig wherein $R_1$ is allyl, $R_4$ is pyrimidin-2-yl and $R_2$ is as defined in table Z.

Table D-8 provides 14 compounds D-8.001 to D-8.014 of formula Ig wherein $R_1$ is allyl, $R_4$ is 2-pyridyl and $R_2$ is as defined in table Z.

Table D-9 provides 14 compounds D-9.001 to D-9.014 of formula Ig wherein $R_1$ is allyl, $R_4$ is (3-chloro-2-pyridyl) and $R_2$ is as defined in table Z.

Table D-10 provides 14 compounds D-10.001 to D-10.014 of formula Ig wherein $R_1$ is prop-2-ynyl, $R_4$ is pyrimidin-2-yl and $R_2$ is as defined in table Z.

Table D-11 provides 14 compounds D-11.001 to D-11.014 of formula Ig wherein $R_1$ is prop-2-ynyl, $R_4$ is 2-pyridyl and $R_2$ is as defined in table Z.

Table D-12 provides 14 compounds D-12.001 to D-12.014 of formula Ig wherein $R_1$ is prop-2-ynyl, $R_4$ is (3-chloro-2-pyridyl) and $R_2$ is as defined in table Z.

Table D-13 provides 14 compounds D-13.001 to D-13.014 of formula Ig wherein $R_1$ is $CH_2Cyp$, $R_4$ is pyrimidin-2-yl and $R_2$ is as defined in table Z.

Table D-14 provides 14 compounds D-14.001 to D-14.014 of formula Ig wherein $R_1$ is $CH_2Cyp$, $R_4$ is 2-pyridyl and $R_2$ is as defined in table Z.

Table D-15 provides 14 compounds D-15.001 to D-15.014 of formula Ig wherein $R_1$ is $CH_2Cyp$, $R_4$ is (3-chloro-2-pyridyl) and $R_2$ is as defined in table Z.

Table D-16 provides 14 compounds D-16.001 to D-16.014 of formula Ig wherein $R_1$ is H, $R_4$ is 5-fluoro-2-pyridyl and $R_2$ is as defined in table Z.

Table D-17 provides 14 compounds D-17.001 to D-17.014 of formula Ig wherein $R_1$ is H, $R_4$ is 5-bromo-2-pyridyl and $R_2$ is as defined in table Z.

Table D-18 provides 14 compounds D-18.001 to D-18.014 of formula Ig wherein $R_1$ is H, $R_4$ is 5-bromo-pyrimidin-2-yl and $R_2$ is as defined in table Z.

Table D-19 provides 14 compounds D-19.001 to D-19.014 of formula Ig wherein $R_1$ is $CH_3$, $R_4$ is 5-fluoro-2-pyridyl and $R_2$ is as defined in table Z.

Table D-20 provides 14 compounds D-20.001 to D-20.014 of formula Ig wherein $R_1$ is $CH_3$, $R_4$ is 5-bromo-2-pyridyl and $R_2$ is as defined in table Z.

Table D-21 provides 14 compounds D-21.001 to D-21.014 of formula Ig wherein $R_1$ is $CH_3$, $R_4$ is 5-bromo-pyrimidin-2-yl and $R_2$ is as defined in table Z.

Table D-22 provides 14 compounds D-22.001 to D-22.014 of formula Ig wherein $R_1$ is allyl, $R_4$ is 5-fluoro-2-pyridyl and $R_2$ is as defined in table Z.

Table D-23 provides 14 compounds D-23.001 to D-23.014 of formula Ig wherein $R_1$ is allyl, $R_4$ is 5-bromo-2-pyridyl and $R_2$ is as defined in table Z.

Table D-24 provides 14 compounds D-24.001 to D-24.014 of formula Ig wherein $R_1$ is allyl, $R_4$ is 5-bromo-pyrimidin-2-yl and $R_2$ is as defined in table Z.

Table D-25 provides 14 compounds D-25.001 to D-25.014 of formula Ig wherein $R_1$ is prop-2-ynyl, $R_4$ is 5-fluoro-2-pyridyl and $R_2$ is as defined in table Z.

Table D-26 provides 14 compounds D-26.001 to D-26.014 of formula Ig wherein $R_1$ is prop-2-ynyl, $R_4$ is 5-bromo-2-pyridyl and $R_2$ is as defined in table Z.

Table D-27 provides 14 compounds D-27.001 to D-27.014 of formula Ig wherein $R_1$ is prop-2-ynyl, $R_4$ is 5-bromo-pyrimidin-2-yl and $R_2$ is as defined in table Z.

Table D-28 provides 14 compounds D-28.001 to D-28.014 of formula Ig wherein $R_1$ is $CH_2Cyp$, $R_4$ is 5-fluoro-2-pyridyl and $R_2$ is as defined in table Z.

Table D-29 provides 14 compounds D-29.001 to D-29.014 of formula Ig wherein $R_1$ is $CH_2Cyp$, $R_4$ is 5-bromo-2-pyridyl and $R_2$ is as defined in table Z.

Table D-30 provides 14 compounds D-30.001 to D-30.014 of formula Ig wherein $R_1$ is $CH_2Cyp$, $R_4$ is 5-bromo-pyrimidin-2-yl and $R_2$ is as defined in table Z.

The compounds of formula I according to the following Tables E-1 to E-15 can be prepared according to the methods described above. The examples which follow are intended to illustrate the invention and show preferred compounds of formula I, in the form of a compound of formula Ik

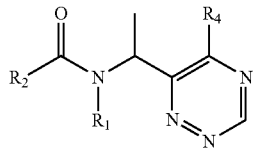

Ik

Table E-1 provides 14 compounds E-1.001 to E-1.014 of formula Ik wherein $R_1$ is H, $R_4$ is pyrimidin-2-yl and $R_2$ is as defined in table Z.

Table E-2 provides 14 compounds E-2.001 to E-2.014 of formula Ik wherein $R_1$ is H, $R_4$ is 2-pyridyl and $R_2$ is as defined in table Z.

Table E-3 provides 14 compounds E-3.001 to E-3.014 of formula Ik wherein $R_1$ is H, $R_4$ is (3-chloro-2-pyridyl) and $R_2$ is as defined in table Z.

Table E-4 provides 14 compounds E-4.001 to E-4.014 of formula Ik wherein $R_1$ is $CH_3$, $R_4$ is pyrimidin-2-yl and $R_2$ is as defined in table Z.

Table E-5 provides 14 compounds E-5.001 to E-5.014 of formula Ik wherein $R_1$ is $CH_3$, $R_4$ is 2-pyridyl and $R_2$ is as defined in table Z.

Table E-6 provides 14 compounds E-6.001 to E-6.014 of formula Ik wherein $R_1$ is $CH_3$, $R_4$ is (3-chloro-2-pyridyl) and $R_2$ is as defined in table Z.

Table E-7 provides 14 compounds E-7.001 to E-7.014 of formula Ik wherein $R_1$ is allyl, $R_4$ is pyrimidin-2-yl and $R_2$ is as defined in table Z.

Table E-8 provides 14 compounds E-8.001 to E-8.014 of formula Ik wherein $R_1$ is allyl, $R_4$ is 2-pyridyl and $R_2$ is as defined in table Z.

Table E-9 provides 14 compounds E-9.001 to E-9.014 of formula Ik wherein $R_1$ is allyl, $R_4$ is (3-chloro-2-pyridyl) and $R_2$ is as defined in table Z.

Table E-10 provides 14 compounds E-10.001 to E-10.014 of formula Ik wherein $R_1$ is prop-2-ynyl, $R_4$ is pyrimidin-2-yl and $R_2$ is as defined in table Z.

Table E-11 provides 14 compounds E-11.001 to E-11.014 of formula Ik wherein $R_1$ is prop-2-ynyl, $R_4$ is 2-pyridyl and $R_2$ is as defined in table Z.

Table E-12 provides 14 compounds E-12.001 to E-12.014 of formula Ik wherein $R_1$ is prop-2-ynyl, $R_4$ is (3-chloro-2-pyridyl) and $R_2$ is as defined in table Z.

Table E-13 provides 14 compounds E-13.001 to E-13.014 of formula Ik wherein $R_1$ is $CH_2Cyp$, $R_4$ is pyrimidin-2-yl and $R_2$ is as defined in table Z.

Table E-14 provides 14 compounds E-14.001 to E-14.014 of formula Ik wherein $R_1$ is $CH_2Cyp$, $R_4$ is 2-pyridyl and $R_2$ is as defined in table Z.

Table E-15 provides 14 compounds E-15.001 to E-15.014 of formula Ik wherein $R_1$ is $CH_2Cyp$, $R_4$ is (3-chloro-2-pyridyl) and $R_2$ is as defined in table Z.

The compounds of formula I according to the following Tables F-1 to F-15 can be prepared according to the methods described above. The examples which follow are intended to illustrate the invention and show preferred compounds of formula I, in the form of a compound of formula IL.

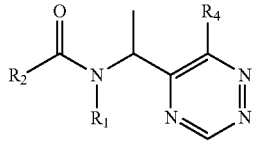

IL

Table F-1 provides 14 compounds F-1.001 to F-1.014 of formula IL wherein $R_1$ is H, $R_4$ is pyrimidin-2-yl and $R_2$ is as defined in table Z.

Table F-2 provides 14 compounds F-2.001 to F-2.014 of formula IL wherein $R_1$ is H, $R_4$ is 2-pyridyl and $R_2$ is as defined in table Z.

Table F-3 provides 14 compounds F-3.001 to F-3.014 of formula IL wherein $R_1$ is H, $R_4$ is (3-chloro-2-pyridyl) and $R_2$ is as defined in table Z.

Table F-4 provides 14 compounds F-4.001 to F-4.014 of formula IL wherein $R_1$ is $CH_3$, $R_4$ is pyrimidin-2-yl and $R_2$ is as defined in table Z.

Table F-5 provides 14 compounds F-5.001 to F-5.014 of formula IL wherein $R_1$ is $CH_3$, $R_4$ is 2-pyridyl and $R_2$ is as defined in table Z.

Table F-6 provides 14 compounds F-6.001 to F-6.014 of formula IL wherein $R_1$ is $CH_3$, $R_4$ is (3-chloro-2-pyridyl) and $R_2$ is as defined in table Z.

Table F-7 provides 14 compounds F-7.001 to F-7.014 of formula IL wherein $R_1$ is allyl, $R_4$ is pyrimidin-2-yl and $R_2$ is as defined in table Z.

Table F-8 provides 14 compounds F-8.001 to F-8.014 of formula IL wherein $R_1$ is allyl, $R_4$ is 2-pyridyl and $R_2$ is as defined in table Z.

Table F-9 provides 14 compounds F-9.001 to F-9.014 of formula IL wherein $R_1$ is allyl, $R_4$ is (3-chloro-2-pyridyl) and $R_2$ is as defined in table Z.

Table F-10 provides 14 compounds F-10.001 to F-10.014 of formula IL wherein $R_1$ is prop-2-ynyl, $R_4$ is pyrimidin-2-yl and $R_2$ is as defined in table Z.

Table F-11 provides 14 compounds F-11.001 to F-11.014 of formula IL wherein $R_1$ is prop-2-ynyl, $R_4$ is 2-pyridyl and $R_2$ is as defined in table Z.

Table F-12 provides 14 compounds F-12.001 to F-12.014 of formula IL wherein $R_1$ is prop-2-ynyl, $R_4$ is (3-chloro-2-pyridyl) and $R_2$ is as defined in table Z.

Table F-13 provides 14 compounds F-13.001 to F-13.014 of formula IL wherein $R_1$ is $CH_2Cyp$, $R_4$ is pyrimidin-2-yl and $R_2$ is as defined in table Z.

Table F-14 provides 14 compounds F-14.001 to F-14.014 of formula IL wherein $R_1$ is $CH_2Cyp$, $R_4$ is 2-pyridyl and $R_2$ is as defined in table Z.

Table F-15 provides 14 compounds F-15.001 to F-15.014 of formula IL wherein $R_1$ is $CH_2Cyp$, $R_4$ is (3-chloro-2-pyridyl) and $R_2$ is as defined in table Z.

The compounds of formula I according to the following Tables J-1 to J-15 can be prepared according to the methods described above. The examples which follow are intended to illustrate the invention and show preferred compounds of formula I, in the form of a compound of formula Ij.

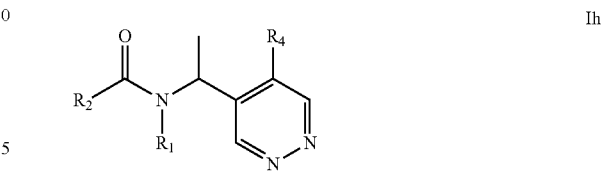

Ih

Table J-1 provides 14 compounds J-1.001 to J-1.014 of formula Ih wherein $R_1$ is H, $R_4$ is pyrimidin-2-yl and $R_2$ is as defined in table Z.

Table J-2 provides 14 compounds J-2.001 to J-2.014 of formula Ih wherein $R_1$ is H, $R_4$ is 2-pyridyl and $R_2$ is as defined in table Z.

Table J-3 provides 14 compounds J-3.001 to J-3.014 of formula Ih wherein $R_1$ is H, $R_4$ is (3-chloro-2-pyridyl) and $R_2$ is as defined in table Z.

Table J-4 provides 14 compounds J-4.001 to J-4.014 of formula Ih wherein $R_1$ is $CH_3$, $R_4$ is pyrimidin-2-yl and $R_2$ is as defined in table Z.

Table J-5 provides 14 compounds J-5.001 to J-5.014 of formula Ih wherein $R_1$ is $CH_3$, $R_4$ is 2-pyridyl and $R_2$ is as defined in table Z.

Table J-6 provides 14 compounds J-6.001 to J-6.014 of formula Ih wherein $R_1$ is $CH_3$, $R_4$ is (3-chloro-2-pyridyl) and $R_2$ is as defined in table Z.

Table J-7 provides 14 compounds J-7.001 to J-7.014 of formula Ih wherein $R_1$ is allyl, $R_4$ is pyrimidin-2-yl and $R_2$ is as defined in table Z.

Table J-8 provides 14 compounds J-8.001 to J-8.014 of formula Ih wherein $R_1$ is allyl, $R_4$ is 2-pyridyl and $R_2$ is as defined in table Z.

Table J-9 provides 14 compounds J-9.001 to J-9.014 of formula Ih wherein $R_1$ is allyl, $R_4$ is (3-chloro-2-pyridyl) and $R_2$ is as defined in table Z.

Table J-10 provides 14 compounds J-10.001 to J-10.014 of formula Ih wherein $R_1$ is prop-2-ynyl, $R_4$ is pyrimidin-2-yl and $R_2$ is as defined in table Z.

Table J-11 provides 14 compounds J-11.001 to J-11.014 of formula Ih wherein $R_1$ is prop-2-ynyl, $R_4$ is 2-pyridyl and $R_2$ is as defined in table Z.

Table J-12 provides 14 compounds J-12.001 to J-12.014 of formula Ih wherein $R_1$ is prop-2-ynyl, $R_4$ is (3-chloro-2-pyridyl) and $R_2$ is as defined in table Z.

Table J-13 provides 14 compounds J-13.001 to J-13.014 of formula Ih wherein $R_1$ is $CH_2Cyp$, $R_4$ is pyrimidin-2-yl and $R_2$ is as defined in table Z.

Table J-14 provides 14 compounds J-14.001 to J-14.014 of formula Ih wherein $R_1$ is $CH_2Cyp$, $R_4$ is 2-pyridyl and $R_2$ is as defined in table Z.

Table J-15 provides 14 compounds J-15.001 to J-15.014 of formula Ih wherein $R_1$ is $CH_2Cyp$, $R_4$ is (3-chloro-2-pyridyl) and $R_2$ is as defined in table Z.

The compounds of formula I according to the following Tables K-1 to K-15 can be prepared according to the methods described above. The examples which follow are intended to illustrate the invention and show preferred compounds of formula I, in the form of a compound of formula Ii.

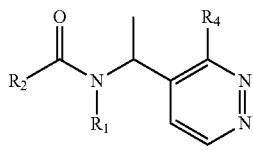

Ii

Table K-1 provides 14 compounds K-1.001 to K-1.014 of formula Ii wherein $R_1$ is H, $R_4$ is pyrimidin-2-yl and $R_2$ is as defined in table Z.

Table K-2 provides 14 compounds K-2.001 to K-2.014 of formula Ii wherein $R_1$ is H, $R_4$ is 2-pyridyl and $R_2$ is as defined in table Z.

Table K-3 provides 14 compounds K-3.001 to K-3.014 of formula Ii wherein $R_1$ is H, $R_4$ is (3-chloro-2-pyridyl) and $R_2$ is as defined in table Z.

Table K-4 provides 14 compounds K-4.001 to K-4.014 of formula Ii wherein $R_1$ is $CH_3$, $R_4$ is pyrimidin-2-yl and $R_2$ is as defined in table Z.

Table K-5 provides 14 compounds K-5.001 to K-5.014 of formula Ii wherein $R_1$ is $CH_3$, $R_4$ is 2-pyridyl and $R_2$ is as defined in table Z.

Table K-6 provides 14 compounds K-6.001 to K-6.014 of formula Ii wherein $R_1$ is $CH_3$, $R_4$ is (3-chloro-2-pyridyl) and $R_2$ is as defined in table Z.

Table K-7 provides 14 compounds K-7.001 to K-7.014 of formula Ii wherein $R_1$ is allyl, $R_4$ is pyrimidin-2-yl and $R_2$ is as defined in table Z.

Table K-8 provides 14 compounds K-8.001 to K-8.014 of formula Ii wherein $R_1$ is allyl, $R_4$ is 2-pyridyl and $R_2$ is as defined in table Z.

Table K-9 provides 14 compounds K-9.001 to K-9.014 of formula Ii wherein $R_1$ is allyl, $R_4$ is (3-chloro-2-pyridyl) and $R_2$ is as defined in table Z.

Table K-10 provides 14 compounds K-10.001 to K-10.014 of formula Ii wherein $R_1$ is prop-2-ynyl, $R_4$ is pyrimidin-2-yl and $R_2$ is as defined in table Z.

Table K-11 provides 14 compounds K-11.001 to K-11.014 of formula Ii wherein $R_1$ is prop-2-ynyl, $R_4$ is 2-pyridyl and $R_2$ is as defined in table Z.

Table K-12 provides 14 compounds K-12.001 to K-12.014 of formula Ii wherein $R_1$ is prop-2-ynyl, $R_4$ is (3-chloro-2-pyridyl) and $R_2$ is as defined in table Z.

Table K-13 provides 14 compounds K-13.001 to K-13.014 of formula Ii wherein $R_1$ is $CH_2Cyp$, $R_4$ is pyrimidin-2-yl and $R_2$ is as defined in table Z.

Table K-14 provides 14 compounds K-14.001 to K-14.014 of formula Ii wherein $R_1$ is $CH_2Cyp$, $R_4$ is 2-pyridyl and $R_2$ is as defined in table Z.

Table K-15 provides 14 compounds K-15.001 to K-15.014 of formula Ii wherein $R_1$ is $CH_2Cyp$, $R_4$ is (3-chloro-2-pyridyl) and $R_2$ is as defined in table Z.

The compounds of formula I according to the following Tables L-1 to L-15 can be prepared according to the methods described above. The examples which follow are intended to illustrate the invention and show preferred compounds of formula I, in the form of a compound of formula Ij.

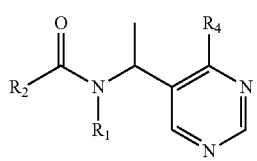

Ij

Table L-1 provides 14 compounds L-1.001 to L-1.014 of formula Ij wherein $R_1$ is H, $R_4$ is pyrimidin-2-yl and $R_2$ is as defined in table Z.

Table L-2 provides 14 compounds L-2.001 to L-2.014 of formula Ij wherein $R_1$ is H, $R_4$ is 2-pyridyl and $R_2$ is as defined in table Z.

Table L-3 provides 14 compounds L-3.001 to L-3.014 of formula Ij wherein $R_1$ is H, $R_4$ is (3-chloro-2-pyridyl) and $R_2$ is as defined in table Z.

Table L-4 provides 14 compounds L-4.001 to L-4.014 of formula Ij wherein $R_1$ is $CH_3$, $R_4$ is pyrimidin-2-yl and $R_2$ is as defined in table Z.

Table L-5 provides 14 compounds L-5.001 to L-5.014 of formula Ij wherein $R_1$ is $CH_3$, $R_4$ is 2-pyridyl and $R_2$ is as defined in table Z.

Table L-6 provides 14 compounds L-6.001 to L-6.014 of formula Ij wherein $R_1$ is $CH_3$, $R_4$ is (3-chloro-2-pyridyl) and $R_2$ is as defined in table Z.

Table L-7 provides 14 compounds L-7.001 to L-7.014 of formula Ij wherein $R_1$ is allyl, $R_4$ is pyrimidin-2-yl and $R_2$ is as defined in table Z.

Table L-8 provides 14 compounds L-8.001 to L-8.014 of formula Ij wherein $R_1$ is allyl, $R_4$ is 2-pyridyl and $R_2$ is as defined in table Z.

Table L-9 provides 14 compounds L-9.001 to L-9.014 of formula Ij wherein $R_1$ is allyl, $R_4$ is (3-chloro-2-pyridyl) and $R_2$ is as defined in table Z.

Table L-10 provides 14 compounds L-10.001 to L-10.014 of formula Ij wherein $R_1$ is prop-2-ynyl, $R_4$ is pyrimidin-2-yl and $R_2$ is as defined in table Z.

Table L-11 provides 14 compounds L-11.001 to L-11.014 of formula Ij wherein $R_1$ is prop-2-ynyl, $R_4$ is 2-pyridyl and $R_2$ is as defined in table Z.

Table L-12 provides 14 compounds L-12.001 to L-12.014 of formula Ij wherein $R_1$ is prop-2-ynyl, $R_4$ is (3-chloro-2-pyridyl) and $R_2$ is as defined in table Z.

Table L-13 provides 14 compounds L-13.001 to L-13.014 of formula Ij wherein $R_1$ is $CH_2Cyp$, $R_4$ is pyrimidin-2-yl and $R_2$ is as defined in table Z.

Table L-14 provides 14 compounds L-14.001 to L-14.014 of formula Ij wherein $R_1$ is $CH_2Cyp$, $R_4$ is 2-pyridyl and $R_2$ is as defined in table Z.

Table L-15 provides 14 compounds L-15.001 to L-15.014 of formula Ij wherein $R_1$ is $CH_2Cyp$, $R_4$ is (3-chloro-2-pyridyl) and $R_2$ is as defined in table Z.

The compounds of formula I according to the following Tables M-1 to M-60 can be prepared according to the methods described above. The examples which follow are intended to illustrate the invention and show preferred compounds of formula I, in the form of a compound of formula Ik.

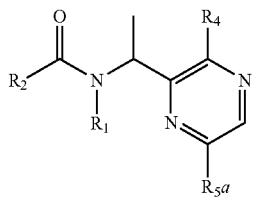

Table M-1 provides 14 compounds M-1.001 to M-1.014 of formula Ik wherein $R_1$ is H, $R_4$ is pyrimidin-2-yl, $R_5a$ is Br and $R_2$ are as defined in table Z.

Table M-2 provides 14 compounds M-2.001 to M-2.014 of formula Ik wherein $R_1$ is H, $R_4$ is pyrimidin-2-yl, $R_5a$ is $CH_3$ and $R_2$ are as defined in table Z.

Table M-3 provides 14 compounds M-3.001 to M-3.014 of formula Ik wherein $R_1$ is H, $R_4$ is pyrimidin-2-yl, $R_5a$ is cyclopropyl and $R_2$ are as defined in table Z.

Table M-4 provides 14 compounds M-4.001 to M-4.014 of formula Ik wherein $R_1$ is H, $R_4$ is 2-pyridyl, $R_5a$ is Br and $R_2$ are as defined in table Z.

Table M-5 provides 14 compounds M-5.001 to M-5.014 of formula Ik wherein $R_1$ is H, $R_4$ is 2-pyridyl, $R_5a$ is $CH_3$ and $R_2$ are as defined in table Z.

Table M-6 provides 14 compounds M-6.001 to M-6.014 of formula Ik wherein $R_1$ is H, $R_4$ is 2-pyridyl, $R_5a$ is cyclopropyl and $R_2$ are as defined in table Z.

Table M-7 provides 14 compounds M-7.001 to M-7.014 of formula Ik wherein $R_1$ is H, $R_4$ is 5-fluoro-2-pyridyl, $R_5a$ is Br and $R_2$ are as defined in table Z.

Table M-8 provides 14 compounds M-8.001 to M-8.014 of formula Ik wherein $R_1$ is H, $R_4$ is 5-fluoro-2-pyridyl, $R_5a$ is $CH_3$ and $R_2$ are as defined in table Z.

Table M-9 provides 14 compounds M-9.001 to M-9.014 of formula Ik wherein $R_1$ is H, $R_4$ is 5-fluoro-2-pyridyl, $R_5a$ is cyclopropyl and $R_2$ are as defined in table Z.

Table M-10 provides 14 compounds M-10.001 to M-10.014 of formula Ik wherein $R_1$ is H, $R_4$ is 5-bromo-2-pyridyl, $R_5a$ is Br and $R_2$ are as defined in table Z.

Table M-11 provides 14 compounds M-11.001 to M-11.014 of formula Ik wherein $R_1$ is H, $R_4$ is 5-bromo-2-pyridyl, $R_5a$ is $CH_3$ and $R_2$ are as defined in table Z.

Table M-12 provides 14 compounds M-12.001 to M-12.014 of formula Ik wherein $R_1$ is H, $R_4$ is 5-bromo-2-pyridyl, $R_5a$ is cyclopropyl and $R_2$ are as defined in table Z.

Table M-13 provides 14 compounds M-13.001 to M-13.014 of formula Ik wherein $R_1$ is H, $R_4$ is 5-bromo-2-pyrimidyl, $R_5a$ is Br and $R_2$ are as defined in table Z.

Table M-14 provides 14 compounds M-14.001 to M-14.014 of formula Ik wherein $R_1$ is H, $R_4$ is 5-bromo-2-pyrimidyl, $R_5a$ is $CH_3$ and $R_2$ are as defined in table Z.

Table M-15 provides 14 compounds M-15.001 to M-15.014 of formula Ik wherein $R_1$ is H, $R_4$ is 5-bromo-2-pyrimidyl, $R_5a$ is cyclopropyl and $R_2$ are as defined in table Z.

Table M-16 provides 14 compounds M-16.001 to M-16.014 of formula Ik wherein $R_1$ is $CH_3$, $R_4$ is pyrimidin-2-yl, $R_5a$ is Br and $R_2$ are as defined in table Z.

Table M-17 provides 14 compounds M-17.001 to M-17.014 of formula Ik wherein $R_1$ is $CH_3$, $R_4$ is pyrimidin-2-yl, $R_5a$ is $CH_3$ and $R_2$ are as defined in table Z.

Table M-18 provides 14 compounds M-18.001 to M-18.014 of formula Ik wherein $R_1$ is $CH_3$, $R_4$ is pyrimidin-2-yl, $R_5a$ is cyclopropyl and $R_2$ are as defined in table Z.

Table M-19 provides 14 compounds M-19.001 to M-19.014 of formula Ik wherein $R_1$ is $CH_3$, $R_4$ is 2-pyridyl, $R_5a$ is Br and $R_2$ are as defined in table Z.

Table M-20 provides 14 compounds M-20.001 to M-20.014 of formula Ik wherein $R_1$ is $CH_3$, $R_4$ is 2-pyridyl, $R_5a$ is $CH_3$ and $R_2$ are as defined in table Z.

Table M-21 provides 14 compounds M-21.001 to M-21.014 of formula Ik wherein $R_1$ is $CH_3$, $R_4$ is 2-pyridyl, $R_5a$ is cyclopropyl and $R_2$ are as defined in table Z.

Table M-22 provides 14 compounds M-22.001 to M-22.014 of formula Ik wherein $R_1$ is $CH_3$, $R_4$ is 5-fluoro-2-pyridyl, $R_5a$ is Br and $R_2$ are as defined in table Z.

Table M-23 provides 14 compounds M-23.001 to M-23.014 of formula Ik wherein $R_1$ is $CH_3$, $R_4$ is 5-fluoro-2-pyridyl, $R_5a$ is $CH_3$ and $R_2$ are as defined in table Z.

Table M-24 provides 14 compounds M-24.001 to M-24.014 of formula Ik wherein $R_1$ is $CH_3$, $R_4$ is 5-fluoro-2-pyridyl, $R_5a$ is cyclopropyl and $R_2$ are as defined in table Z.

Table M-25 provides 14 compounds M-25.001 to M-25.014 of formula Ik wherein $R_1$ is $CH_3$, $R_4$ is 5-bromo-2-pyridyl, $R_5a$ is Br and $R_2$ are as defined in table Z.

Table M-26 provides 14 compounds M-26.001 to M-26.014 of formula Ik wherein $R_1$ is $CH_3$, $R_4$ is 5-bromo-2-pyridyl, $R_5a$ is $CH_3$ and $R_2$ are as defined in table Z.

Table M-27 provides 14 compounds M-27.001 to M-27.014 of formula Ik wherein $R_1$ is $CH_3$, $R_4$ is 5-bromo-2-pyridyl, $R_5a$ is cyclopropyl and $R_2$ are as defined in table Z.

Table M-28 provides 14 compounds M-28.001 to M-28.014 of formula Ik wherein $R_1$ is $CH_3$, $R_4$ is 5-bromo-2-pyrimidyl, $R_5a$ is Br and $R_2$ are as defined in table Z.

Table M-29 provides 14 compounds M-29.001 to M-29.014 of formula Ik wherein $R_1$ is $CH_3$, $R_4$ is 5-bromo-2-pyrimidyl, $R_5a$ is $CH_3$ and $R_2$ are as defined in table Z.

Table M-30 provides 14 compounds M-30.001 to M-30.014 of formula Ik wherein $R_1$ is $CH_3$, $R_4$ is 5-bromo-2-pyrimidyl, $R_5a$ is cyclopropyl and $R_2$ are as defined in table Z.

Table M-31 provides 14 compounds M-31.001 to M-31.014 of formula Ik wherein $R_1$ is prop-2-ynyl, $R_4$ is pyrimidin-2-yl, $R_5a$ is Br and $R_2$ are as defined in table Z.

Table M-32 provides 14 compounds M-32.001 to M-32.014 of formula Ik wherein $R_1$ is prop-2-ynyl, $R_4$ is pyrimidin-2-yl, $R_5a$ is $CH_3$ and $R_2$ are as defined in table Z.

Table M-33 provides 14 compounds M-33.001 to M-33.014 of formula Ik wherein $R_1$ is prop-2-ynyl, $R_4$ is pyrimidin-2-yl, $R_5a$ is cyclopropyl and $R_2$ are as defined in table Z.

Table M-34 provides 14 compounds M-34.001 to M-34.014 of formula Ik wherein $R_1$ is prop-2-ynyl, $R_4$ is 2-pyridyl, $R_5a$ is Br and $R_2$ are as defined in table Z.

Table M-35 provides 14 compounds M-35.001 to M-35.014 of formula Ik wherein $R_1$ is prop-2-ynyl, $R_4$ is 2-pyridyl, $R_5a$ is $CH_3$ and $R_2$ are as defined in table Z.

Table M-36 provides 14 compounds M-36.001 to M-36.014 of formula Ik wherein $R_1$ is prop-2-ynyl, $R_4$ is 2-pyridyl, $R_5a$ is cyclopropyl and $R_2$ are as defined in table Z.

Table M-37 provides 14 compounds M-37.001 to M-37.014 of formula Ik wherein $R_1$ is prop-2-ynyl, $R_4$ is 5-fluoro-2-pyridyl, $R_5a$ is Br and $R_2$ are as defined in table Z.

Table M-38 provides 14 compounds M-38.001 to M-38.014 of formula Ik wherein $R_1$ is prop-2-ynyl, $R_4$ is 5-fluoro-2-pyridyl, $R_5a$ is $CH_3$ and $R_2$ are as defined in table Z.

Table M-39 provides 14 compounds M-39.001 to M-39.014 of formula Ik wherein $R_1$ is prop-2-ynyl, $R_4$ is 5-fluoro-2-pyridyl, $R_5a$ is cyclopropyl and $R_2$ are as defined in table Z.

Table M-40 provides 14 compounds M-40.001 to M-40.014 of formula Ik wherein $R_1$ is prop-2-ynyl, $R_4$ is 5-bromo-2-pyridyl, $R_5a$ is Br and $R_2$ are as defined in table Z.

Table M-41 provides 14 compounds M-41.001 to M-41.014 of formula Ik wherein $R_1$ is prop-2-ynyl, $R_4$ is 5-bromo-2-pyridyl, $R_5a$ is $CH_3$ and $R_2$ are as defined in table Z.

Table M-42 provides 14 compounds M-42.001 to M-42.014 of formula Ik wherein $R_1$ is prop-2-ynyl, $R_4$ is 5-bromo-2-pyridyl, $R_5a$ is cyclopropyl and $R_2$ are as defined in table Z.

Table M-43 provides 14 compounds M-43.001 to M-43.014 of formula Ik wherein $R_1$ is prop-2-ynyl, $R_4$ is 5-bromo-2-pyrimidyl, $R_5a$ is Br and $R_2$ are as defined in table Z.

Table M-44 provides 14 compounds M-44.001 to M-44.014 of formula Ik wherein $R_1$ is prop-2-ynyl, $R_4$ is 5-bromo-2-pyrimidyl, $R_5a$ is $CH_3$ and $R_2$ are as defined in table Z.

Table M-45 provides 14 compounds M-45.001 to M-45.014 of formula Ik wherein $R_1$ is prop-2-ynyl, $R_4$ is 5-bromo-2-pyrimidyl, $R_5a$ is cyclopropyl and $R_2$ are as defined in table Z.

Table M-46 provides 14 compounds M-46.001 to M-46.014 of formula Ik wherein $R_1$ is $CH_2Cyp$, $R_4$ is pyrimidin-2-yl, $R_5a$ is Br and $R_2$ are as defined in table Z.

Table M-47 provides 14 compounds M-47.001 to M-47.014 of formula Ik wherein $R_1$ is $CH_2Cyp$, $R_4$ is pyrimidin-2-yl, $R_5a$ is $CH_3$ and $R_2$ are as defined in table Z.

Table M-48 provides 14 compounds M-48.001 to M-48.014 of formula Ik wherein $R_1$ is $CH_2Cyp$, $R_4$ is pyrimidin-2-yl, $R_5a$ is cyclopropyl and $R_2$ are as defined in table Z.

Table M-49 provides 14 compounds M-49.001 to M-49.014 of formula Ik wherein $R_1$ is $CH_2Cyp$, $R_4$ is 2-pyridyl, $R_5a$ is Br and $R_2$ are as defined in table Z.

Table M-50 provides 14 compounds M-50.001 to M-50.014 of formula Ik wherein $R_1$ is $CH_2Cyp$, $R_4$ is 2-pyridyl, $R_5a$ is $CH_3$ and $R_2$ are as defined in table Z.

Table M-51 provides 14 compounds M-51.001 to M-51.014 of formula Ik wherein $R_1$ is $CH_2Cyp$, $R_4$ is 2-pyridyl, $R_5a$ is cyclopropyl and $R_2$ are as defined in table Z.

Table M-52 provides 14 compounds M-52.001 to M-52.014 of formula Ik wherein $R_1$ is $CH_2Cyp$, $R_4$ is 5-fluoro-2-pyridyl, $R_5a$ is Br and $R_2$ are as defined in table Z.

Table M-53 provides 14 compounds M-53.001 to M-53.014 of formula Ik wherein $R_1$ is $CH_2Cyp$, $R_4$ is 5-fluoro-2-pyridyl, $R_5a$ is $CH_3$ and $R_2$ are as defined in table Z.

Table M-54 provides 14 compounds M-54.001 to M-54.014 of formula Ik wherein $R_1$ is $CH_2Cyp$, $R_4$ is 5-fluoro-2-pyridyl, $R_5a$ is cyclopropyl and $R_2$ are as defined in table Z.

Table M-55 provides 14 compounds M-55.001 to M-55.014 of formula Ik wherein $R_1$ is $CH_2Cyp$, $R_4$ is 5-bromo-2-pyridyl, $R_5a$ is Br and $R_2$ are as defined in table Z.

Table M-56 provides 14 compounds M-56.001 to M-56.014 of formula Ik wherein $R_1$ is $CH_2Cyp$, $R_4$ is 5-bromo-2-pyridyl, $R_5a$ is $CH_3$ and $R_2$ are as defined in table Z.

Table M-57 provides 14 compounds M-57.001 to M-57.014 of formula Ik wherein $R_1$ is $CH_2Cyp$, $R_4$ is 5-bromo-2-pyridyl, $R_5a$ is cyclopropyl and $R_2$ are as defined in table Z.

Table M-58 provides 14 compounds M-58.001 to M-58.014 of formula Ik wherein $R_1$ is $CH_2Cyp$, $R_4$ is 5-bromo-2-pyrimidyl, $R_5a$ is Br and $R_2$ are as defined in table Z.

Table M-59 provides 14 compounds M-59.001 to M-59.014 of formula Ik wherein $R_1$ is $CH_2Cyp$, $R_4$ is 5-bromo-2-pyrimidyl, $R_5a$ is $CH_3$ and $R_2$ are as defined in table Z.

Table M-60 provides 14 compounds M-60.001 to M-60.014 of formula Ik wherein $R_1$ is $CH_2Cyp$, $R_4$ is 5-bromo-2-pyrimidyl, $R_5a$ is cyclopropyl and $R_2$ are as defined in table Z.

Also made available are certain intermediate compounds of the amine of formula II

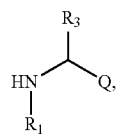

some of which are novel. Specific examples of compounds of formula II are where Q is Q-1 to Q-12, $R_3$ is methyl, and $R_1$ is $CH_2Cyp$; where Q is Q-1 to Q-12, $R_3$ is methyl, and $R_1$ is prop-2-ynyl; where Q is Q-1 to Q-12, $R_3$ is methyl, and $R_1$ is allyl; where Q is Q-1 to Q-12, $R_3$ is methyl, and $R_1$ is hydrogen; and where Q is Q-1 to Q-12, $R_3$ is methyl, and $R_1$ is methyl.

The compounds of formula I according to the invention are preventively and/or curatively valuable active ingredients in the field of pest control, even at low rates of application, which have a very favorable biocidal spectrum and are well tolerated by warm-blooded species, fish and plants. The active ingredients according to the invention act against all or individual developmental stages of normally sensitive, but also resistant, animal pests, such as insects or representatives of the order Acarina. The insecticidal or acaricidal activity of the active ingredients according to the invention can manifest itself directly, i. e. in destruction of the pests, which takes place either immediately or only after some time has elapsed, for example during ecdysis, or indirectly, for example in a reduced oviposition and/or hatching rate.

Examples of the above mentioned animal pests are:
from the order Acarina, for example, Acalitus spp, Aculus spp, Acaricalus spp, Aceria spp, Acarus siro, Amblyomma spp., Argas spp., Boophilus spp., Brevipalpus spp., Bryobia spp, Calipitrimerus spp., Chorioptes spp., Dermanyssus gallinae, Dermatophagoides spp, Eotetranychus spp, Eriophyes spp., Hemitarsonemus spp, Hyalomma spp., Ixodes spp., Olygonychus spp, Ornithodoros spp., Polyphagotarsone latus, Panonychus spp., Phyllocoptruta oleivora, Phytonemus spp, Polyphagotarsonemus spp, Psoroptes spp., Rhipicephalus spp., Rhizoglyphus spp., Sarcoptes spp., Steneotarsonemus spp, Tarsonemus spp. and Tetranychus spp.;

from the order Anoplura, for example,

Haematopinus spp., Linognathus spp., Pediculus spp., Pemphigus spp. and Phylloxera spp.; from the order Coleoptera, for example, Agriotes spp., Amphimallon majale, Anomala orientalis, Anthonomus spp., Aphodius spp, Astylus atromaculatus, Ataenius spp, Atomaria linearis, Chaetocnema tibialis, Cerotoma spp, Conoderus spp, Cosmopolites spp., Cotinis nitida, Curculio spp., Cyclocephala spp, Dermestes spp., Diabrotica spp., Diloboderus abderus, Epilachna spp., Eremnus spp., Heteronychus arator, Hypothenemus hampei, Lagria vilosa, Leptinotarsa decemlineata, Lissorhoptrus spp., Liogenys spp, Maecolaspis spp, Maladera castanea, Megascelis spp, Melighetes aeneus, Melolontha spp., Myochrous armatus, Orycaephilus spp., Otiorhynchus spp., Phyllophaga spp, Phlyctinus spp., Popillia spp., Psylliodes spp., Rhyssomatus aubtilis, Rhizopertha spp., Scarabeidae, Sitophilus spp., Sitotroga spp., Somaticus spp, Sphenophorus spp, Sternechus subsignatus, Tenebrio spp., Tribolium spp. and Trogoderma spp.; from the order Diptera, for example, Aedes spp., Anopheles spp., Antherigona soccata, Bactrocea oleae, Bibio hortulanus, Bradysia spp, Calliphora erythrocephala, Ceratitis spp., Chrysomyia spp., Culex spp., Cuterebra spp., Dacus spp., Delia spp., Drosophila melanogaster, Fannia spp., Gastrophilus spp., Geomyza tripunctata, Glossina spp., Hypoderma spp., Hyppobosca spp., Liriomyza spp., Lucilia spp., Melanagromyza spp., Musca spp., Oestrus spp., Orseolia spp., Oscinella frit, Pegomyia hyoscyami, Phorbia spp., Rhagoletis spp, Rivelia quadrifasciata, Scatella spp, Sciara spp., Stomoxys spp., Tabanus spp., Tannia spp. and Tipula spp.;

from the order Hemiptera, for example,

Acanthocoris scabrator, Acrosternum spp, Adelphocoris lineolatus, Aleurodes spp., Amblypelta nitida, Bathycoelia thalassina, Blissus spp, Cimex spp., Clavigralla tomentosicollis, Creontiades spp, Distantiella theobroma, Dichelops furcatus, Dysdercus spp., Edessa spp, Euchistus spp., Eurydema pulchrum, Eurygaster spp., Halyomorpha halys, Horcias nobilellus, Leptocorisa spp., Lygus spp, Margarodes spp, Murgantia histrionic, Neomegalotomus spp, Nesidiocoris tenuis, Nezara spp., Nysius simulans, Oebalus insularis, Piesma spp., Piezodorus spp, Rhodnius spp., Sahlbergella singularis, Scaptocoris castanea, Scotinophara spp., Thyanta spp, Triatoma spp., Vatiga illudens; Acyrthosium pisum, Adalges spp, Agalliana ensigera, Agonoscena targionii, Aleurodicus spp, Aleurocanthus spp, Aleurolobus barodensis, Aleurothrixus floccosus, Aleyrodes brassicae, Amarasca biguttula, Amritodus atkinsoni, Aonidiella spp., Aphididae, Aphis spp., Aspidiotus spp., Aulacorthum solani, Bactericera cockerelli, Bemisia spp, Brachycaudus spp, Brevicoryne brassicae, Cacopsylla spp, Cavariella aegopodii Scop., Ceroplaster spp., Chrysomphalus aonidium, Chrysomphalus dictyospermi, Cicadella spp, Cofana spectra, Cryptomyzus spp, Cicadulina spp, Coccus hesperidum, Dalbulus maidis, Dialeurodes spp, Diaphorina citri, Diuraphis noxia, Dysaphis spp, Empoasca spp., Eriosoma larigerum, Erythroneura spp., Gascardia spp., Glycaspis brimblecombei, Hyadaphis pseudobrassicae, Hyalopterus spp, Hyperomyzus pallidus, Idioscopus clypealis, Jacobiasca lybica, Laodelphax spp., Lecanium corni, Lepidosaphes spp., Lopaphis erysimi, Lyogenys maidis, Macrosiphum spp., Mahanarva spp, Metcalfa pruinosa, Metopolophium dirhodum, Myndus crudus, Myzus spp., Neotoxoptera sp, Nephotettix spp., Nilaparvata spp., Nippolachnus piri Mats, Odonaspis ruthae, Oregma lanigera Zehnter, Parabemisia myricae, Paratrioza cockerelli, Parlatoria spp., Pemphigus spp., Peregrinus maidis, Perkinsiella spp, Phorodon humuli, Phylloxera spp, Planococcus spp., Pseudaulacaspis spp., Pseudococcus spp., Pseudatomoscelis seriatus, Psylla spp., Pulvinaria aethiopica, Quadraspidiotus spp., Quesada gigas, Recilia dorsalis, Rhopalosiphum spp., Saissetia spp., Scaphoideus spp., Schizaphis spp., Sitobion spp., Sogatella furcifera, Spissistilus festinus, Tarophagus Proserpina, Toxoptera spp, Trialeurodes spp, Tridiscus sporoboli, Trionymus spp, Trioza erytreae, Unaspis citri, Zygina flammigera, Zyginidia scutellaris, from the order Hymenoptera, for example, Acromyrmex, Arge spp, Atta spp., Cephus spp., Diprion spp., Diprionidae, Gilpinia polytoma, Hoplo-campa spp., Lasius spp., Monomorium pharaonis, Neodiprion spp., Pogonomyrmex spp, Slenopsis invicta, Solenopsis spp. and Vespa spp.;

from the order Isoptera, for example,

Coptotermes spp, Corniternes cumulans, Incisitermes spp, Macrotermes spp, Mastotermes spp, Microtermes spp, Reticulitermes spp.; Solenopsis geminate from the order Lepidoptera, for example, Acleris spp., Adoxophyes spp., Aegeria spp., Agrotis spp., Alabama argillaceae, Amylois spp., Anticarsia gemmatalis, Archips spp., Argyresthia spp, Argyrotaenia spp., Autographa spp., Bucculatrix thurberiella, Busseola fusca, Cadra cautella, Carposina nipponensis, Chilo spp., Choristoneura spp., Chrysoteuchia topiaria, Clysia ambiguella, Cnaphalocrocis spp., Cnephasia spp., Cochylis spp., Coleophora spp., Colias lesbia, Cosmophila flava, Crambus spp, Crocidolomia binotalis, Cryptophlebia leucotreta, Cydalima perspectalis, Cydia spp., Diaphania perspectalis, Diatraea spp., Diparopsis castanea, Earias spp., Elasmopalpus lignosellus, Eldana saccharina, Ephestia spp., Epinotia spp, Estigmene acrea, Etiella zinckinella, Eucosma spp., Eupoecilia ambiguella, Euproctis spp., Euxoa spp., Feltia jaculiferia, Grapholita spp., Hedya nubiferana, Heliothis spp., Hellula undalis, Herpetogramma spp, Hyphantria cunea, Keiferia lycopersicella, Lasmopalpus lignosellus, Leucoptera scitella, Lithocollethis spp., Lobesia botrana, Loxostege bifidalis, Lymantria spp., Lyonetia spp., Malacosoma spp., Mamestra brassicae, Manduca sexta, Mythimna spp, Noctua spp, Operophtera spp., Orniodes indica, Ostrinia nubilalis, Pammene spp., Pandemis spp., Panolis flammea, Papaipema nebris, Pectinophora gossypiela, Perileucoptera coffeella, Pseudaletia unipuncta, Phthorimaea operculella, *Pieris rapae*, *Pieris* spp., *Plutella xylostella*, *Prays* spp., *Pseudoplusia* spp, *Rachiplusia nu*, *Richia albicosta*, *Scirpophaga* spp., *Sesamia* spp., *Sparganothis* spp., *Spodoptera* spp., *Sylepta derogate*, *Synanthedon* spp., *Thaumetopoea* spp., *Tortrix* spp., *Trichoplusia ni*, *Tuta absoluta*, and *Yponomeuta* spp.;

from the order Mallophaga, for example,

*Damalinea* spp. and *Trichodectes* spp.;

from the order Orthoptera, for example,

*Blatta* spp., *Blattella* spp., *Gryllotalpa* spp., *Leucophaea maderae*, *Locusta* spp., *Neocurtilla hexadactyla*, *Periplaneta* spp., *Scapteriscus* spp, and *Schistocerca* spp.;

from the order Psocoptera, for example,

*Liposcelis* spp.;

from the order Siphonaptera, for example,

*Ceratophyllus* spp., *Ctenocephalides* spp. and *Xenopsylla cheopis*;

from the order Thysanoptera, for example,

*CallioThrips phaseoli*, *Frankliniella* spp., *HelioThrips* spp, *HercinoThrips* spp., *ParthenoThrips* spp, *ScirtoThrips aurantii*, *SericoThrips variabilis*, *TaenioThrips* spp., *Thrips* spp;

from the order Thysanura, for example, *Lepisma saccharina*.

In a further aspect, the invention may also relate to a method of controlling damage to plant and parts thereof by plant parasitic nematodes (Endoparasitic-, Semiendoparasitic- and Ectoparasitic nematodes), especially plant parasitic nematodes such as root knot nematodes, *Meloidogyne hapla*, *Meloidogyne incognita*, *Meloidogyne javanica*, *Meloidogyne arenaria* and other *Meloidogyne* species; cyst-forming nematodes, *Globodera rostochiensis* and other *Globodera* species; *Heterodera avenae*, *Heterodera glycines*, *Heterodera schachtii*, *Heterodera trifolii*, and other *Heterodera* species; Seed gall nematodes, *Anguina* species; Stem and foliar nematodes, *Aphelenchoides* species; Sting nematodes, *Belonolaimus longicaudatus* and other *Belonolaimus* species; Pine nematodes, *Bursaphelenchus xylophilus* and other *Bursaphelenchus* species; Ring nematodes, *Criconema* species, *Criconemella* species, *Criconemoides* species, *Mesocriconema* species; Stem and bulb nematodes, *Ditylenchus destructor*, *Ditylenchus dipsaci* and other *Ditylenchus* species; Awl nematodes, *Dolichodorus* species; Spiral nematodes, *Heliocotylenchus multicinctus* and other *Helicotylenchus* species; Sheath and sheathoid nematodes, *Hemicycliophora* species and *Hemicriconemoides* species; *Hirshmanniella* species; Lance nematodes, *Hoploaimus* species; false rootknot nematodes, *Nacobbus* species; Needle nematodes, *Longidorus elongatus* and other *Longidorus* species; Pin nematodes, *Pratylenchus* species; Lesion nematodes, *Pratylenchus neglectus*, *Pratylenchus penetrans*, *Pratylenchus curvitatus*, *Pratylenchus goodeyi* and other *Pratylenchus* species; Burrowing nematodes, *Radopholus similis* and other *Radopholus* species; Reniform nematodes, *Rotylenchus robustus*, *Rotylenchus reniformis* and other *Rotylenchus* species; *Scutellonema* species; Stubby root nematodes, *Trichodorus primitivus* and other *Trichodorus* species, *Paratrichodorus* species; Stunt nematodes, *Tylenchorhynchus claytoni*, *Tylenchorhynchus dubius* and other *Tylenchorhynchus* species; Citrus nematodes, *Tylenchulus* species; Dagger nematodes, *Xiphinema* species; and other plant parasitic nematode species, such as *Subanguina* spp., *Hypsoperine* spp., *Macroposthonia* spp., *Melinius* spp., *Punctodera* spp., and *Quinisulcius* spp.

The compounds of the invention may also have activity against the molluscs. Examples of which include, for example, Ampullariidae; *Arion* (*A. ater*, *A. circumscriptus*, *A. hortensis*, *A. rufus*); Bradybaenidae (*Bradybaena fruticum*); *Cepaea* (*C. hortensis*, *C. Nemoralis*); ochlodina; *Deroceras* (*D. agrestis*, *D. empiricorum*, *D. laeve*, *D. reticulatum*); *Discus* (*D. rotundatus*); Euomphalia; *Galba* (*G. trunculata*); *Helicelia* (*H. itala*, *H. obvia*); Helicidae *Helicigona arbustorum*); Helicodiscus; *Helix* (*H. aperta*); Umax (*L. cinereoniger*, *L. flavus*, *L. marginatus*, *L. maximus*, *L. tenellus*); Lymnaea; *Milax* (*M. gagates*, *M. marginatus*, *M. sowerbyi*); Opeas; *Pomacea* (*P. canaticulata*); *Vallonia* and Zanitoides.

The active ingredients according to the invention can be used for controlling, i. e. containing or destroying, pests of the abovementioned type which occur in particular on plants, especially on useful plants and ornamentals in agriculture, in horticulture and in forests, or on organs, such as fruits, flowers, foliage, stalks, tubers or roots, of such plants, and in some cases even plant organs which are formed at a later point in time remain protected against these pests.

Suitable target crops are, in particular, cereals, such as wheat, barley, rye, oats, rice, maize or sorghum; beet, such as sugar or fodder beet; fruit, for example pomaceous fruit, stone fruit or soft fruit, such as apples, pears, plums, peaches, almonds, cherries or berries, for example strawberries, raspberries or blackberries; leguminous crops, such as beans, lentils, peas or soya; oil crops, such as oilseed rape, mustard, poppies, olives, sunflowers, coconut, castor, cocoa or ground nuts; cucurbits, such as pumpkins, cucumbers or melons; fibre plants, such as cotton, flax, hemp or jute; *citrus* fruit, such as oranges, lemons, grapefruit or tangerines; vegetables, such as spinach, lettuce, *Asparagus*, cabbages, carrots, onions, tomatoes, potatoes or bell peppers; Lauraceae, such as avocado, Cinnamonium or camphor; and also tobacco, nuts, coffee, eggplants, sugarcane, tea, pepper, grapevines, hops, the plantain family and latex plants.

The compositions and/or methods of the present invention may be also used on any ornamental and/or vegetable crops, including flowers, shrubs, broad-leaved trees and evergreens.

For example the invention may be used on any of the following ornamental species: *Ageratum* spp., *Alonsoa* spp., *Anemone* spp., *Anisodontea capsenisis*, *Anthemis* spp., *Antirrhinum* spp., *Aster* spp., *Begonia* spp. (e.g. *B. elatior*, *B. semperflorens*, *B. tubereux*), *Bougainvillea* spp., *Brachycome* spp., *Brassica* spp. (ornamental), *Calceolaria* spp., *Capsicum annuum*, *Catharanthus roseus*, *Canna* spp., *Centaurea* spp., *Chrysanthemum* spp., *Cineraria* spp. (*C. maritime*). *Coreopsis* spp., *Crassula coccinea*, *Cuphea ignea*. *Dahlia* spp., *Delphinium* spp., *Dicentra spectabilis*, *Dorotheantus* spp., *Eustoma grandiflorum*, *Forsythia* spp., *Fuchsia* spp., *Geranium gnaphalium*, *Gerbera* spp., *Gomphrena globosa*, *Heliotropium* spp., *Helianthus* spp., *Hibiscus* spp., *Hortensia* spp., *Hydrangea* spp., *Hypoestes phyllostachya*, *Impatiens* spp. (*I. walleriana*), *Iresines* spp., *Kalanchoe* spp., *Lantana camara*, *Lavatera trimestris*, *Leonotis leonurus*, *Lilium* spp., *Mesembryanthemum* spp., *Mimulus* spp., *Monarda* spp., *Nemesia* spp., *Tagetes* spp., *Dianthus* spp. (carnation), *Canna* spp., *Oxalis* spp., *Beilis* spp., *Pelargonium* spp. (*P. peltatum*, *P. Zonale*), *Viola* spp. (*pansy*), *Petunia* spp., *Phlox* spp., *Plecthranthus* spp., *Poinsettia* spp., *Parthenocissus* spp. (*P. quinquefolia*, *P. tricuspidata*). *Primula* spp., *Ranunculus* spp., *Rhododendron* spp., *Rosa* spp. (rose), *Rudbeckia* spp., *Saintpaulia* spp., *Salvia* spp., *Scaevola aemola*, *Schizanthus wisetonensis*, *Sedum* spp., *Solanum* spp., *Surfinia* spp., *Tagetes* spp., *Nicotinia* spp., *Verbena* spp., *Zinnia* spp. and other bedding plants.

For example the invention may be used on any of the following vegetable species: *Allium* spp. (*A. sativum*. *A.*, cepa, *A. oschaninii*, *A. Porrum*, *A. ascalonicum*, *A. fistulosum*), *Anthriscus cerefolium*, *Apium graveolus*. *Asparagus officinalis*. *Beta vulgarus*, *Brassica* spp. (*B. Oleracea*, *B. Pekinensis*, *B. rapa*), *Capsicum annuum*, *Cicer arietinum*, *Cichorium endivia*, *Cichorum* spp. (*C. intybus*, *C. endivia*), *Citrillus lanatus*, *Cucumis* spp. (*C. sativus*, *C. melo*), *Cucurbita* spp. (*C. pepo*, *C. maxima*), *Cyanara* spp. (*C. scolymus*, *C. cardunculus*), *Daucus carota*, *Foeniculum vulgare*, *Hypericum* spp., *Lactuca sativa*, *Lycopersicon* spp. (*L. esculentum*, *L. lycopersicum*), *Mentha* spp., *Ocimum basilicum*, *Petroselinum crispum*, *Phaseolus* spp. (*P. vulgaris*, *P. coccineus*), *Pisum sativum*, *Raphanus sativus*. *Rheum rhaponticum*, *Rosemarinus* spp., *Salvia* spp., *Scorzonera hispanica*, *Solanum melongena*, *Spinacea oleracea*, *Valerianella* spp. (*V. locusta*, *V. eriocarpa*) and *Vida faba*.

Preferred ornamental species include African violet, *Begonia*, *Dahlia*, *Gerbera*, *Hydrangea*, *Verbena*, *Rosa*, *Kalanchoe*, *Poinsettia*, *Aster*, *Centaurea*, *Coreopsis*, *Delphinium*, *Monarda*, *Phlox*, *Rudbeckia*, *Sedum*, *Petunia*, *Viola*, *Impatiens*, *Geranium*, *Chrysanthemum*, *Ranunculus*, *Fuchsia*, *Salvia*, *Hortensia*, rosemary, sage, St. Johnswort, mint, sweet pepper, tomato and cucumber.

The active ingredients according to the invention are especially suitable for controlling *Aphis craccivora*, *Diabrotica balteata*, *Heliothis virescens*, *Myzus persicae*, *Plutella xylostella* and *Spodoptera littoralis* in cotton, vegetable, maize, rice and soya crops. The active ingredients according to the invention are further especially suitable for controlling *Mamestra* (preferably in vegetables), *Cydia pomonella* (preferably in apples), *Empoasca* (preferably in vegetables, vineyards), *Leptinotarsa* (preferably in potatoes) and *Chilo supressalis* (preferably in rice).

The compounds of formula I are particularly suitable for control of a pest of the order Hemiptera, for example, one or more of the species *Bemisia tabaci*, *Aphis craccivora*, *Myzus persicae*, *Rhopalosiphum Padi*, *Nilaparvata lugens*, and *Euschistus heros* (preferably in vegetables, soybeans, and sugarcane);

a pest of the order Lepidoptera, for example, one or more of the species *Spodoptera littoralis*, *Spodoptera frugiperda*, *Plutella xylostella*, *Cnaphalocrocis medinalis*, *Cydia pomonella*, *Chrysodeixis includes*, *Chilo suppressalis*, *Elasmopalpus lignosellus*, *Pseudoplusia includens*, and *Tuta absoluta* (preferably in vegetables and corn);

a pest of the order Thysanoptera, such as the family Thripidae, for example, one or more of *Thrips tabaci* and *Frankliniella occidentalis* (preferably in vegetables); and soil pests (such as of the order Coleoptera), for example, the species *Diabrotica balteata*, *Agriotes* spp. and *Leptinotarsa decemlineata* (preferably in vegetables and corn).

The term "crops" is to be understood as including also crop plants which have been so transformed by the use of recombinant DNA techniques that they are capable of synthesising one or more selectively acting toxins, such as are known, for example, from toxin-producing bacteria, especially those of the genus *Bacillus*.

Toxins that can be expressed by such transgenic plants include, for example, insecticidal proteins, for example insecticidal proteins from *Bacillus cereus* or *Bacillus popilliae*; or insecticidal proteins from *Bacillus thuringiensis*, such as 5-endotoxins, e.g. Cry1Ab, Cry1Ac, Cry1F, Cry1Fa2, Cry2Ab, Cry3A, Cry3Bb1 or Cry9C, or vegetative insecticidal proteins (Vip), e.g. Vip1, Vip2, Vip3 or Vip3A; or insecticidal proteins of bacteria colonising nematodes, for example *Photorhabdus* spp. or *Xenorhabdus* spp., such as *Photorhabdus luminescens, Xenorhabdus nematophilus*; toxins produced by animals, such as scorpion toxins, arachnid toxins, wasp toxins and other insect-specific neurotoxins; toxins produced by fungi, such as Streptomycetes toxins, plant lectins, such as pea lectins, barley lectins or snowdrop lectins; agglutinins; proteinase inhibitors, such as trypsin inhibitors, serine protease inhibitors, patatin, cystatin, papain inhibitors; ribosome-inactivating proteins (RIP), such as ricin, maize-RIP, abrin, luffin, saporin or bryodin; steroid metabolism enzymes, such as 3-hydroxysteroidoxidase, ecdysteroid-UDP-glycosyl-transferase, cholesterol oxidases, ecdysone inhibitors, HMG-COA-reductase, ion channel blockers, such as blockers of sodium or calcium channels, juvenile hormone esterase, diuretic hormone receptors, stilbene synthase, bibenzyl synthase, chitinases and glucanases.

In the context of the present invention there are to be understood by 5-endotoxins, for example Cry1Ab, Cry1Ac, Cry1F, Cry1Fa2, Cry2Ab, Cry3A, Cry3Bb1 orCry9C, or vegetative insecticidal proteins (Vip), for example Vip1, Vip2, Vip3 or Vip3A, expressly also hybrid toxins, truncated toxins and modified toxins. Hybrid toxins are produced recombinantly by a new combination of different domains of those proteins (see, for example, WO 02/15701). Truncated toxins, for example a truncated Cry1Ab, are known. In the case of modified toxins, one or more amino acids of the naturally occurring toxin are replaced. In such amino acid replacements, preferably non-naturally present protease recognition sequences are inserted into the toxin, such as, for example, in the case of Cry3A055, a cathepsin-G-recognition sequence is inserted into a Cry3A toxin (see WO 03/018810).

Examples of such toxins or transgenic plants capable of synthesising such toxins are disclosed, for example, in EP-A-0 374 753, WO 93/07278, WO 95/34656, EP-A-0 427 529, EP-A-451 878 and WO 03/052073.

The processes for the preparation of such transgenic plants are generally known to the person skilled in the art and are described, for example, in the publications mentioned above. CryI-type deoxyribonucleic acids and their preparation are known, for example, from WO 95/34656, EP-A-0 367 474, EP-A-0 401 979 and WO 90/13651.

The toxin contained in the transgenic plants imparts to the plants tolerance to harmful insects. Such insects can occur in any taxonomic group of insects, but are especially commonly found in the beetles (Coleoptera), two-winged insects (Diptera) and moths (Lepidoptera).

Transgenic plants containing one or more genes that code for an insecticidal resistance and express one or more toxins are known and some of them are commercially available. Examples of such plants are: YieldGard® (maize variety that expresses a Cry1Ab toxin); YieldGard Rootworm® (maize variety that expresses a Cry3Bb1 toxin); YieldGard Plus® (maize variety that expresses a Cry1Ab and a Cry3Bb1 toxin); Starlink® (maize variety that expresses a Cry9C toxin); Herculex I® (maize variety that expresses a Cry1Fa2 toxin and the enzyme phosphinothricine N-acetyltransferase (PAT) to achieve tolerance to the herbicide glufosinate ammonium); NuCOTN 33B® (cotton variety that expresses a Cry1Ac toxin); Bollgard I® (cotton variety that expresses a Cry1Ac toxin); Bollgard II® (cotton variety that expresses a Cry1Ac and a Cry2Ab toxin); VipCot® (cotton variety that expresses a Vip3A and a Cry1Ab toxin); NewLeaf® (potato variety that expresses a Cry3A toxin); NatureGard®, Agrisure® GT Advantage (GA21 glyphosate-tolerant trait), Agrisure® CB Advantage (Bt11 corn borer (CB) trait) and Protecta®.

Further examples of such transgenic crops are:

1. Bt11 Maize from Syngenta Seeds SAS, Chemin de l'Hobit 27, F-31 790 St. Sauveur, France, registration number C/FR/96/05/10. Genetically modified *Zea mays* which has been rendered resistant to attack by the European corn borer (*Ostrinia nubilalis* and *Sesamia nonagrioides*) by transgenic expression of a truncated Cry1Ab toxin. Bt11 maize also transgenically expresses the enzyme PAT to achieve tolerance to the herbicide glufosinate ammonium.

2. Bt176 Maize from Syngenta Seeds SAS, Chemin de l'Hobit 27, F-31 790 St. Sauveur, France, registration number C/FR/96/05/10. Genetically modified *Zea mays* which has been rendered resistant to attack by the European corn borer (*Ostrinia nubilalis* and *Sesamia* nonagrioides) by transgenic expression of a Cry1Ab toxin. Bt176 maize also transgenically expresses the enzyme PAT to achieve tolerance to the herbicide glufosinate ammonium.

3. MIR604 Maize from Syngenta Seeds SAS, Chemin de l'Hobit 27, F-31 790 St. Sauveur, France, registration number C/FR/96/05/10. Maize which has been rendered insect-resistant by transgenic expression of a modified Cry3A toxin. This toxin is Cry3A055 modified by insertion of a cathepsin-G-protease recognition sequence. The preparation of such transgenic maize plants is described in WO 03/018810.

4. MON 863 Maize from Monsanto Europe S.A. 270-272 Avenue de Tervuren, B-1150 Brussels, Belgium, registration number C/DE/02/9. MON 863 expresses a Cry3Bb1 toxin and has resistance to certain Coleoptera insects.

5. IPC 531 Cotton from Monsanto Europe S.A. 270-272 Avenue de Tervuren, B-1150 Brussels, Belgium, registration number C/ES/96/02.

6. 1507 Maize from Pioneer Overseas Corporation, Avenue Tedesco, 7 B-1160 Brussels, Belgium, registration number C/NL/00/10. Genetically modified maize for the expression of the protein Cry1F for achieving resistance to certain Lepidoptera insects and of the PAT protein for achieving tolerance to the herbicide glufosinate ammonium.

7. NK603×MON 810 Maize from Monsanto Europe S.A. 270-272 Avenue de Tervuren, B-1150 Brussels, Belgium, registration number C/GB/02/M3/03. Consists of conventionally bred hybrid maize varieties by crossing the genetically modified varieties NK603 and MON 810. NK603×MON 810 Maize transgenically expresses the protein CP4 EPSPS, obtained from *Agrobacterium* sp. strain CP4, which imparts tolerance to the herbicide Roundup® (contains glyphosate), and also a Cry1 Ab toxin obtained from *Bacillus thuringiensis* subsp. *kurstaki* which brings about tolerance to certain Lepidoptera, include the European corn borer.

Transgenic crops of insect-resistant plants are also described in BATS (Zentrum für Biosicherheit und Nachhaltigkeit, Zentrum BATS, Clarastrasse 13, 4058 Basel, Switzerland) Report 2003, (http://bats.ch).

The term "crops" is to be understood as including also crop plants which have been so transformed by the use of recombinant DNA techniques that they are capable of synthesising antipathogenic substances having a selective action, such as, for example, the so-called "pathogenesis-related proteins" (PRPs, see e.g. EP-A-0 392 225). Examples of such antipathogenic substances and transgenic plants capable of synthesising such antipathogenic substances are known, for example, from EP-A-0 392 225, WO 95/33818 and EP-A-0 353 191. The methods of producing such transgenic plants are generally known to the person skilled in the art and are described, for example, in the publications mentioned above.

Crops may also be modified for enhanced resistance to fungal (for example *Fusarium*, Anthracnose, or *Phytophthora*), bacterial (for example *Pseudomonas*) or viral (for example potato leafroll virus, tomato spotted wilt virus, cucumber mosaic virus) pathogens.

Crops also include those that have enhanced resistance to nematodes, such as the soybean cyst nematode.

Crops that are tolerance to abiotic stress include those that have enhanced tolerance to drought, high salt, high temperature, chill, frost, or light radiation, for example through expression of NF—YB or other proteins known in the art.

Antipathogenic substances which can be expressed by such transgenic plants include, for example, ion channel blockers, such as blockers for sodium and calcium channels, for example the viral KP1, KP4 or KP6 toxins; stilbene synthases; bibenzyl synthases; chitinases; glucanases; the so-called "pathogenesis-related proteins" (PRPs; see e.g. EP-A-0 392 225); antipathogenic substances produced by microorganisms, for example peptide antibiotics or heterocyclic antibiotics (see e.g. WO 95/33818) or protein or polypeptide factors involved in plant pathogen defence (so-called "plant disease resistance genes", as described in WO 03/000906).

Further areas of use of the compositions according to the invention are the protection of stored goods and store rooms and the protection of raw materials, such as wood, textiles, floor coverings or buildings, and also in the hygiene sector, especially the protection of humans, domestic animals and productive livestock against pests of the mentioned type.

The present invention provides a compound of the first aspect for use in therapy. The present invention provides a compound of the first aspect, for use in controlling parasites in or on an animal.

The present invention further provides a compound of the first aspect, for use in controlling ectoparasites on an animal. The present invention further provides a compound of the first aspect, for use in preventing and/or treating diseases transmitted by ectoparasites.

The present invention provides the use of a compound of the first aspect, for the manufacture of a medicament for controlling parasites in or on an animal. The present invention further provides the use of a compound of the first aspect, for the manufacture of a medicament for controlling ectoparasites on an animal. The present invention further provides the use of a compound of the first aspect, for the manufacture of a medicament for preventing and/or treating diseases transmitted by ectoparasites.

The present invention provides the use of a compound of the first aspect, in controlling parasites in or on an animal. The present invention further provides the use of a compound of the first aspect, in controlling ectoparasites on an animal.

The term "controlling" when used in context of parasites in or on an animal refers to reducing the number of pests or parasites, eliminating pests or parasites and/or preventing further pest or parasite infestation.

The term "treating" when used used in context of parasites in or on an animal refers to restraining, slowing, stopping or reversing the progression or severity of an existing symptom or disease.

The term "preventing" when used used in context of parasites in or on an animal refers to the avoidance of a symptom or disease developing in the animal.

The term "animal" when used used in context of parasites in or on an animal may refer to a mammal and a non-mammal, such as a bird or fish. In the case of a mammal, it may be a human or non-human mammal. Non-human mammals include, but are not limited to, livestock animals and companion animals. Livestock animals include, but are not limited to, cattle, camellids, pigs, sheep, goats and horses. Companion animals include, but are not limited to, dogs, cats and rabbits.

A "parasite" is a pest which lives in or on the host animal and benefits by deriving nutrients at the host animal's expense. An "endoparasite" is a parasite which lives in the host animal. An "ectoparasite" is a parasite which lives on the host animal. Ectoparasites include, but are not limited to, acari, insects and crustaceans (e.g. sea lice). The Acari (or Acarina) sub-class comprises ticks and mites. Ticks include, but are not limited to, members of the following genera: *Rhipicaphalus*, for example, *Rhipicaphalus (Boophilus) microplus* and *Rhipicephalus sanguineus*; *Amblyomrna*; *Dermacentor*; *Haemaphysalis*; *Hyalomma*; *Ixodes*; *Rhipicentor, Margaropus*; *Argas*; *Otobius*; and *Ornithodoros*. Mites include, but are not limited to, members of the following genera: *Chorioptes*, for example *Chorioptes bovis*; *Psoroptes, for example Psoroptes ovis*; *Cheyletiella*; *Dermanyssus*; for example *Dermanyssus gallinae*; *Ortnithonyssus*; *Demodex*, for example *Demodex canis*; *Sarcoptes*, for example *Sarcoptes scabier*, and *Psorergates*. Insects include, but are not limited to, members of the orders: Siphonaptera, Diptera, Phthiraptera, Lepidoptera, Coleoptera and Homoptera. Members of the Siphonaptera order include, but are not limited to, *Ctenocephalides felis* and *Ctenocephatides canis*. Members of the Diptera order include, but are not limited to, *Musca* spp.; bot fly, for example *Gasterophilus intestinalis* and *Oestrus ovis*; biting flies; horse flies, for example *Haematopota* spp. and *Tabunus* spp.; *haematobia*, for example *haematobia irritans*; *Stomoxys; Lucilia*; midges; and mosquitoes. Members of the Phthiraptera class include, but are not limited to, blood sucking lice and chewing lice, for example *Bovicola ovis* and *Bovicola Bovis*.

The term "effective amount" when used used in context of parasites in or on an animal refers to the amount or dose of the compound of the invention, or a salt thereof, which, upon single or multiple dose administration to the animal, provides the desired effect in or on the animal. The effective amount can be readily determined by the attending diagnostician, as one skilled in the art, by the use of known techniques and by observing results obtained under analogous circumstances. In determining the effective amount a number of factors are considered by the attending diagnostician, including, but not limited to: the species of mammal; its size, age, and general health; the parasite to be controlled and the degree of infestation; the specific disease or disorder involved; the degree of or involvement or the severity of the disease or disorder; the response of the individual; the particular compound administered; the mode of administration; the bioavailability characteristics of the preparation administered; the dose regimen selected; the use of concomitant medication; and other relevant circumstances.

The compounds of the invention may be administered to the animal by any route which has the desired effect including, but not limited to topically, orally, parenterally and subcutaneously. Topical administration is preferred. Formulations suitable for topical administration include, for example, solutions, emulsions and suspensions and may take the form of a pour-on, spot-on, spray-on, spray race or dip. In the alternative, the compounds of the invention may be administered by means of an ear tag or collar.

Salt forms of the compounds of the invention include both pharmaceutically acceptable salts and veterinary acceptable salts, which can be different to agrochemically acceptable salts. Pharmaceutically and veterinary acceptable salts and common methodology for preparing them are well known in the art. See, for example, Gould, P. L., "Salt selection for basic drugs", International Journal of Pharmaceutics, 33: 201-217 (1986); Bastin, R. J., et al "Salt Selection and Optimization Procedures for Pharmaceutical New Chemical Entities", Organic Process Research and Development, 4: 427-435 (2000); and Berge, S. M., et al., "Pharmaceutical Salts", Journal of Pharmaceutical Sciences, 66: 1-19, (1977). One skilled in the art of synthesis will appreciate that the compounds of the invention are readily converted to and may be isolated as a salt, such as a hydrochloride salt, using techniques and conditions well known to one of ordinary skill in the art. In addition, one skilled in the art of synthesis will appreciate that the compounds of the invention are readily converted to and may be isolated as the corresponding free base from the corresponding salt.

The present invention also provides a method for controlling pests (such as mosquitoes and other disease vectors; see also http://www.who.int/malaria/vector_control/irs/en/). In one embodiment, the method for controlling pests comprises applying the compositions of the invention to the target pests, to their locus or to a surface or substrate by brushing, rolling, spraying, spreading or dipping. By way of example, an IRS (indoor residual spraying) application of a surface such as a wall, ceiling or floor surface is contemplated by the method of the invention. In another embodiment, it is contemplated to apply such compositions to a substrate such as non-woven or a fabric material in the form of (or which can be used in the manufacture of) netting, clothing, bedding, curtains and tents.

In one embodiment, the method for controlling such pests comprises applying a pesticidally effective amount of the compositions of the invention to the target pests, to their locus, or to a surface or substrate so as to provide effective residual pesticidal activity on the surface or substrate. Such application may be made by brushing, rolling, spraying, spreading or dipping the pesticidal composition of the invention. By way of example, an IRS application of a surface such as a wall, ceiling or floor surface is contemplated by the method of the invention so as to provide effective residual pesticidal activity on the surface. In another embodiment, it is contemplated to apply such compositions for residual control of pests on a substrate such as a fabric material in the form of (or which can be used in the manufacture of) netting, clothing, bedding, curtains and tents.

Substrates including non-woven, fabrics or netting to be treated may be made of natural fibres such as cotton, raffia, jute, flax, sisal, hessian, or wool, or synthetic fibres such as polyamide, polyester, polypropylene, polyacrylonitrile or the like. The polyesters are particularly suitable. The methods of textile treatment are known, e.g. WO 2008/151984, WO 2003/034823, U.S. Pat. No. 5,631,072, WO 2005/64072, WO2006/128870, EP 1724392, WO 2005113886 or WO 2007/090739.

Further areas of use of the compositions according to the invention are the field of tree injection/trunk treatment for all ornamental trees as well all sort of fruit and nut trees.

In the field of tree injection/trunk treatment, the compounds according to the present invention are especially suitable against wood-boring insects from the order Lepidoptera as mentioned above and from the order Coleoptera, especially against woodborers listed in the following tables A and B:

TABLE A

Examples of exotic woodborers of economic importance.

| Family | Species | Host or Crop Infested |
|---|---|---|
| Buprestidae | *Agrilus planipennis* | Ash |
| Cerambycidae | *Anoplura glabripennis* | Hardwoods |
| Scolytidae | *Xylosandrus crassiusculus* | Hardwoods |
| | *X. mutilatus* | Hardwoods |
| | *Tomicus piniperda* | Conifers |

TABLE B

Examples of native woodborers of economic importance.

| Family | Species | Host or Crop Infested |
|---|---|---|
| Buprestidae | *Agrilus anxius* | Birch |
| | *Agrilus politus* | Willow, Maple |
| | *Agrilus sayi* | Bayberry, Sweetfern |
| | *Agrilus vittaticolllis* | Apple, Pear, Cranberry, Serviceberry, Hawthorn |
| | *Chrysobothris femorata* | Apple, Apricot, Beech, Boxelder, Cherry, Chestnut, Currant, Elm, Hawthorn, Hackberry, Hickory, Horsechestnut, Linden, Maple, Mountain-ash, Oak, Pecan, Pear, Peach, Persimmon, Plum, Poplar, Quince, Redbud, Serviceberry, Sycamore, Walnut, Willow |
| | *Texania campestris* | Basswood, Beech, Maple, Oak, Sycamore, Willow, Yellow-poplar |
| Cerambycidae | *Goes pulverulentus* | Beech, Elm, Nuttall, Willow, Black oak, Cherrybark oak, Water oak, Sycamore |
| | *Goes tigrinus* | Oak |
| | *Neoclytus acuminatus* | Ash, Hickory, Oak, Walnut, Birch, Beech, Maple, Eastern hophornbeam, Dogwood, Persimmon, Redbud, Holly, Hackberry, Black locust, Honeylocust, Yellow-poplar, Chestnut, Osage-orange, Sassafras, Lilac, Mountain-mahogany, Pear, Cherry, Plum, Peach, Apple, Elm, Basswood, Sweetgum |
| | *Neoptychodes trilineatus* | Fig, Alder, Mulberry, Willow, Netleaf hackberry |
| | *Oberea ocellata* | Sumac, Apple, Peach, Plum, Pear, Currant, Blackberry |
| | *Oberea tripunctata* | Dogwood, Viburnum, Elm, Sourwood, Blueberry, Rhododendron, Azalea, Laurel, Poplar, Willow, Mulberry |
| | *Oncideres cingulata* | Hickory, Pecan, Persimmon, Elm, Sourwood, Basswood, Honeylocust, Dogwood, Eucalyptus, Oak, Hackberry, Maple, Fruit trees |
| | *Saperda calcarata* | Poplar |
| | *Strophiona nitens* | Chestnut, Oak, Hickory, Walnut, Beech, Maple |
| Scolytidae | *Corthylus columbianus* | Maple, Oak, Yellow-poplar, Beech, Boxelder, Sycamore, Birch, Basswood, Chestnut, Elm |
| | *Dendroctonus frontalis* | Pine |
| | *Dryocoetes betulae* | Birch, Sweetgum, Wild cherry, Beech, Pear |
| | *Monarthrum fasciatum* | Oak, Maple, Birch, Chestnut, Sweetgum, Blackgum, Poplar, Hickory, Mimosa, Apple, Peach, Pine |
| | *Phloeotribus liminaris* | Peach, Cherry, Plum, Black cherry, Elm, Mulberry, Mountain-ash |

TABLE B-continued

Examples of native woodborers of economic importance.

| Family | Species | Host or Crop Infested |
|---|---|---|
| | Pseudopityophthorus pruinosus | Oak, American beech, Black cherry, Chickasaw plum, Chestnut, Maple, Hickory, Hornbeam, Hophornbeam |
| Sesiidae | Paranthrene simulans | Oak, American chestnut |
| | Sannina uroceriformis | Persimmon |
| | Synanthedon exitiosa | Peach, Plum, Nectarine, Cherry, Apricot, Almond, Black cherry |
| | Synanthedon pictipes | Peach, Plum, Cherry, Beach, Black Cherry |
| | Synanthedon rubrofascia | Tupelo |
| | Synanthedon scitula | Dogwood, Pecan, Hickory, Oak, Chestnut, Beech, Birch, Black cherry, Elm, Mountain-ash, Viburnum, Willow, Apple, Loquat, Ninebark, Bayberry |
| | Vitacea polistiformis | Grape |

The present invention may be also used to control any insect pests that may be present in turfgrass, including for example beetles, caterpillars, fire ants, ground pearls, millipedes, sow bugs, mites, mole crickets, scales, mealybugs, ticks, spittlebugs, southern chinch bugs and white grubs. The present invention may be used to control insect pests at various stages of their life cycle, including eggs, larvae, nymphs and adults.

In particular, the present invention may be used to control insect pests that feed on the roots of turfgrass including white grubs (such as *Cyclocephala* spp. (e.g. masked chafer, *C. lurida*), *Rhizotrogus* spp. (e.g. European chafer, *R. majalis*), *Cotinus* spp. (e.g. Green June beetle, *C. nitida*), *Popillia* spp. (e.g. Japanese beetle, *P. japonica*), *Phyllophaga* spp. (e.g. May/June beetle), *Ataenius* spp. (e.g. Black turfgrass *Ataenius, A. spretulus*), *Maladera* spp. (e.g. Asiatic garden beetle, *M. castanea*) and *Tomarus* spp.), ground pearls (*Margarodes* spp.), mole crickets (tawny, southern, and short-winged; *Scapteriscus* spp., *Gryllotalpa africana*) and leatherjackets (European crane fly, *Tipula* spp.).

The present invention may also be used to control insect pests of turfgrass that are thatch dwelling, including armyworms (such as fall armyworm *Spodoptera frugiperda*, and common armyworm *Pseudaletia unipuncta*), cutworms, billbugs (*Sphenophorus* spp., such as *S. venatus verstitus* and *S. parvulus*), and sod webworms (such as *Crambus* spp. and the tropical sod webworm, *Herpetogramma phaeopteralis*).

The present invention may also be used to control insect pests of turfgrass that live above the ground and feed on the turfgrass leaves, including chinch bugs (such as southern chinch bugs, *Blissus insularis*), Bermudagrass mite (*Eriophyes cynodoniensis*), rhodesgrass mealybug (*Antonina graminis*), two-lined spittlebug (*Propsapia bicincta*), leafhoppers, cutworms (Noctuidae family), and greenbugs.

The present invention may also be used to control other pests of turfgrass such as red imported fire ants (*Solenopsis invicta*) that create ant mounds in turf.

In the hygiene sector, the compositions according to the invention are active against ectoparasites such as hard ticks, soft ticks, mange mites, harvest mites, flies (biting and licking), parasitic fly larvae, lice, hair lice, bird lice and fleas.

Examples of such parasites are:

Of the order Anoplurida: *Haematopinus* spp., *Linognathus* spp., *Pediculus* spp. and *Phtirus* spp., *Solenopotes* spp.

Of the order Mallophagida: *Trimenopon* spp., *Menopon* spp., *Trinoton* spp., *Bovicola* spp., *Werneckiella* spp., *Lepikentron* spp., *Damalina* spp., *Trichodectes* spp. and *Felicola* spp.

Of the order Diptera and the suborders Nematocerina and Brachycerina, for example *Aedes* spp., *Anopheles* spp., *Culex* spp., *Simulium* spp., *Eusimulium* spp., *Phlebotomus* spp., *Lutzomyia* spp., *Culicoides* spp., *Chrysops* spp., *Hybomitra* spp., *Atylotus* spp., *Tabanus* spp., *Haematopota* spp., *Philipomyia* spp., *Braula* spp., *Musca* spp., *Hydrotaea* spp., *Stomoxys* spp., *Haematobia* spp., *Morellia* spp., *Fannia* spp., *Glossina* spp., *Calliphora* spp., *Lucilia* spp., *Chrysomyia* spp., *Wohlfahrtia* spp., *Sarcophaga* spp., *Oestrus* spp., *Hypoderma* spp., *Gasterophilus* spp., *Hippobosca* spp., *Lipoptena* spp. and *Melophagus* spp.

Of the order Siphonapterida, for example *Pulex* spp., *Ctenocephalides* spp., *Xenopsylla* spp., *Ceratophyllus* spp.

Of the order Heteropterida, for example *Cimex* spp., *Triatoma* spp., *Rhodnius* spp., *Panstrongylus* spp.

Of the order Blattarida, for example *Blatta orientalis, Periplaneta americana, Blattelagermanica* and *Supella* spp.

Of the subclass Acaria (Acarida) and the orders Meta- and Meso-*stigmata*, for example *Argas* spp., *Ornithodorus* spp., *Otobius* spp., *Ixodes* spp., *Amblyomma* spp., *Boophilus* spp., *Dermacentor* spp., *Haemophysalis* spp., *Hyalomma* spp., *Rhipicephalus* spp., *Dermanyssus* spp., *Raillietia* spp., *Pneumonyssus* spp., *Sternostoma* spp. and *Varroa* spp.

Of the orders Actinedida (Prostigmata) and Acaridida (Astigmata), for example *Acarapis* spp., *Cheyletiella* spp., *Ornithocheyletia* spp., *Myobia* spp., *Psorergatesspp., Demodex* spp., *Trombicula* spp., *Listrophorus* spp., *Acarus* spp., *Tyrophagus* spp., *Caloglyphus* spp., *Hypodectes* spp., *Pterolichus* spp., *Psoroptes* spp., *Chorioptes* spp., *Otodectes* spp., *Sarcoptes* spp., *Notoedres* spp., *Knemidocoptes* spp., *Cytodites* spp. and *Laminosioptes* spp.

The compositions according to the invention are also suitable for protecting against insect infestation in the case of materials such as wood, textiles, plastics, adhesives, glues, paints, paper and card, leather, floor coverings and buildings.

The compositions according to the invention can be used, for example, against the following pests: beetles such as *Hylotrupes bajulus, Chlorophorus pilosis, Anobium punctatum, Xestobium rufovillosum, Ptilinuspecticornis, Dendrobium pertinex, Ernobius mollis, Priobium carpini, Lyctus brunneus, Lyctus africanus, Lyctus planicollis, Lyctus lin-*

*earis, Lyctus pubescens, Trogoxylon aequale, Minthesrugicollis, Xyleborus* spec., *Tryptodendron* spec., *Apate monachus, Bostrychus capucins, Heterobostrychus brunneus, Sinoxylon spec*, and *Dinoderus minutus*, and also hymenopterans such as *Sirex juvencus, Urocerus gigas, Urocerus gigas taignus* and *Urocerus augur*, and termites such as *Kalotermes flavicollis, Cryptotermes brevis, Heterotermes indicola, Reticulitermes flavipes, Reticulitermes santonensis, Reticulitermes lucifugus, Mastotermes darwiniensis, Zootermopsis nevadensis* and *Coptotermes formosanus*, and bristletails such as *Lepisma saccharina*. The compounds of formulae I, and I'a, or salts thereof, are especially suitable for controlling one or more pests selected from the family: Noctuidae, Plutellidae, Chrysomelidae, Thripidae, Pentatomidae, Tortricidae, Delphacidae, Aphididae, Noctuidae, Crambidae, Meloidogynidae, and Heteroderidae. In a preferred embodiment of each aspect, a compound TX (where the abbreviation "TX" means "one compound selected from the compounds defined in the Tables A-1 to A-15, B-1 to B-15, C-1 to C-15, D-1 to D-30, E-1 to E-15, F-1 to F-15, G-1 to G-15, H-1 to H-15, I-1 to I-15, J-1 to J-15. K-1 to K-15, L-1 to L-15 and M-1 to M-60, and Table P") controls one or more of pests selected from the family: Noctuidae, Plutellidae, Chrysomelidae, Thripidae, Pentatomidae, Tortricidae, Delphacidae, Aphididae, Noctuidae, Crambidae, Meloidogynidae, and Heteroderidae.

The compounds of formulae I, and I'a, or salts thereof, are especially suitable for controlling one or more of pests selected from the genus: *Spodoptera* spp, *Plutella* spp, *Frankliniella* spp, *Thrips* spp, *Euschistus* spp, *Cydia* spp, *Nilaparvata* spp, *Myzus* spp. *Aphis* spp, *Diabrotica* spp, *Rhopalosiphum* spp, *Pseudoplusia* spp and *Chilo* spp. In a preferred embodiment of each aspect, a compound TX (where the abbreviation "TX" means "one compound selected from the compounds defined in the Tables A-1 to A-15, B-1 to B-15, C-1 to C-15, D-1 to D-30, E-1 to E-15, F-1 to F-15, G-1 to G-15, H-1 to H-15, I-1 to I-15, J-1 to J-15. K-1 to K-15, L-1 to L-15 and M-1 to M-60, and Table P") controls one or more of pests selected from the genus: *Spodoptera* spp, *Plutella* spp, *Frankliniella* spp, *Thrips* spp, *Euschistus* spp, *Cydia* spp, *Nilaparvata* spp, *Myzus* spp. *Aphis* spp, *Diabrotica* spp, *Rhopalosiphum* spp, *Pseudoplusia* spp and *Chilo* spp.

The compounds of formulae I, and I'a, or salts thereof, are especially suitable for controlling one or more of *Spodoptera littoralis, Plutella xylostella, Frankliniella occidentalis, Thrips tabaci, Euschistus herns, Cydia pomonella, Nilaparvata lugens, Myzus persicae, Chrysodeixis includens. Aphis craccivora, Diabrotica balteata, Rhopalosiphum padi*, and *Chilo suppressalis*.

In a preferred embodiment of each aspect, a compound TX (where the abbreviation "TX" means "one compound selected from the compounds defined in the Tables A-1 to A-15, B-1 to B-15, C-1 to C-15, D-1 to D-30, E-1 to E-15, F-1 to F-15, G-1 to G-15, H-1 to H-15, I-1 to I-15, J-1 to J-15. K-1 to K-15, L-1 to L-15 and M-1 to M-60, and Table P") controls one or more of *Spodoptera littoralis, Plutella xylostella, Frankliniella occidentalis, Thrips tabaci, Euschistus herns, Cydia pomonella, Nilaparvata lugens, Myzus persicae, Chrysodeixis includens. Aphis craccivora, Diabrotica balteata, Rhopalosiphum Padia*, and *Chilo Suppressalis*, such as *Spodoptera littoralis*+TX, *Plutella xylostella*+TX; *Frankliniella occidentalis*+TX, *Thrips tabaci*+TX, *Euschistus* herns+TX, *Cydia pomonella*+TX, *Nilaparvata lugens*+TX, *Myzus persicae*+TX, *Chrysodeixis includens*+TX, *Aphis craccivora*+TX, *Diabrotica balteata*+TX, *Rhopalosiphum Padi*+TX, and *Chilo suppressalis*+TX.

In an embodiment, of each aspect, one compound selected from the compounds defined in the Tables A-1 to A-15, B-1 to B-15, C-1 to C-15, D-1 to D-30, E-1 to E-15, F-1 to F-15, G-1 to G-15, H-1 to H-15, I-1 to I-15, J-1 to J-15. K-1 to K-15, L-1 to L-15 and M-1 to M-60, and Table P, is suitable for controlling *Spodoptera littoralis, Plutella xylostella, Frankliniella occidentalis, Thrips tabaci, Euschistus herns, Cydia pomonella, Nilaparvata lugens, Myzus persicae, Chrysodeixis includens. Aphis craccivora, Diabrotica balteata, Rhopalosiphum Padia*, and *Chilo Suppressalis* in cotton, vegetable, maize, cereal, rice and soya crops.

In an embodiment, one compound from selected from the compounds defined in the Tables A-1 to A-15, B-1 to B-15, C-1 to C-15, D-1 to D-30, E-1 to E-15, F-1 to F-15, G-1 to G-15, H-1 to H-15, I-1 to I-15, J-1 to J-15. K-1 to K-15, L-1 to L-15 and M-1 to M-60, and Table P, is suitable for controlling *Mamestra* (preferably in vegetables), *Cydia pomonella* (preferably in apples), *Empoasca* (preferably in vegetables, vineyards), *Leptinotarsa* (preferably in potatoes) and *Chilo supressalis* (preferably in rice).

Compounds according to the invention may possess any number of benefits including, inter alia, advantageous levels of biological activity for protecting plants against insects or superior properties for use as agrochemical active ingredients (for example, greater biological activity, an advantageous spectrum of activity, an increased safety profile (against non-target organisms above and below ground (such as fish, birds and bees), improved physico-chemical properties, or increased biodegradability). In particular, it has been surprisingly found that certain compounds of formula I may show an advantageous safety profile with respect to non-target arthropods, in particular pollinators such as honey bees, solitary bees, and bumble bees. Most particularly, *Apis mellifera*.

The compounds according to the invention can be used as pesticidal agents in unmodified form, but they are generally formulated into compositions in various ways using formulation adjuvants, such as carriers, solvents and surface-active substances. The formulations can be in various physical forms, e.g. in the form of dusting powders, gels, wettable powders, water-dispersible granules, water-dispersible tablets, effervescent pellets, emulsifiable concentrates, microemulsifiable concentrates, oil-in-water emulsions, oil-flowables, aqueous dispersions, oily dispersions, suspoemulsions, capsule suspensions, emulsifiable granules, soluble liquids, water-soluble concentrates (with water or a water-miscible organic solvent as carrier), impregnated polymer films or in other forms known e.g. from the Manual on Development and Use of FAO and WHO Specifications for Pesticides, United Nations, First Edition, Second Revision (2010). Such formulations can either be used directly or diluted prior to use. The dilutions can be made, for example, with water, liquid fertilisers, micronutrients, biological organisms, oil or solvents.

The formulations can be prepared e.g. by mixing the active ingredient with the formulation adjuvants in order to obtain compositions in the form of finely divided solids, granules, solutions, dispersions or emulsions. The active ingredients can also be formulated with other adjuvants, such as finely divided solids, mineral oils, oils of vegetable or animal origin, modified oils of vegetable or animal origin, organic solvents, water, surface-active substances or combinations thereof.

The active ingredients can also be contained in very fine microcapsules. Microcapsules contain the active ingredients in a porous carrier. This enables the active ingredients to be released into the environment in controlled amounts (e.g.

slow-release). Microcapsules usually have a diameter of from 0.1 to 500 microns. They contain active ingredients in an amount of about from 25 to 95% by weight of the capsule weight. The active ingredients can be in the form of a monolithic solid, in the form of fine particles in solid or liquid dispersion or in the form of a suitable solution. The encapsulating membranes can comprise, for example, natural or synthetic rubbers, cellulose, styrene/butadiene copolymers, polyacrylonitrile, polyacrylate, polyesters, polyamides, polyureas, polyurethane or chemically modified polymers and starch xanthates or other polymers that are known to the person skilled in the art. Alternatively, very fine microcapsules can be formed in which the active ingredient is contained in the form of finely divided particles in a solid matrix of base substance, but the microcapsules are not themselves encapsulated.

The formulation adjuvants that are suitable for the preparation of the compositions according to the invention are known per se. As liquid carriers there may be used: water, toluene, xylene, petroleum ether, vegetable oils, acetone, methyl ethyl ketone, cyclohexanone, acid anhydrides, acetonitrile, acetophenone, amyl acetate, 2-butanone, butylene carbonate, chlorobenzene, cyclohexane, cyclohexanol, alkyl esters of acetic acid, diacetone alcohol, 1,2-dichloropropane, diethanolamine, p-diethylbenzene, diethylene glycol, diethylene glycol abietate, diethylene glycol butyl ether, diethylene glycol ethyl ether, diethylene glycol methyl ether, N,N-dimethylformamide, dimethyl sulfoxide, 1,4-dioxane, dipropylene glycol, dipropylene glycol methyl ether, dipropylene glycol dibenzoate, diproxitol, alkylpyrrolidone, ethyl acetate, 2-ethylhexanol, ethylene carbonate, 1,1,1-trichloroethane, 2-heptanone, alpha-pinene, d-limonene, ethyl lactate, ethylene glycol, ethylene glycol butyl ether, ethylene glycol methyl ether, gamma-butyrolactone, glycerol, glycerol acetate, glycerol diacetate, glycerol triacetate, hexadecane, hexylene glycol, isoamyl acetate, isobornyl acetate, isooctane, isophorone, isopropylbenzene, isopropyl myristate, lactic acid, laurylamine, mesityl oxide, methoxypropanol, methyl isoamyl ketone, methyl isobutyl ketone, methyl laurate, methyl octanoate, methyl oleate, methylene chloride, m-xylene, n-hexane, n-octylamine, octadecanoic acid, octylamine acetate, oleic acid, oleylamine, o-xylene, phenol, polyethylene glycol, propionic acid, propyl lactate, propylene carbonate, propylene glycol, propylene glycol methyl ether, p-xylene, toluene, triethyl phosphate, triethylene glycol, xylenesulfonic acid, paraffin, mineral oil, trichloroethylene, perchloroethylene, ethyl acetate, amyl acetate, butyl acetate, propylene glycol methyl ether, diethylene glycol methyl ether, methanol, ethanol, isopropanol, and alcohols of higher molecular weight, such as amyl alcohol, tetrahydrofurfuryl alcohol, hexanol, octanol, ethylene glycol, propylene glycol, glycerol, N-methyl-2-pyrrolidone and the like.

Suitable solid carriers are, for example, talc, titanium dioxide, pyrophyllite clay, silica, attapulgite clay, kieselguhr, limestone, calcium carbonate, bentonite, calcium montmorillonite, cottonseed husks, wheat flour, soybean flour, pumice, wood flour, ground walnut shells, lignin and similar substances.

A large number of surface-active substances can advantageously be used in both solid and liquid formulations, especially in those formulations which can be diluted with a carrier prior to use. Surface-active substances may be anionic, cationic, non-ionic or polymeric and they can be used as emulsifiers, wetting agents or suspending agents or for other purposes. Typical surface-active substances include, for example, salts of alkyl sulfates, such as diethanolammonium lauryl sulfate; salts of alkylarylsulfonates, such as calcium dodecylbenzenesulfonate; alkylphenol/alkylene oxide addition products, such as nonylphenol ethoxylate; alcohol/alkylene oxide addition products, such as tridecylalcohol ethoxylate; soaps, such as sodium stearate; salts of alkylnaphthalenesulfonates, such as sodium dibutylnaphthalenesulfonate; dialkyl esters of sulfosuccinate salts, such as sodium di(2-ethylhexyl)sulfosuccinate; sorbitol esters, such as sorbitol oleate; quaternary amines, such as lauryltrimethylammonium chloride, polyethylene glycol esters of fatty acids, such as polyethylene glycol stearate; block copolymers of ethylene oxide and propylene oxide; and salts of mono- and di-alkylphosphate esters; and also further substances described e.g. in McCutcheon's Detergents and Emulsifiers Annual, MC Publishing Corp., Ridgewood New Jersey (1981).

Further adjuvants that can be used in pesticidal formulations include crystallisation inhibitors, viscosity modifiers, suspending agents, dyes, anti-oxidants, foaming agents, light absorbers, mixing auxiliaries, antifoams, complexing agents, neutralising or pH-modifying substances and buffers, corrosion inhibitors, fragrances, wetting agents, take-up enhancers, micronutrients, plasticisers, glidants, lubricants, dispersants, thickeners, antifreezes, microbicides, and liquid and solid fertilisers.

The compositions according to the invention can include an additive comprising an oil of vegetable or animal origin, a mineral oil, alkyl esters of such oils or mixtures of such oils and oil derivatives. The amount of oil additive in the composition according to the invention is generally from 0.01 to 10%, based on the mixture to be applied. For example, the oil additive can be added to a spray tank in the desired concentration after a spray mixture has been prepared. Preferred oil additives comprise mineral oils or an oil of vegetable origin, for example rapeseed oil, olive oil or sunflower oil, emulsified vegetable oil, alkyl esters of oils of vegetable origin, for example the methyl derivatives, or an oil of animal origin, such as fish oil or beef tallow. Preferred oil additives comprise alkyl esters of $C_8$-$C_{22}$ fatty acids, especially the methyl derivatives of $C_{12}$-$C_{18}$ fatty acids, for example the methyl esters of lauric acid, palmitic acid and oleic acid (methyl laurate, methyl palmitate and methyl oleate, respectively). Many oil derivatives are known from the Compendium of Herbicide Adjuvants, $10^{th}$ Edition, Southern Illinois University, 2010.

The inventive compositions generally comprise from 0.1 to 99% by weight, especially from 0.1 to 95% by weight, of compounds of the present invention and from 1 to 99.9% by weight of a formulation adjuvant which preferably includes from 0 to 25% by weight of a surface-active substance. Whereas commercial products may preferably be formulated as concentrates, the end user will normally employ dilute formulations.

The rates of application vary within wide limits and depend on the nature of the soil, the method of application, the crop plant, the pest to be controlled, the prevailing climatic conditions, and other factors governed by the method of application, the time of application and the target crop. As a general guideline compounds may be applied at a rate of from 1 to 2000 l/ha, especially from 10 to 1000 l/ha.

Preferred formulations can have the following compositions (weight %):
Emulsifiable Concentrates:

| | |
|---|---|
| active ingredient: | 1 to 95%, preferably 60 to 90% |
| surface-active agent: | 1 to 30%, preferably 5 to 20% |
| liquid carrier: | 1 to 80%, preferably 1 to 35% |

Dusts:

| active ingredient: | 0.1 to 10%, preferably 0.1 to 5% |
| --- | --- |
| solid carrier: | 99.9 to 90%, preferably 99.9 to 99% |

Suspension Concentrates:

| active ingredient: | 5 to 75%, preferably 10 to 50% |
| --- | --- |
| water: | 94 to 24%, preferably 88 to 30% |
| surface-active agent: | 1 to 40%, preferably 2 to 30% |

Wettable Powders:

| active ingredient: | 0.5 to 90%, preferably 1 to 80% |
| --- | --- |
| surface-active agent: | 0.5 to 20%, preferably 1 to 15% |
| solid carrier: | 5 to 95%, preferably 15 to 90% |

Granules:

| active ingredient: | 0.1 to 30%, preferably 0.1 to 15% |
| --- | --- |
| solid carrier: | 99.5 to 70%, preferably 97 to 85% |

The following Examples further illustrate, but do not limit, the invention.

| Wettable powders | a) | b) | c) |
| --- | --- | --- | --- |
| active ingredients | 25% | 50% | 75% |
| sodium lignosulfonate | 5% | 5% | — |
| sodium lauryl sulfate | 3% | — | 5% |
| sodium diisobutylnaphthalenesulfonate | — | 6% | 10% |
| phenol polyethylene glycol ether (7-8 mol of ethylene oxide) | — | 2% | — |
| highly dispersed silicic acid | 5% | 10% | 10% |
| Kaolin | 62% | 27% | — |

The combination is thoroughly mixed with the adjuvants and the mixture is thoroughly ground in a suitable mill, affording wettable powders that can be diluted with water to give suspensions of the desired concentration.

| Powders for dry seed treatment | a) | b) | c) |
| --- | --- | --- | --- |
| active ingredients | 25% | 50% | 75% |
| light mineral oil | 5% | 5% | 5% |
| highly dispersed silicic acid | 5% | 5% | — |
| Kaolin | 65% | 40% | — |
| Talcum | — | — | 20 |

The combination is thoroughly mixed with the adjuvants and the mixture is thoroughly ground in a suitable mill, affording powders that can be used directly for seed treatment.

| Emulsifiable concentrate | |
| --- | --- |
| active ingredients | 10% |
| octylphenol polyethylene glycol ether (4-5 mol of ethylene oxide) | 3% |
| calcium dodecylbenzenesulfonate | 3% |
| castor oil polyglycol ether (35 mol of ethylene oxide) | 4% |
| Cyclohexanone | 30% |
| xylene mixture | 50% |

Emulsions of any required dilution, which can be used in plant protection, can be obtained from this concentrate by dilution with water.

| Dusts | a) | b) | c) |
| --- | --- | --- | --- |
| Active ingredients | 5% | 6% | 4% |
| Talcum | 95% | — | — |
| Kaolin | — | 94% | — |
| mineral filler | — | — | 96% |

Ready-for-use dusts are obtained by mixing the combination with the carrier and grinding the mixture in a suitable mill. Such powders can also be used for dry dressings for seed.

| Extruder granules | |
| --- | --- |
| Active ingredients | 15% |
| sodium lignosulfonate | 2% |
| carboxymethylcellulose | 1% |
| Kaolin | 82% |

The combination is mixed and ground with the adjuvants, and the mixture is moistened with water. The mixture is extruded and then dried in a stream of air.

| Coated granules | |
| --- | --- |
| Active ingredients | 8% |
| polyethylene glycol (mol. wt. 200) | 3% |
| Kaolin | 89% |

The finely ground combination is uniformly applied, in a mixer, to the kaolin moistened with polyethylene glycol. Non-dusty coated granules are obtained in this manner.

Suspension Concentrate

| active ingredients | 40% |
| --- | --- |
| propylene glycol | 10% |
| nonylphenol polyethylene glycol ether (15 mol of ethylene oxide) | 6% |
| Sodium lignosulfonate | 10% |
| carboxymethylcellulose | 1% |
| silicone oil (in the form of a 75% emulsion in water) | 1% |
| Water | 32% |

The finely ground combination is intimately mixed with the adjuvants, giving a suspension concentrate from which suspensions of any desired dilution can be obtained by dilution with water. Using such dilutions, living plants as well as plant propagation material can be treated and protected against infestation by microorganisms, by spraying, pouring or immersion.

Flowable Concentrate for Seed Treatment

| active ingredients | 40% |
| --- | --- |
| propylene glycol | 5% |
| copolymer butanol PO/EO | 2% |
| Tristyrenephenole with 10-20 moles EO | 2% |
| 1,2-benzisothiazolin-3-one (in the form of a 20% solution in water) | 0.5% |
| monoazo-pigment calcium salt | 5% |
| Silicone oil (in the form of a 75% emulsion in water) | 0.2% |
| Water | 45.3% |

The finely ground combination is intimately mixed with the adjuvants, giving a suspension concentrate from which suspensions of any desired dilution can be obtained by dilution with water. Using such dilutions, living plants as well as plant propagation material can be treated and protected against infestation by microorganisms, by spraying, pouring or immersion.

Slow Release Capsule Suspension 28 parts of the combination are mixed with 2 parts of an aromatic solvent and 7 parts of toluene diisocyanate/polymethylene-polyphenylisocyanate-mixture (8:1). This mixture is emulsified in a mixture of 1.2 parts of polyvinylalcohol, 0.05 parts of a defoamer and 51.6 parts of water until the desired particle size is achieved. To this emulsion a mixture of 2.8 parts 1,6-diaminohexane in 5.3 parts of water is added. The mixture is agitated until the polymerization reaction is completed. The obtained capsule suspension is stabilized by adding 0.25 parts of a thickener and 3 parts of a dispersing agent.

The capsule suspension formulation contains 28% of the active ingredients. The medium capsule diameter is 8-15 microns. The resulting formulation is applied to seeds as an aqueous suspension in an apparatus suitable for that purpose.

Formulation types include an emulsion concentrate (EC), a suspension concentrate (SC), a suspo-emulsion (SE), a capsule suspension (CS), a water dispersible granule (WG), an emulsifiable granule (EG), an emulsion, water in oil (EO), an emulsion, oil in water (EW), a micro-emulsion (ME), an oil dispersion (OD), an oil miscible flowable (OF), an oil miscible liquid (OL), a soluble concentrate (SL), an ultra-low volume suspension (SU), an ultra-low volume liquid (UL), a technical concentrate (TK), a dispersible concentrate (DC), a wettable powder (WP), a soluble granule (SG) or any technically feasible formulation in combination with agriculturally acceptable adjuvants.

PREPARATIVE EXAMPLES

"Mp" means melting point in ° C. Free radicals represent methyl groups. $^1$H NMR measurements were recorded on a Brucker 400 MHz spectrometer, chemical shifts are given in ppm relevant to a TMS standard. Spectra measured in deuterated solvents as indicated. Either one of the LCMS methods below was used to characterize the compounds. The characteristic LCMS values obtained for each compound were the retention time ("Rt", recorded in minutes) and the measured molecular ion (M+H)$^+$.

LCMS Methods:
LC-MS Method 1:

Spectra were recorded on a Mass Spectrometer from Waters (SQD, SQDII Single quadrupole mass spectrometer) equipped with an electrospray source (Polarity: positive and negative ions, Capillary: 3.00 kV, Cone range: 30 V, Extractor: 2.00 V, Source Temperature: 150° C., Desolvation Temperature: 350° C., Cone Gas Flow: 50 l/h, Desolvation Gas Flow: 650 l/h, Mass range: 100 to 900 Da) and an Acquity UPLC from Waters: Binary pump, heated column compartment, diode-array detector and ELSD detector. Column: Waters UPLC HSS T3, 1.8 μm, 30×2.1 mm, Temp: 60° C., DAD Wavelength range (nm): 210 to 500, Solvent Gradient: A=water+5% MeOH+0.05% HCOOH, B=Acetonitrile+0.05% HCOOH, gradient: 10-100% B in 1.2 min; Flow (ml/min) 0.85

LC-MS Method 2:

Spectra were recorded on a ACQUITY Mass Spectrometer from Waters Corporations (SQD or SQDII Single quadrupole mass spectrometer) equipped with an electrospray source (Polarity: positive or negative ions, Capillary: 3.0 kV, Cone: 30V, Extractor: 3.00 V, Source Temperature: 150° C., Desolvation Temperature: 400° C., Cone Gas Flow: 60 L/hr, Desolvation Gas Flow: 700 L/hr, Mass range: 140 to 800 Da) and an ACQUITY UPLC from Waters Corporations with solvent degasser, binary pump, heated column compartment and diode-array detector. Column: Waters UPLC HSS T3, 1.8 μm, 30×2.1 mm, Temp: 60° C., DAD Wavelength range (nm): 210 to 400, Solvent Gradient: A=Water/Methanol 9:1+0.1% formic acid, B=Acetonitrile+0.1% formic acid, gradient: 0-100% B in 2.5 min; Flow (ml/min) 0.75

LC-MS Method 3:

Spectra were recorded on a Mass Spectrometer from Agilent (Single quad mass spectrometer) equipped with an Multimode-Electron Spray and APCI (Polarity: positive and negative ions), Capillary: 4.00 KV, Corona Current 4.0 μA, Charging Voltage, 2.00 kV, Nitrogen Gas Flow: 9.0 L/min, Nebulizer Pressure: 40 psig, Mass range: 100 to 1000 m/z), dry gas temperature 250° C., Vaporizer temperature 200° C. and Spectra were recorded on LCMS from Agilent: quaternary pump, heated column compartment, Variable wave length detector. Column: Eclipse XDB C18, 5.0 μm, 150× 4.6 mm, column Temp: Ambient, Wavelength (nm): 220 nm, Solvents: A=0.05% TFA in water, B=0.05% TFA in Acetonitrile. Gradient: time/% B: 0/5, 0.5/5, 3.5/90, 5/90, 5.1/5, 7/5; Flow rate: 1.0 ml/min.

Example H1: Synthesis of N-(cyclopropylmethyl)-N-[1-[3-(2-pyridyl)pyrazin-2-yl]ethyl]-3,5-bis(trifluoromethyl)benzamide

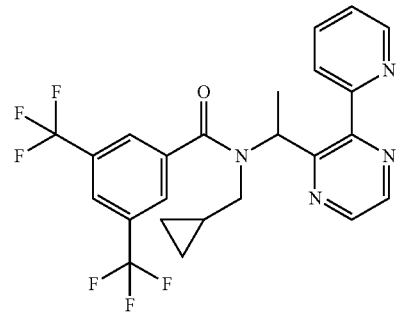 [SMILES: CC(c1nccnc1-c1ccccn1)N(CC1CC1)C(=O)c1cc(C(F)(F)F)cc(C(F)(F)F)c1]

Step 1: Preparation of 1-[3-(2-pyridyl)pyrazin-2-yl]ethanone

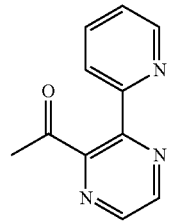

To a solution of 1-(3-chloropyrazin-2-yl)ethanone (CAS 121246-90-0, 1.0 g, 6.4 mmol) in toluene (26 mL) was added tetrakis(triphenylphosphine)palladium(0) (1.5 g, 1.3 mmol) and tributyl(2-pyridyl)stannane (2.1 mL, 6.4 mmol) at RT and the resulting black mixture was stirred at 100° C.

overnight. The mixture was cooled down to room temperature and was quenched with NaHCO₃ sat solution. The aqueous layer was extracted with ethyl acetate. The combined organic layers were dried over sodium sulfate, filtered and then KF was added to the solution to remove stannane. The crude product was purified on chromatography over silica gel to afford 1-[3-(2-pyridyl)pyrazin-2-yl]ethanone.

¹H NMR (400 MHz, Chloroform-d) δ/ppm: 2.74 (s, 3H) 7.33-7.38 (m, 1H), 7.87 (td, J=7.70, 1.83 Hz, 1H), 8.22 (dt, J=7.79, 1.05 Hz, 1H), 8.57 (d, J=2.20 Hz, 1H), 8.59-8.64 (m, 1H), 8.68 (d, J=2.20 Hz, 1H).

LC-MS (method 1): retention time 0.34 min, m/z 200 [M+H⁺].

Step 2: Preparation of N-(cyclopropylmethyl)-1-[3-(2-pyridyl)pyrazin-2-yl]ethanamine

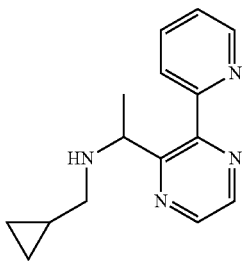 [SMILES: CC(NCC1CC1)c1nccnc1-c1ccccn1]

Method 1:

A sample of 1-[3-(2-pyridyl)pyrazin-2-yl]ethanone (1.2 g, 4.8 mmol, 80 mass %) was dissolved in methanol (19 mL). To this mixture were added cyclopropylmethanamine (1.3 mL, 14 mmol) and titanium(IV)isopropoxide (1.9 mL, 6.3 mmol) at room temperature via syringe. The reaction mixture was stirred over night and then sodium borohydride (190 mg, 4.8 mmol) was added slowly at room temperature (gas evolution was observed). After 1 hour, the reaction was shown by LCMS analysis to be complete. The reaction mixture was quenched with drops of water and concentrated in vacuo. The crude product was purified by chromatography over silica gel to afford N-(cyclopropylmethyl)-1-[3-(2-pyridyl)pyrazin-2-yl]ethanamine.

¹H NMR (400 MHz, Chloroform-d) δ/ppm: -0.09--0.01 (m, 2H), 0.33-0.40 (m, 2H), 0.79-0.92 (m, 1H), 1.48 (d, J=6.60 Hz, 3H), 1.99 (dd, J=11.74, 7.70 Hz, 1H), 2.44 (dd, J=11.74, 6.24 Hz, 1H), 4.63 (q, J=6.60 Hz, 1H), 7.37 (ddd, J=7.43, 4.86, 1.28 Hz, 1H), 7.82-7.90 (m, 1H), 7.90-7.96 (m, 1H), 8.53 (d, J=2.57 Hz, 1H), 8.62 (d, J=2.20 Hz, 1H), 8.70-8.75 (m, 1H).

LC-MS (method 1): retention time 0.51 min, m/z 255 [M+H⁺].

Method 2:

A mixture of 1-(3-pyrimidin-2-yl-2-pyridyl)ethanone (0.20 g, 1.0 mmol) prepared as described before, cyclopropylmethylamine (0.15 g, 2.0 mmol) and p-toluenesulfonic acid (0.017 g, 0.10 mmol) in toluene (4.5 mL) was refluxed for 16 h using a Dean-Stark apparatus. Then the mixture was cooled to room temperature, the solvent was removed and the residue was dried on reduced pressure. The crude was dissolved in dry methanol (4.5 mL), and sodium borohydride (0.039 g, 1.0 mmol) was added at 0° C. The resulting mixture was stirred at room temperature overnight. Water was added at 0° C. to the mixture and the crude was purified to afford N-(cyclopropylmethyl)-1-(3-pyrimidin-2-yl-2-pyridyl)ethanamine.

LC-MS (method 1): retention time 0.51 min, m/z 255 [M+H⁺].

Step 3: Preparation of N-(cyclopropylmethyl)-N-[1-[3-(2-pyridyl)pyrazin-2-yl]ethyl]-3,5-bis(trifluoromethyl)benzamide

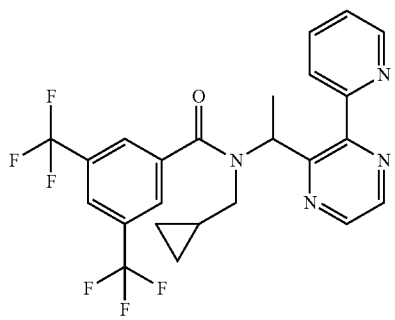 [SMILES: CC(c1nccnc1-c1ccccn1)N(CC1CC1)C(=O)c1cc(C(F)(F)F)cc(C(F)(F)F)c1]

N-(cyclopropylmethyl)-1-[3-(2-pyridyl)pyrazin-2-yl]ethanamine (0.370 g, 1.16 mmol) was dissolved in DMF and N,N-diisopropylethylamine (0.399 mL 2.33 mmol) was added. After 10 min stirring at room temperature, 3,5-bis(trifluoromethyl)benzoic acid (337 mg 1.28 mmol) was added followed by the addition of HATU [O-(7-Azabenzotriazol-1-yl)-N,N,N',N'-tetramethyluronium-hexafluorphosphate], 0.664 mg, 1.75 mmol). The resulting mixture was stirred over night at room temperature and poured into NH₄Cl sat solution. The mixture was extracted with ethyl acetate, and the combine organic phases dried over sodium sulfate, filtered and concentrated in vacuo. The crude product was purified by chromatography to afford N-(cyclopropylmethyl)-N-[1-[3-(2-pyridyl)pyrazin-2-yl]ethyl]-3,5-bis(trifluoromethyl)benzamide. ¹⁹F NMR (377 MHz, Chloroform-d) δ/ppm-63.02.

LC-MS (method 1): retention time 1.18 min, m/z 495 [M+H⁺].

Example H2: Preparation of N-(cyclopropylmethyl)-N-[1-[4-pyrimidin-2-yl-6-(trifluoromethyl)-3-pyridyl]ethyl]-3,5-bis(trifluoromethyl)benzamide (Compound P10)

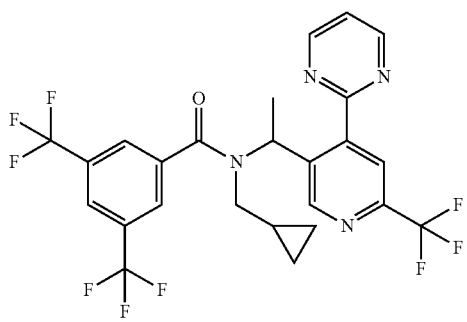 [SMILES: CC(c1cnc(C(F)(F)F)cc1-c1ncccn1)N(CC1CC1)C(=O)c1cc(C(F)(F)F)cc(C(F)(F)F)c1]

Step 1: Preparation of N-(cyclopropylmethyl)-1-[3-(2-pyridyl)pyrazin-2-yl]ethanamine

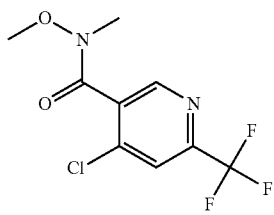 [SMILES: CON(C)C(=O)c1cnc(C(F)(F)F)cc1Cl]

To a suspension of 4-chloro-6-(trifluoromethyl)pyridine-3-carboxylic acid (CAS: 1060810-66-3, 1.00 g, 4.43 mmol,) in dry dichloromethane (13 mL) containing two drops of dry dimethylformamide was added drop wise oxalyl chloride (0.586 mL, 6.65 mmol) at room temperature. The mixture was stirred for 30 min and for 10 min under reflux to complete the conversion. The mixture was then evaporated until dryness. N,O-dimethylhydroxylamine hydrochloride (0.662 g, 6.65 mmol) was added to the residue. Dichloromethane (13 mL) and triethylamine (1.87 mL, 13.3 mmol) were added followed by stirring at room temperature for 2 h. The reaction was evaporated until dryness in presence of silica gel. Purification on silica gel afforded N-(cyclopropylmethyl)-1-[3-(2-pyridyl)pyrazin-2-yl]ethanamine.

LC-MS (method 1): retention time 0.84 min, m/z 269 [M+H$^+$].

Step 2: Preparation of 1-[4-chloro-6-(trifluoromethyl)-3-pyridyl]ethanone

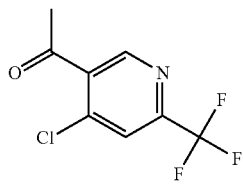

To a solution of N-(cyclopropylmethyl)-1-[3-(2-pyridyl)pyrazin-2-yl]ethanamine (1.0 g, 3.7 mmol) in dry tetrahydrofuran (9.3 mL) was added at 0° C. methylmagensium bromide solution (3.4 mol/L, 1.8 mL, 6.0 mmol) dropwise followed by stirring for 1 hour at 0° C. The conversion was not completed so additional methylmagensium bromide (0.8 mL, 2.7 mmol) was added at 0° C. followed by stirring for another hour at 0° C. to complete the conversion. Water was carefully added at 0° C. and the product was extracted with ethylacetate. A purification was carried out by chromatography on silica gel to afford 1-[4-chloro-6-(trifluoromethyl)-3-pyridyl]ethanone.

LC-MS (method 1): retention time 0.90 min, m/z 224 [M+H$^+$].

Step 3: Preparation of 1-[4-pyrimidin-2-yl-6-(trifluoromethyl)-3-pyridyl]ethanone

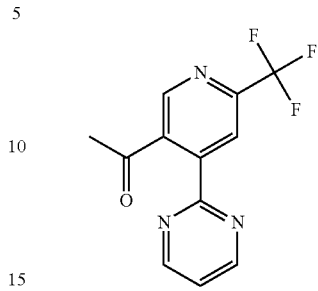

Copper(I) iodide (35 mg, 0.18 mmol) and Pd(PPh$_3$)$_4$ (210 mg, 0.18 mmol) were weighed into a vial. tributyl(pyrimidin-2-yl)stannane (0.67 g, 1.8 mmol) and 1-[4-chloro-6-(trifluoromethyl)-3-pyridyl]ethanone (0.45 g, 2.0 mmol) were added to the mixture. The whole mix was suspended in dry toluene (8.2 mL). The reaction mixture was heated under reflux for 18 hours, then diluted with ethylacetate and filtered over a celite pad. The filtrate was concentrated under reduced pressure. A purification was carried out by chromatography on silica gel to afford 1-[4-pyrimidin-2-yl-6-(trifluoromethyl)-3-pyridyl]ethanone.

LC-MS (method 1): retention time 0.86 min, m/z 268 [M+H$^+$].

$^1$H NMR (400 MHz, Chloroform-d) δ/ppm: 2.57 (s, 3H), 7.37-7.43 (m, 1H), 8.65 (s, 1H), 8.76 (s, 1H), 8.91 (d, J=5.14 Hz, 2H).

Step 4: Preparation of N-(cyclopropylmethyl)-1-[4-pyrimidin-2-yl-6-(trifluoromethyl)-3-pyridyl]-ethanamine

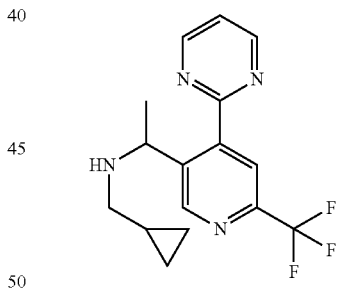

To a solution of 1-[4-pyrimidin-2-yl-6-(trifluoromethyl)-3-pyridyl]ethanone (440 mg, 1.60 mmol, 1.00 equiv.) in methanol (7.0 mL) was added sequentially cyclopropylamine (0.44 mL, 360 mg, 4.90 mmol, 3.00 equiv.) and titanium(IV)isopropoxide (0.65 mL, 0.630 g, 2.10 mmol, 1.30 equiv.) at room temperature. The reaction mixture was warmed to 35° C. and stirring continued for 20 h. The reaction mixture was concentrated in vacuo, redissolved in toluene (8.0 mL), cyclopropylmethylamine (0.44 mL, 360 mg, 4.90 mmol, 3.00 equiv.) and titanium(IV)isopropoxide (0.65 mL, 0.630 g, 2.10 mmol, 1.30 equiv.) were added and the mixture was heated to 70° C. for 2 h. Following removal of the volatiles under reduced pressure, methanol (10 mL) was added and sodium borohydride (64 mg, 1.60 mmol, 1.00 equiv.) was added slowly to the stirred solution at room temperature. After 20 min stirring at room temperature, the reaction mixture was quenched with sat. NH4Cl solution at 0° C. After further stirring for 30 min, the reaction mixture was diluted with ethyl acetate and the slurry filtered through a plug of celite. The organic filtrate was washed with brine, dried (MgSO₄), filtered and evaporated. The desired product was obtained as a crude material following removal of the volatiles in vacuo pure enough for the next step.

LC-MS (method 1): retention time 0.69 min, m/z 323 [M+H⁺].

Step 5: Preparation of N-(cyclopropylmethyl)-N-[1-[4-pyrimidin-2-yl-6-(trifluoromethyl)-3-pyridyl]ethyl]-3,5-bis(trifluoromethyl)benzamide

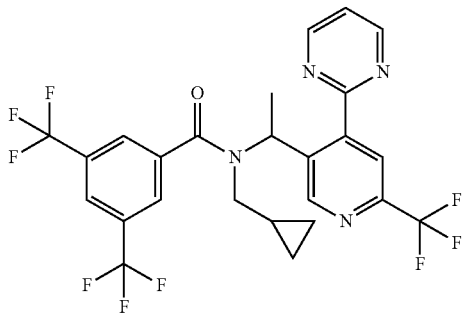 [SMILES: CC(c1cnc(C(F)(F)F)cc1-c1ncccn1)N(CC1CC1)C(=O)c1cc(C(F)(F)F)cc(C(F)(F)F)c1]

To a solution of N-(cyclopropylmethyl)-1-[4-pyrimidin-2-yl-6-(trifluoromethyl)-3-pyridyl]-ethanamine (0.47 g, 1.20 mmol, 2.00 equiv.) and trimethylamine (0.18 g, 1.70 mmol, 3.00 equiv.) in dichloromethane (5.8 mL) was added dropwise 3,5-bis(trifluoromethyl)benzoyl chloride (0.16 g, 0.58 mmol, 1.00 equiv.) at 0° C. The reaction mixture was stirred at rt for 1 h before addition of Isolute and evaporation of the volatiles in vacuo. Purification by flash chromatography (Combiflash, silica gel, 5-25% ethyl acetate in cyclohexane) furnished the desired product a colorless solid.

LC-MS (method 1): retention time 1.21 min, m/z 563 [M+H⁺].

Example H3: Synthesis of N-[1-[2-(1,2-dihydropyrimidin-2-yl)-1,2-dihydropyrazin-3-yl]ethyl]-3,5-bis(trifluoromethyl)benzamide (Compound P12)

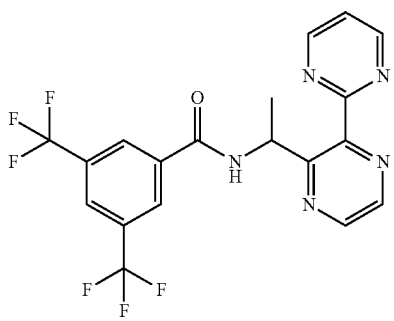 [SMILES: CC(NC(=O)c1cc(C(F)(F)F)cc(C(F)(F)F)c1)c1nccnc1-c1ncccn1]

Step 1: Preparation of 1-(3-chloropyrazin-2-yl)ethanamine hydrochloride

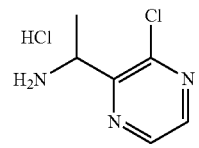

At room temperature, to a solution of 1-(3-chloropyrazin-2-yl)ethanone [CAS 121246-90-0] (5.00 g, 31.9 mmol) in methanol (80 mL) were added portionwise ammonium acetate (49.7 g, 639 mmol) and sodium cyanoborohydride (2.11 g, 31.9 mmol). The resulting suspension was stirred at room temp. overnight before being concentrated in vacuo. The residual was picked up in ethyl acetate and 2M NaOH. The organic layer was dried (MgSO₄), filtered and evaporated. The residue was dissolved in diethyl ether and HCl in ethyl acetate (25 mL) was added dropwise. The formed precipitate was filtered off and dried to afford 1-(3-chloropyrazin-2-yl)ethanamine hydrochloride as a beige solid.

¹H NMR (400 MHz, DMSO-d) 6/ppm: 1.52 (s, 3H) 4.77 (br s, 1H) 8.61 (d, J=2.57 Hz, 1H) 8.78 (d, J=2.2 Hz, 1H).

LC-MS (method 1): retention time 0.17 min, m/z 158 [M+H⁺].

Step 2: N-[1-(3-chloropyrazin-2-yl)ethyl]-3,5-bis(trifluoromethyl)benzamide

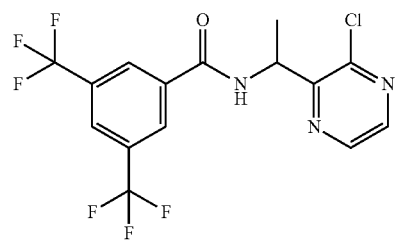 [SMILES: CC(NC(=O)c1cc(C(F)(F)F)cc(C(F)(F)F)c1)c1nccnc1Cl]

1-(3-chloropyrazin-2-yl)ethanamine hydrochloride (2.50 g, 12.9 mmol) was suspended in 2-methyltetrahydrofuran (51 mL). N,N-diisopropylethylamine (6.68 mL, 38.6 mmol) was added followed by 3,5-bis(trifluoromethyl)benzoyl chloride [CAS 785-56-8] (2.41 mL, 12.9 mmol). The resulting suspension was stirred at room temp. overnight. The reaction mixture was diluted with ethyl acetate and water was added. Organic layer was isolated, dried (MgSO₄), filtered and evaporated. Purification by flash chromatography (Combiflash, silica gel, 5-50% ethyl acetate in cyclohexane) afforded N-[1-(3-chloropyrazin-2-yl)ethyl]-3,5-bis(trifluoromethyl)benzamide as colorless solid.

¹H NMR (400 MHz, Chloroform-d) 6/ppm: 1.65 (d, J=6.97 Hz, 3H) 5.77-5.83 (m, 1H) 7.63 (br d, J=6.97 Hz, 1H) 8.08 (s, 1H) 8.30 (s, 2H) 8.41 (d, J=2.57 Hz, 1H) 8.54 (d, J=2.57 Hz, 1H) LC-MS (method 1): retention time 1.09 min, m/z 398 [M+H⁺].

Step 3: Preparation of N-[1-(3-pyrimidin-2-ylpyrazin-2-yl)ethyl]-3,5-bis(trifluoromethyl)benzamide (P12)

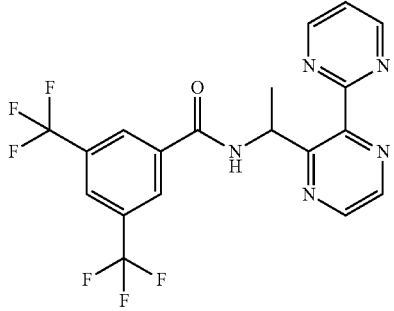

Under argon to a solution of N-[1-(3-chloropyrazin-2-yl)ethyl]-3,5-bis(trifluoromethyl)benzamide (300 mg, 0.754 mmol) in toluene (3 mL) was added tributyl(pyrimidin-2-yl)stannane (334 mg, 0.905 mmol) followed by copper(I) iodode (14.7 mg, 0.0754 mmol) and tetrakis(triphenylphosphine)palladium(0) (91.8 mg, 0.0754 mmol). The resulting reaction mixture was heated under microwave irradiation at 140° C. for 1 h before evaporation of the volatiles in vacuo. Purification by flash chromatography (Combiflash, silica gel, 5-100% ethyl acetate in cyclohexane) and reversed phase chromatography (Combiflash, Prep HPLC, 20-100% acetonitrile in water+0.2% formic acid) furnished N-[1-(3-pyrimidin-2-ylpyrazin-2-yl)ethyl]-3,5-bis(trifluoromethyl) benzamide as a solid.

$^1$H NMR (400 MHz, DMSO-d) 6/ppm: 1.63 (d, J=6.97 Hz, 3H) 5.61-5.68 (m, 1H) 7.59 (br t, J=5.14×(2) hz, 1H) 8.28 (s, 1H) 8.37 (s, 2H) 8.71 (s, 1H) 8.79 (s, 1H) 8.97 (br d, J=4.4 Hz, 2H) 9.35 (br d, J=6.6 Hz, 1H) LC-MS (method 1): retention time 0.97 min, m/z 442 [M+H$^+$].

Example H4: Synthesis of N-[1-[3-(2-pyridyl)pyrazin-2-yl]ethyl]-3,5-bis(trifluoromethyl)benzamide

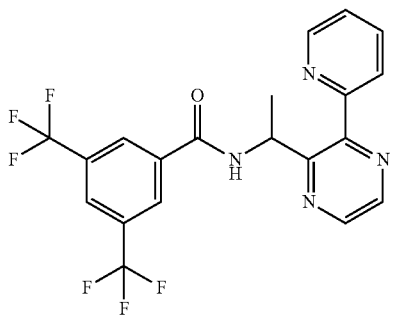

Step 1: Preparation of N-[1-[3-(2-pyridyl)pyrazin-2-yl]ethyl]prop-2-en-1-amine

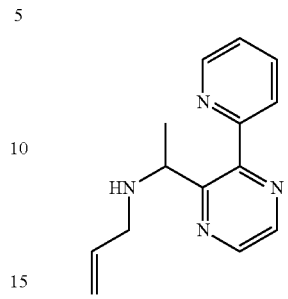

To a solution of 1-[3-(2-pyridyl)pyrazin-2-yl]ethanone [obtained as described under H1, step 1] (700 mg, 3.51 mmol) in methanol (14 mL) was added prop-2-en-1-amine (0.79 mL, 10.5 mmol) and titanium(V) isopropoxide (1.4 mL, 4.6 mmol) via syringe. After stirring at room temperature overnight sodium borohydride was added slowly at room temperature (gas evolution was observed). After 1 hour, the reaction mixture was quenched by dropwise addition of of water and concentrated in vacuo in presence of silica gel. The crude product was purified by flash chromatography (Combiflash, silica gel, 0-20% methanol in dichloromethane) to afford N-[1-[3-(2-pyridyl)pyrazin-2-yl]ethyl]prop-2-en-1-amine.

$^1$H NMR (400 MHz, Chloroform-d) 6/ppm: 1.49 (d, J=6.6, 3H) 2.99-3.02 (m, 2H) 4.58-4.63 (q, J=6.6×(3), 1H) 4.92-5.01 (m, 1H) 5.74-5.84 (m, 1H) 7.36-7.39 (m, 1H), 7.85 (m, 2H) 8.54 (d, J=2.2, 1H) 8.64, (d, J=2.2, 1H) 8.71-8.73 (m, 1H)

Step 3: Preparation of 1-[3-(2-pyridyl)pyrazin-2-yl]ethanamine

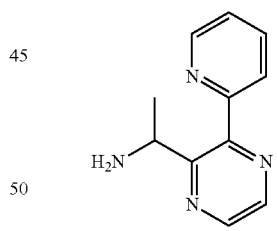

To a solution of N-[1-[3-(2-pyridyl)pyrazin-2-yl]ethyl]prop-2-en-1-amine (150 mg, 0.264 mmol) in dichloromethane (5 mL) under argon atmosphere was added 1,3-dimethylbarbituric acid (292 mg, 1.87 mmol) and tetrakis(triphenylphosphine)palladium(0) (14.5 mg, 0.125 mmol). The resulting orange solution was stirred at 35° C. for 1 h. Then, reaction mixture was filtered over Celite, washed with dichloromethane and concentrated in vacuo. The crude product was purified by chromatography to afford 1-[3-(2-pyridyl)pyrazin-2-yl]ethanamine.

LC-MS (method 1): retention time 0.24 min, m/z 201 [M+H$^+$].

Step 4: Preparation of N-[1-[3-(2-pyridyl)pyrazin-2-yl]ethyl]-3,5-bis(trifluoromethyl)benzamide

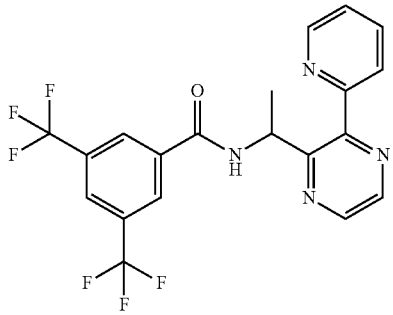 [SMILES: CC(NC(=O)c1cc(C(F)(F)F)cc(C(F)(F)F)c1)c1nccnc1-c1ncccn1]

To a solution of 1-[3-(2-pyridyl)pyrazin-2-yl]ethanamine (125 mg, 0.624 mmol) and N,N-diisopropylethylamine (0.214 mL, 1.25 mmol) in N,N-dimethylformamide (1.87 mL) was added 3,5-bis(trifluoromethyl)benzoic acid (181 mg, 0.687 mmol) followed by the addition of HATU [O-(7-Azabenzotriazol-1-yl)-N,N,N',N'-tetramethyluronium-hexafluorphosphate] (356 mg, 0.936 mmol) at room temperature. The resulting mixture was stirred overnight at room temperature and poured into NH$_4$Cl sat solution. The mixture was extracted with ethyl acetate, and the combined organic phases dried over sodium sulfate, filtered and concentrated in vacuo. The crude product was purified by chromatography to afford N-[1-[3-(2-pyridyl)pyrazin-2-yl]ethyl]-3,5-bis(trifluoromethyl)benzamide.

$^1$H NMR (400 MHz, Chloroform-d) δ/ppm: 1.62 (d, J=6.97 Hz, 3H) 6.25-6.32 (m, 1H) 7.43-7.47 (m, 1H) 7.91-7.69 (m, 1H) 8.02 (s, 1H) 8.11-8.13 (m, 1H), 8.29 (s, 2H) 8.63 (s, J=2.2 Hz, 1H) 8.66 (d, J=2.2 Hz, 1H) 8.79-8.81 (m, 1H) LC-MS (method 1): retention time 1.07 min, m/z 441 [M+H$^+$].

Example H5: Synthesis of N-[1-(5-methyl-3-pyrimidin-2-yl-pyrazin-2-yl)ethyl]-3,5-bis(trifluoromethyl)benzamide

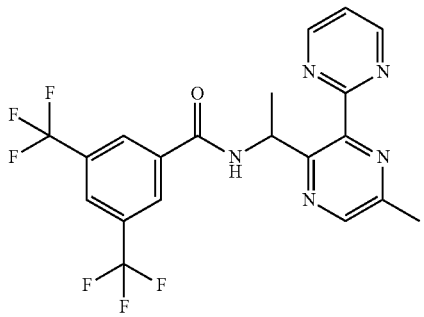 [SMILES: Cc1cnc(C(C)NC(=O)c2cc(C(F)(F)F)cc(C(F)(F)F)c2)c(-c2ncccn2)n1]

Step 1: Preparation of lithium 3-chloro-5-methyl-pyrazine-2-carboxylate

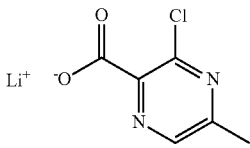

To a solution of methyl 3-chloro-5-methyl-pyrazine-2-carboxylate [CAS 859063-65-3] (3.00 g, 16.1 mmol) in merhanol (4.8 mL), tetrahydrofuran (32.2 mL) and water (4.82 mL) was added lithium hydroxide (424 mg, 17.7 mmol) and the resulting suspension was stirred at room temp. for 2 h. Evaporation of volatiles in vacuo afforded lithium 3-chloro-5-methyl-pyrazine-2-carboxylate as a colourless solid.

LC-MS (method 1): retention time 0.24 min, m/z 173 [M+H$^+$].

Step 2: 3-chloro-5-methyl-pyrazine-2-carbonyl chloride

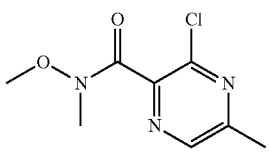

To a solution of lithium 3-chloro-5-methyl-pyrazine-2-carboxylate (3.00 g, 16.8 mmol) in dichloromethane (50 mL) was added oxalyl chloride (1.65 mL, 18.5 mmol) and the resulting suspension was stirred at room temp. for 3 h. Volatiles were evaporated under reduced pressure to afford 3-chloro-5-methyl-pyrazine-2-carbonyl chloride.

LC-MS (method 1) [after MeOH quench]: retention time 0.69 min, m/z 187 [M+H$^+$].

Step 3: Preparation of 3-chloro-N-methoxy-N,5-dimethyl-pyrazine-2-carboxamide

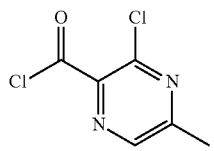

To a suspension of 3-chloro-5-methyl-pyrazine-2-carbonyl chloride (3.10 g, 16.2 mmol) in tetrahydrofuran (50 mL) was added N,O-dimethylhydroxylamine hydrochloride (1.78 g, 17.9 mmol) and N,N-diisopropylethylamine (9.92 mL, 56.8 mmol). The reaction mixture was stirred at RT for 1 h and was then diluted with ethyl acetate and water. The organic layer was dried (MgSO$_4$), filtered and evaporated in vacuo. Purification by flash chromatography (Combiflash, silica gel, 10-35% ethyl acetate in cyclohexane) afforded 3-chloro-N-methoxy-N,5-dimethyl-pyrazine-2-carboxamide as a yellow solid.

¹H NMR (400 MHz, Chloroform-d) δ/ppm: 2.63 (s, 3H) 3.44 (s, 3H) 3.60 (s, 3H) 8.39 (s, 1H) LC-MS (method 1): retention time 0.63 min, m/z 216 [M+H⁺].

Step 4: Preparation of 1-(3-chloro-5-methyl-pyrazin-2-yl)ethanone

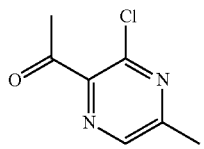

Under argon atmosphere at 0° C. a solution of methylmagnesium bromide (1M in THF, 5.1 mL, 5.1 mmol) was added to toluene (19 mL). Subsequently, a solution of 3-chloro-N-methoxy-N,5-dimethyl-pyrazine-2-carboxamide (500 mg, 2.30 mmol) in toluene (5 mL) was added dropwise over 5 minutes (exothermic). After completion of the addition, the reaction mixture was stirred at 0° C. for 15 min, allowed to warm up to room temp. and stirring was continued for 5 h. The reaction mixture was quenched with aqueous 1M HCl solution (exothermic) and ethyl acetate was added. The organic layer was dried (MgSO₄), filtered and evaporated in vacuo to afford 1-(3-chloro-5-methyl-pyrazin-2-yl)ethanone as a solid.

¹H NMR (400 MHz, Chloroform-d) δ/ppm: 2.65 (s, 3H) 2.71 (s, 3H) 8.43 (s, 1H) LC-MS (method 1): retention time 0.71 min, m/z 171 [M+H⁺].

Step 5: Preparation of 1-(3-chloro-5-methyl-pyrazin-2-yl)ethanamine hydrochloride

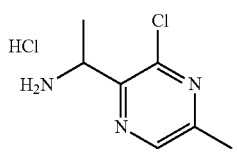

To a solution of 1-(3-chloro-5-methyl-pyrazin-2-yl)ethanone (400 mg, 2.3 mmol) in methanol (5.9 mL) at room temperature were added portionwise ammonium acetate (2.7 g, 35 mmol) and sodium cyanoborohydride (0.16 g, 2.3 mmol). The resulting suspension was stirred at room temp. over the weekend. Concentration in vacuo led to a residue that treated with in ethyl acetate and 2M NaOH solution. The organic layer was dried (MgSO₄), filtered and evaporated. The residue was dissolved in diethyl ether and HCl in ethyl acetate was added dropwise. The obtained precipitate was filtered off and dried to afford 1-(3-chloro-5-methyl-pyrazin-2-yl)ethanamine hydrochloride as an off-white solid.

LC-MS (method 1): retention time 0.19 min, m/z 172 [M+H⁺].

Step 6: N-[1-(3-chloro-5-methyl-pyrazin-2-yl)ethyl]-3,5-bis(trifluoromethyl)benzamide

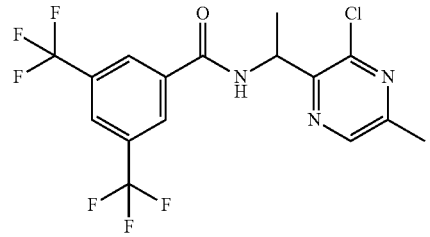 [SMILES: Cc1cnc(C(C)NC(=O)c2cc(C(F)(F)F)cc(C(F)(F)F)c2)c(Cl)n1]

1-(3-chloro-5-methyl-pyrazin-2-yl)ethanamine hydrochloride (193 mg, 0.927 mmol) was suspended in 2-methyltetrahydrofuran (5.56 mL) and N,N-diisopropylethylamine (0.486 mL, 2.78 mmol) was added followed by 3,5-bis(trifluoromethyl)benzoyl chloride [CAS 785-56-8] (0.190 mL, 1.02 mmol). The resulting suspension was stirred at rook temp. for 1 h. The reaction mixture was diluted with ethyl acetate and water was added. The organic layer was separated, dried (MgSO₄), filtered and evaporated.

Purification by flash chromatography (Combiflash, silica gel, 5-20% ethyl acetate in cyclohexane) afforded N-[1-(3-chloro-5-methyl-pyrazin-2-yl)ethyl]-3,5-bis(trifluoromethyl)benzamide as colorless solid.

¹H NMR (400 MHz, Chloroform-d) δ/ppm: 1.62 (d, J=6.97, 3H) 2.61 (s, 3H) 5.71-5.78 (m, 1H) 7.62 (br d, J=6.97 Hz, 1H) 8.05 (s, 1H) 8.30 (s, 2H), 8.40 (s, 1H) LC-MS (method 1): retention time 1.14 min, m/z 412 [M+H⁺].

Step 7: Preparation of N-[1-(5-methyl-3-pyrimidin-2-yl-pyrazin-2-yl)ethyl]-3,5-bis(trifluoromethyl)benzamide Example H6: Synthesis of N-[1-[3-(5-chloro-2-pyridyl)pyrazin-2-yl]ethyl]-3,5-bis(trifluoromethyl)benzamide

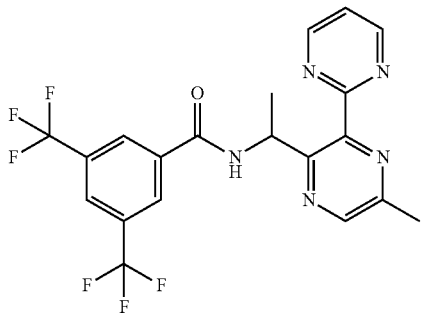 [SMILES: Cc1cnc(C(C)NC(=O)c2cc(C(F)(F)F)cc(C(F)(F)F)c2)c(-c2ncccn2)n1]

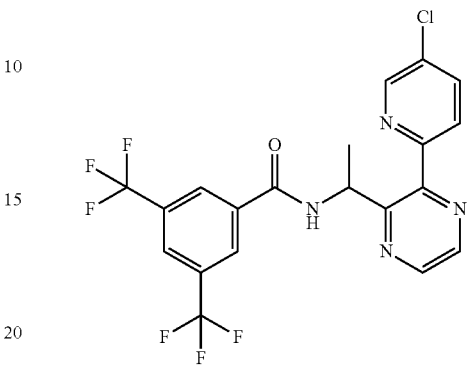

Under argon atmosphere, to a solution of N-[1-(3-chloro-5-methyl-pyrazin-2-yl)ethyl]-3,5-bis(trifluoromethyl)benzamide (240 mg, 0.583 mmol) in toluene (2.3 mL) was added tributyl(pyrimidin-2-yl)stannane (258 mg, 0.700 mmol) followed by copper(I) iodode (11.3 mg, 0.0583 mmol) and tetrakis(triphenylphosphine)palladium(0) (70.1 mg, 0.0583 mmol). The resulting reaction mixture was heated under microwave irradiation at 140° C. for 1 h before evaporation of the volatiles in vacuo. Purification by flash chromatography (Combiflash, silica gel, 5-100% ethyl acetate in cyclohexane) and reversed phase chromatography (Combiflash, Prep HPLC, 20-100% acetonitrile in water+0.2% formic acid) furnished N-[1-(5-methyl-3-pyrimidin-2-yl-pyrazin-2-yl)ethyl]-3,5-bis(trifluoromethyl)benzamide as a solid.

$^1$H NMR (400 MHz, chloroform-d) δ/ppm: 1.61 (d, J=6.6 Hz, 3H) 2.75 (s, 3H) 6.10-6.17 (m, 1H) 7.46 (m, 1H), 7.83 (br d, J=6.97 Hz, 1H) 8.02 (s, 1H) 8.26 (s, 2H) 8.61 (br s, 1H) 9.04 (br d, J=2.2 Hz, 2H) LC-MS (method 1): retention time 1.01 min, m/z 456 [M+H$^+$].

To a solution of N-[1-(3-chloropyrazin-2-yl)ethyl]-3,5-bis(trifluoromethyl)benzamide [see example H3, step 2 above] (450 mg, 1.13 mmol) in DMF (7.5 mL) was added (5-chloro-2-pyridyl)boronic acid (356 mg, 2.26 mmol) followed by palladium(II) acetate (13.1 mg, 0.0565 mmol), 1,1'-bis(diphenylphosphino)ferrocene (66.0 mg, 0.113 mmol), copper(I) iodide (212 mg, 1.13 mmol) and cesium carbonate (745 mg, 2.263 mmol). The resulting suspension was stirred at 100° C. for 3 h. The reaction mixture was filtered and directly purified by reversed phase chromatography (Combiflash, Prep HPLC, 20-100% acetonitrile in water+0.2% formic acid) and re-purified by flash chromatography (Combiflash, silica gel, 5-50% ethyl acetate in cyclohexane) to afford N-[1-[3-(5-chloro-2-pyridyl)pyrazin-2-yl]ethyl]-3,5-bis(trifluoromethyl)benzamide as a solid.

LC-MS (method 1): retention time 1.20 min. m/z 475 [M+H$^+$].

TABLE P

Examples of compounds of formula I

| Entry | IUPAC name | STRUCTURE | RT (min) | [M + H] (measured) | Method | MP ° C. |
|---|---|---|---|---|---|---|
| P1 | N-(cyclopropylmethyl)-N-[1-(2-pyrimidin-2-yl-3-pyridyl)ethyl]-3,5-bis(trifluoromethyl)benzamide | | 1.03 | 495 | 1 | |

TABLE P-continued

Examples of compounds of formula I

| Entry | IUPAC name | STRUCTURE | RT (min) | [M + H] (measured) | Method | MP ° C. |
|---|---|---|---|---|---|---|
| P2 | N-(cyclopropylmethyl)-N-[1-(4-pyrimidin-2-yl-3-pyridyl)ethyl]-3,5-bis(trifluoromethyl)benzamide | | 1.04 | 495 | 1 | |
| P3 | N-(cyclopropylmethyl)-N-[1-(3-pyrimidin-2-yl-2-pyridyl)ethyl]-3,5-bis(trifluoromethyl)benzamide | | 1.17 | 495 | 1 | |
| P4 | N-(cyclopropylmethyl)-N-[1-(3-pyrimidin-2-ylpyridazin-4-yl)ethyl]-3,5-bis(trifluoromethyl)benzamide | | 0.99 | 496 | 1 | |
| P5 | N-(cyclopropylmethyl)-N-[1-(3-pyrimidin-2-ylpyrazin-2-yl)ethyl]-3,5-bis(trifluoromethyl)benzamide | | 1.06 | 496 | 1 | |

TABLE P-continued

Examples of compounds of formula I

| Entry | IUPAC name | STRUCTURE | RT (min) | [M + H] (measured) | Method | MP ° C. |
|---|---|---|---|---|---|---|
| P6 | N-(cyclopropylmethyl)-N-[1-(5-pyrimidin-2-ylpyrimidin-4-yl)ethyl]-3,5-bis(trifluoromethyl)benzamide | | 1.12 | 496 | 1 | |
| P7 | N-(cyclopropylmethyl)-N-[1-[3-(2-pyridyl)pyrazin-2-yl]ethyl]-3,5-bis(trifluoromethyl)benzamide | | 1.18 | 495 | 1 | |
| P8 | N-[1-(6-chloro-4-pyrimidin-2-yl-3-pyridyl)ethyl]-N-(cyclopropylmethyl)-3,5-bis(trifluoromethyl)benzamide | | 1.19 | 529 | 1 | |
| P9 | N-(cyclopropylmethyl)-N-[1-(6-fluoro-3-pyrimidin-2-yl-2-pyridyl)ethyl]-3,5-bis(trifluoromethyl)benzamide | | 1.21 | 513 | 1 | |

TABLE P-continued

Examples of compounds of formula I

| Entry | IUPAC name | STRUCTURE | RT (min) | [M + H] (measured) | Method | MP ° C. |
|---|---|---|---|---|---|---|
| P10 | N-(cyclopropylmethyl)-N-[1-[4-pyrimidin-2-yl-6-(trifluoromethyl)-3-pyridyl]ethyl]-3,5-bis(trifluoromethyl)benzamide | | 1.21 | 563 | 1 | 116-118 |
| P11 | 3-chloro-N-(cyclopropylmethyl)-N-[1-[3-(2-pyridyl)pyrazin-2-yl]ethyl]-5-(trifluoromethyl)benzamide | | 1.17 | 461 | 1 | |
| P12 | N-[1-(3-pyrimidin-2-ylpyrazin-2-yl)ethyl]-3,5-bis(trifluoromethyl)benzamide | | 0.98 | 442 | 1 | 190-200 |
| P13 | N-[1-[3-(3-fluoro-2-pyridyl)pyrazin-2-yl]ethyl]-3,5-bis(trifluoromethyl)benzamide | | 1.05 | 459 | 1 | 153-158 |

TABLE P-continued

Examples of compounds of formula I

| Entry | IUPAC name | STRUCTURE | RT (min) | [M + H] (measured) | Method | MP ° C. |
|---|---|---|---|---|---|---|
| P14 | 3-(2,2-difluoroethoxy)-N-[1-(3-pyrimidin-2-ylpyrazin-2-yl)ethyl]-5-(trifluoromethyl)benzamide | | | 454 | 3 | 146-148 |
| P15 | N-[1-(3-pyrimidin-2-ylpyrazin-2-yl)ethyl]-2,6-bis(trifluoromethyl)pyridine-4-carboxamide | | 6.95 | 443 | 3 | 166-168 |
| P16 | 3-chloro-N-[1-(3-pyrimidin-2-ylpyrazin-2-yl)ethyl]-5-(trifluoromethoxy)benzamide | | 7.07 | 424 | 3 | 130-132 |
| P17 | N-[1-(3-pyrimidin-2-ylpyrazin-2-yl)ethyl]-3-(2,2,2-trifluoroethoxy)-5-(trifluoromethyl)benzamide | | 7.09 | 472 | 3 | 152-154 |

TABLE P-continued

Examples of compounds of formula I

| Entry | IUPAC name | STRUCTURE | RT (min) | [M + H] (measured) | Method | MP ° C. |
|---|---|---|---|---|---|---|
| P18 | N-[1-[3-(5-fluoro-2-pyridyl)pyrazin-2-yl]ethyl]-3,5-bis(trifluoromethyl)benzamide | | 1.05 | 459 | 1 | 160-166 |
| P19 | N-[1-(3-pyrimidin-2-ylpyrazin-2-yl)ethyl]-3-(trifluoromethyl)-5-(trifluoromethylsulfanyl)benzamide | | 7.53 | 474 | 3 | 149-151 |
| P20 | 3-bromo-N-[1-(3-pyrimidin-2-ylpyrazin-2-yl)ethyl]-5-(trifluoromethyl)benzamide | | 7.06 | 452 | 3 | 172-175 |
| P21 | 3-chloro-N-[1-(3-pyrimidin-2-ylpyrazin-2-yl)ethyl]-5-(trifluoromethyl)benzamide | | 7.11 | 408 | 3 | 163-166 |

TABLE P-continued

Examples of compounds of formula I

| Entry | IUPAC name | STRUCTURE | RT (min) | [M + H] (measured) | Method | MP ° C. |
|---|---|---|---|---|---|---|
| P22 | 3-(difluoromethyl)-N-[1-(3-pyrimidin-2-ylpyrazin-2-yl)ethyl]-5-(trifluoromethyl)benzamide | | 6.97 | 424 | 3 | 150-153 |
| P23 | 3-(difluoromethoxy)-N-[1-(3-pyrimidin-2-ylpyrazin-2-yl)ethyl]-5-(trifluoromethyl)benzamide | | 7.05 | 440 | 3 | 183-185 |
| P24 | N-(cyclopropylmethyl)-3-(difluoromethoxy)-N-[1-(3-pyrimidin-2-ylpyrazin-2-yl)ethyl]-5-(trifluoromethyl)benzamide | | 1.06 | 494 | 1 | |
| P25 | N-[1-[3-(2-pyridyl)pyrazin-2-yl]ethyl]-3,5-bis(trifluoromethyl)benzamide | | 1.07 | 441 | 1 | 152-158 |

TABLE P-continued

Examples of compounds of formula I

| Entry | IUPAC name | STRUCTURE | RT (min) | [M + H] (measured) | Method | MP ° C. |
|---|---|---|---|---|---|---|
| P26 | N-(cyclopropylmethyl)-N-[1-(2-pyrimidin-2-ylphenyl)ethyl]-3,5-bis(trifluoromethyl)benzamide | | 1.19 | 494 | 1 | |
| P27 | 3-chloro-N-(cyclopropylmethyl)-N-[1-[2-(2-pyridyl)phenyl]ethyl]-5-(trifluoromethyl)benzamide | | 1.20 | 461 | 1 | |
| P28 | N-(cyclopropylmethyl)-N-[1-[2-(2-pyridyl)phenyl]ethyl]-3,5-bis(trifluoromethyl)benzamide | | 1.22 | 493 | 1 | |
| P29 | N-[1-(5-methyl-3-pyrimidin-2-yl-pyrazin-2-yl)ethyl]-3,5-bis(trifluoromethyl)benzamide | | 1.01 | 456 | 1 | 247-255 |

TABLE P-continued

Examples of compounds of formula I

| Entry | IUPAC name | STRUCTURE | RT (min) | [M + H] (measured) | Method | MP ° C. |
|---|---|---|---|---|---|---|
| P32 | N-[1-[3-(5-cyclopropylpyrimidin-2-yl)pyrazin-2-yl]ethyl]-3-(2,2-difluoroethoxy)-5-(trifluoromethyl)benzamide | | 7.17 | 494 | 3 | 60-65 |
| P33 | N-[1-[3-(5-cyclopropylpyrimidin-2-yl)pyrazin-2-yl]ethyl]-3-(difluoromethoxy)-5-(trifluoromethyl)benzamide | | 7.46 | 480 | 3 | 135-140 |
| P34 | 3-(2,2-difluoroethoxy)-N-[1-[3-(5-fluoro-2-pyridyl)pyrazin-2-yl]ethyl]-5-(trifluoromethyl)benzamide | | 7.25 | 471 | 3 | 110-115 |
| P35 | 3-(difluoromethoxy)-N-[1-[3-(5-fluoro-2-pyridyl)pyrazin-2-yl]ethyl]-5-(trifluoromethyl)benzamide | | 7.29 | 457 | 3 | 125-130 |

TABLE P-continued

Examples of compounds of formula I

| Entry | IUPAC name | STRUCTURE | RT (min) | [M + H] (measured) | Method | MP ° C. |
|---|---|---|---|---|---|---|
| P36 | N-[1-[3-(5-chloro-2-pyridyl)pyrazin-2-yl]ethyl]-3,5-bis(trifluoromethyl)benzamide | | 1.20 | 475 | 1 | 165-172 |

The activity of the compositions according to the invention can be broadened considerably, and adapted to prevailing circumstances, by adding other insecticidally, acaricidally and/or fungicidally active ingredients. The mixtures of the compounds of formula I with other insecticidally, acaricidally and/or fungicidally active ingredients may also have further surprising advantages which can also be described, in a wider sense, as synergistic activity. For example, better tolerance by plants, reduced phytotoxicity, insects can be controlled in their different development stages or better behaviour during their production, for example during grinding or mixing, during their storage or during their use.

Suitable additions to active ingredients here are, for example, representatives of the following classes of active ingredients: organophosphorus compounds, nitrophenol derivatives, thioureas, juvenile hormones, formamidines, benzophenone derivatives, ureas, pyrrole derivatives, carbamates, pyrethroids, chlorinated hydrocarbons, acylureas, pyridylmethyleneamino derivatives, macrolides, neonicotinoids and Bacillus thuringiensis preparations.

The following mixtures of the compounds of formula I with active ingredients are preferred (where the abbreviation "TX" means "one compound selected from the compounds defined in the Tables A-1 to A-15, B-1 to B-15, C-1 to C-15, D-1 to D-30, E-1 to E-15, F-1 to F-15, G-1 to G-15, H-1 to H-15, I-1 to I-15, J-1 to J-15. K-1 to K-15, L-1 to L-15 and M-1 to M-60, and Table P"):

an adjuvant selected from the group of substances consisting of petroleum oils (alternative name) (628)+TX,
an acaricide selected from the group of substances consisting of 1,1-bis(4-chlorophenyl)-2-ethoxyethanol (IUPAC name) (910)+TX, 2,4-dichlorophenyl benzenesulfonate (IUPAC/Chemical Abstracts name) (1059)+TX, 2-fluoro-N-methyl-N-1-naphthylacetamide (IUPAC name) (1295)+TX, 4-chlorophenyl phenyl sulfone (IUPAC name) (981)+TX, abamectin (1)+TX, acequinocyl (3)+TX, acetoprole [CCN]+TX, acrinathrin (9)+TX, aldicarb (16)+TX, aldoxycarb (863)+TX, alpha-cypermethrin (202)+TX, amidithion (870)+TX, amidoflumet [CCN]+TX, amidothioate (872)+TX, amiton (875)+TX, amiton hydrogen oxalate (875)+TX, amitraz (24)+TX, aramite (881)+TX, arsenous oxide (882)+TX, AVI 382 (compound code)+TX, AZ 60541 (compound code)+TX, azinphos-ethyl (44)+TX, azinphos-methyl (45)+TX, azobenzene (IUPAC name) (888)+TX, azocyclotin (46)+TX, azothoate (889)+TX, benomyl (62)+TX, benoxafos (alternative name) [CCN]+TX, benzoximate (71)+TX, benzyl benzoate (IUPAC name) [CCN]+TX, bifenazate (74)+TX, bifenthrin (76)+TX, binapacryl (907)+TX, brofenvalerate (alternative name)+TX, bromocyclen (918)+TX, bromophos (920)+TX, bromophos-ethyl (921)+TX, bromopropylate (94)+TX, buprofezin (99)+TX, butocarboxim (103)+TX, butoxycarboxim (104)+TX, butylpyridaben (alternative name)+TX, calcium polysulfide (IUPAC name) (111)+TX, camphechlor (941)+TX, carbanolate (943)+TX, carbaryl (115)+TX, carbofuran (118)+TX, carbophenothion (947)+TX, CGA 50'439 (development code) (125)+TX, chinomethionat (126)+TX, chlorbenside (959)+TX, chlordimeform (964)+TX, chlordimeform hydrochloride (964)+TX, chlorfenapyr (130)+TX, chlorfenethol (968)+TX, chlorfenson (970)+TX, chlorfensulfide (971)+TX, chlorfenvinphos (131)+TX, chlorobenzilate (975)+TX, chloromebuform (977)+TX, chloromethiuron (978)+TX, chloropropylate (983)+TX, chlorpyrifos (145)+TX, chlorpyrifos-methyl (146)+TX, chlorthiophos (994)+TX, cinerin 1 (696)+TX, cinerin II (696)+TX, cinerins (696)+TX, clofentezine (158)+TX, closantel (alternative name) [CCN]+TX, coumaphos (174)+TX, crotamiton (alternative name) [CCN]+TX, crotoxyphos (1010)+TX, cufraneb (1013)+TX, cyanthoate (1020)+TX, cyflumetofen (CAS Reg. No.: 400882-07-7)+TX, cyhalothrin (196)+TX, cyhexatin (199)+TX, cypermethrin (201)+TX, DCPM (1032)+TX, DDT (219)+TX, demephion (1037)+TX, demephion-O (1037)+TX, demephion-S(1037)+TX, demeton (1038)+TX, demeton-methyl (224)+TX, demeton-O (1038)+TX, demeton-O-methyl (224)+TX, demeton-S(1038)+TX, demeton-S-methyl (224)+TX, demeton-S-methylsulfon (1039)+TX, diafenthiuron (226)+TX, dialifos (1042)+TX, diazinon (227)+TX, dichlofluanid (230)+TX, dichlorvos (236)+TX, dicliphos (alternative name)+TX, dicofol (242)+TX, dicrotophos (243)+TX, dienochlor (1071)+TX, dimefox (1081)+TX, dimethoate (262)+TX, dinactin (alternative name) (653)+TX, dinex (1089)+TX, dinex-diclexine (1089)+TX, dinobuton (269)+TX, dinocap (270)+TX, dinocap-4 [CCN]+TX, dinocap-6 [CCN]+TX, dinocton (1090)+

TX, dinopenton (1092)+TX, dinosulfon (1097)+TX, dinoterbon (1098)+TX, dioxathion (1102)+TX, diphenyl sulfone (IUPAC name) (1103)+TX, disulfiram (alternative name) [CCN]+TX, disulfoton (278)+TX, DNOC (282)+TX, dofenapyn (1113)+TX, doramectin (alternative name) [CCN]+TX, endosulfan (294)+TX, endothion (1121)+TX, EPN (297)+TX, eprinomectin (alternative name) [CCN]+TX, ethion (309)+TX, ethoate-methyl (1134)+TX, etoxazole (320)+TX, etrimfos (1142)+TX, fenazaflor (1147)+TX, fenazaquin (328)+TX, fenbutatin oxide (330)+TX, fenothiocarb (337)+TX, fenpropathrin (342)+TX, fenpyrad (alternative name)+TX, fenpyroximate (345)+TX, fenson (1157)+TX, fentrifanil (1161)+TX, fenvalerate (349)+TX, fipronil (354)+TX, fluacrypyrim (360)+TX, fluazuron (1166)+TX, flubenzimine (1167)+TX, flucycloxuron (366)+TX, flucythrinate (367)+TX, fluenetil (1169)+TX, flufenoxuron (370)+TX, flumethrin (372)+TX, fluorbenside (1174)+TX, fluvalinate (1184)+TX, FMC 1137 (development code) (1185)+TX, formetanate (405)+TX, formetanate hydrochloride (405)+TX, formothion (1192)+TX, formparanate (1193)+TX, gamma-HCH (430)+TX, glyodin (1205)+TX, halfenprox (424)+TX, heptenophos (432)+TX, hexadecyl cyclopropanecarboxylate (IUPAC/Chemical Abstracts name) (1216)+TX, hexythiazox (441)+TX, iodomethane (IUPAC name) (542)+TX, isocarbophos (alternative name) (473)+TX, isopropyl O-(methoxyaminothiophosphoryl)salicylate (IUPAC name) (473)+TX, ivermectin (alternative name) [CCN]+TX, jasmolin 1(696)+TX, jasmolin II (696)+TX, jodfenphos (1248)+TX, lindane (430)+TX, lufenuron (490)+TX, malathion (492)+TX, malonoben (1254)+TX, mecarbam (502)+TX, mephosfolan (1261)+TX, mesulfen (alternative name) [CCN]+TX, methacrifos (1266)+TX, methamidophos (527)+TX, methidathion (529)+TX, methiocarb (530)+TX, methomyl (531)+TX, methyl bromide (537)+TX, metolcarb (550)+TX, mevinphos (556)+TX, mexacarbate (1290)+TX, milbemectin (557)+TX, milbemycin oxime (alternative name) [CCN]+TX, mipafox (1293)+TX, monocrotophos (561)+TX, morphothion (1300)+TX, moxidectin (alternative name) [CCN]+TX, naled (567)+TX, NC-184 (compound code)+TX, NC-512 (compound code)+TX, nifluridide (1309)+TX, nikkomycins (alternative name) [CCN]+TX, nitrilacarb (1313)+TX, nitrilacarb 1:1 zinc chloride complex (1313)+TX, NNI-0101 (compound code)+TX, NNI-0250 (compound code)+TX, omethoate (594)+TX, oxamyl (602)+TX, oxydeprofos (1324)+TX, oxydisulfoton (1325)+TX, pp'-DDT (219)+TX, parathion (615)+TX, permethrin (626)+TX, petroleum oils (alternative name) (628)+TX, phenkapton (1330)+TX, phenthoate (631)+TX, phorate (636)+TX, phosalone (637)+TX, phosfolan (1338)+TX, phosmet (638)+TX, phosphamidon (639)+TX, phoxim (642)+TX, pirimiphos-methyl (652)+TX, polychloroterpenes (traditional name) (1347)+TX, polynactins (alternative name) (653)+TX, proclonol (1350)+TX, profenofos (662)+TX, promacyl (1354)+TX, propargite (671)+TX, propetamphos (673)+TX, propoxur (678)+TX, prothidathion (1360)+TX, prothoate (1362)+TX, pyrethrin I (696)+TX, pyrethrin II (696)+TX, pyrethrins (696)+TX, pyridaben (699)+TX, pyridaphenthion (701)+TX, pyridifen (706)+TX, pyrimitate (1370)+TX, quinalphos (711)+TX, quintiofos (1381)+TX, R-1492 (development code) (1382)+TX, RA-17 (development code) (1383)+TX, rotenone (722)+TX, schradan (1389)+TX, sebufos (alternative name)+TX, selamectin (alternative name) [CCN]+TX, SI-0009 (compound code)+TX, sophamide (1402)+TX, spirodiclofen (738)+TX, spiromesifen (739)+TX, SSI-121 (development code) (1404)+TX, sulfiram (alternative name) [CCN]+TX, sulfluramid (750)+TX, sulfotep (753)+TX, sulfur (754)+TX, SZI-121 (development code) (757)+TX, tau-fluvalinate (398)+TX, tebufenpyrad (763)+TX, TEPP (1417)+TX, terbam (alternative name)+TX, tetrachlorvinphos (777)+TX, tetradifon (786)+TX, tetranactin (alternative name) (653)+TX, tetrasul (1425)+TX, thiafenox (alternative name)+TX, thiocarboxime (1431)+TX, thiofanox (800)+TX, thiometon (801)+TX, thioquinox (1436)+TX, thuringiensin (alternative name) [CCN]+TX, triamiphos (1441)+TX, triarathene (1443)+TX, triazophos (820)+TX, triazuron (alternative name)+TX, trichlorfon (824)+TX, trifenofos (1455)+TX, trinactin (alternative name) (653)+TX, vamidothion (847)+TX, vaniliprole [CCN] and YI-5302 (compound code)+TX, an algicide selected from the group of substances consisting of bethoxazin [CCN]+TX, copper dioctanoate (IUPAC name) (170)+TX, copper sulfate (172)+TX, cybutryne [CCN]+TX, dichlone (1052)+TX, dichlorophen (232)+TX, endothal (295)+TX, fentin (347)+TX, hydrated lime [CCN]+TX, nabam (566)+TX, quinoclamine (714)+TX, quinonamid (1379)+TX, simazine (730)+TX, triphenyltin acetate (IUPAC name) (347) and triphenyltin hydroxide (IUPAC name) (347)+TX, an anthelmintic selected from the group of substances consisting of abamectin (1)+TX, crufomate (1011)+TX, doramectin (alternative name) [CCN]+TX, emamectin (291)+TX, emamectin benzoate (291)+TX, eprinomectin (alternative name) [CCN]+TX, ivermectin (alternative name) [CCN]+TX, milbemycin oxime (alternative name) [CCN]+TX, moxidectin (alternative name) [CCN]+TX, piperazine [CCN]+TX, selamectin (alternative name) [CCN]+TX, spinosad (737) and thiophanate (1435)+TX, an avicide selected from the group of substances consisting of chloralose (127)+TX, endrin (1122)+TX, fenthion (346)+TX, pyridin-4-amine (IUPAC name) (23) and strychnine (745)+TX, a bactericide selected from the group of substances consisting of 1-hydroxy-1H-pyridine-2-thione (IUPAC name) (1222)+TX, 4-(quinoxalin-2-ylamino)benzenesulfonamide (IUPAC name) (748)+TX, 8-hydroxyquinoline sulfate (446)+TX, bronopol (97)+TX, copper dioctanoate (IUPAC name) (170)+TX, copper hydroxide (IUPAC name) (169)+TX, cresol [CCN]+TX, dichlorophen (232)+TX, dipyrithione (1105)+TX, dodicin (1112)+TX, fenaminosulf (1144)+TX, formaldehyde (404)+TX, hydrargaphen (alternative name) [CCN]+TX, kasugamycin (483)+TX, kasugamycin hydrochloride hydrate (483)+TX, nickel bis(dimethyldithiocarbamate) (IUPAC name) (1308)+TX, nitrapyrin (580)+TX, octhilinone (590)+TX, oxolinic acid (606)+TX, oxytetracycline (611)+TX, potassium hydroxyquinoline sulfate (446)+TX, probenazole (658)+TX, streptomycin (744)+TX, streptomycin sesquisulfate (744)+TX, tecloftalam (766)+TX, and thiomersal (alternative name) [CCN]+TX, a biological agent selected from the group of substances consisting of *Adoxophyes orana* GV (alternative name) (12)+TX, *Agrobacterium radiobacter* (alternative name) (13)+TX, *Amblyseius* spp. (alternative name) (19)+TX, *Anagrapha falcifera* NPV (alternative name)

(28)+TX, *Anagrus atomus* (alternative name) (29)+TX, *Aphelinus abdominalis* (alternative name) (33)+TX, *Aphidius colemani* (alternative name) (34)+TX, *Aphidoletes aphidimyza* (alternative name) (35)+TX, *Autographa californica* NPV (alternative name) (38)+TX, *Bacillus firmus* (alternative name) (48)+TX, *Bacillus sphaericus* Neide (scientific name) (49)+TX, *Bacillus thuringiensis* Berliner (scientific name) (51)+TX, *Bacillus thuringiensis* subsp. *aizawai* (scientific name) (51)+TX, *Bacillus thuringiensis* subsp. *israelensis* (scientific name) (51)+TX, *Bacillus thuringiensis* subsp. *japonensis* (scientific name) (51)+TX, *Bacillus thuringiensis* subsp. *kurstaki* (scientific name) (51)+TX, *Bacillus thuringiensis* subsp. *tenebrionis* (scientific name) (51)+TX, *Beauveria bassiana* (alternative name) (53)+TX, *Beauveria brongniartii* (alternative name) (54)+TX, *Chrysoperla carnea* (alternative name) (151)+TX, *Cryptolaemus montrouzieri* (alternative name) (178)+TX, *Cydia pomonella* GV (alternative name) (191)+TX, *Dacnusa sibirica* (alternative name) (212)+TX, *Diglyphus isaea* (alternative name) (254)+TX, *Encarsia formosa* (scientific name) (293)+TX, *Eretmocerus eremicus* (alternative name) (300)+TX, *Helicoverpa zea* NPV (alternative name) (431)+TX, *Heterorhabditis bacteriophora* and *H. megidis* (alternative name) (433)+TX, *Hippodamia convergens* (alternative name) (442)+TX, *Leptomastix dactylopii* (alternative name) (488)+TX, *Macrolophus caliginosus* (alternative name) (491)+TX, *Mamestra brassicae* NPV (alternative name) (494)+TX, *Metaphycus helvolus* (alternative name) (522)+TX, *Metarhizium anisopliae* var. *acridum* (scientific name) (523)+TX, *Metarhizium anisopliae* var. *anisopliae* (scientific name) (523)+TX, *Neodiprion sertifer* NPV and *N. lecontei* NPV (alternative name) (575)+TX, *Orius* spp. (alternative name) (596)+TX, *Paecilomyces fumosoroseus* (alternative name) (613)+TX, *Phytoseiulus persimilis* (alternative name) (644)+TX, *Spodoptera exigua* multicapsid nuclear polyhedrosis virus (scientific name) (741)+TX, *Steinernema bibionis* (alternative name) (742)+TX, *Steinernema carpocapsae* (alternative name) (742)+TX, *Steinernema feltiae* (alternative name) (742)+TX, *Steinernema glaseri* (alternative name) (742)+TX, *Steinernema riobrave* (alternative name) (742)+TX, *Steinernema riobravis* (alternative name) (742)+TX, *Steinernema scapterisci* (alternative name) (742)+TX, *Steinernema* spp. (alternative name) (742)+TX, *Trichogramma* spp. (alternative name) (826)+TX, *Typhlodromus occidentalis* (alternative name) (844) and *Verticillium lecanii* (alternative name) (848)+TX, a soil sterilant selected from the group of substances consisting of iodomethane (IUPAC name) (542) and methyl bromide (537)+TX, a chemosterilant selected from the group of substances consisting of apholate [CCN]+TX, bisazir (alternative name) [CCN]+TX, busulfan (alternative name) [CCN]+TX, diflubenzuron (250)+TX, dimatif (alternative name) [CCN]+TX, hemel [CCN]+TX, hempa [CCN]+TX, metepa [CCN]+TX, methiotepa [CCN]+TX, methyl apholate [CCN]+TX, morzid [CCN]+TX, penfluron (alternative name) [CCN]+TX, tepa [CCN]+TX, thiohempa (alternative name) [CCN]+TX, thiotepa (alternative name) [CCN]+TX, tretamine (alternative name) [CCN] and uredepa (alternative name) [CCN]+TX, an insect pheromone selected from the group of substances consisting of (E)-dec-5-en-1-yl acetate with (E)-dec-5-en-1-ol (IUPAC name) (222)+TX, (E)-tridec-4-en-1-yl acetate (IUPAC name) (829)+TX, (E)-6-methylhept-2-en-4-ol (IUPAC name) (541)+TX, (E,Z)-tetradeca-4,10-dien-1-yl acetate (IUPAC name) (779)+TX, (Z)-dodec-7-en-1-yl acetate (IUPAC name) (285)+TX, (Z)-hexadec-11-enal (IUPAC name) (436)+TX, (Z)-hexadec-11-en-1-yl acetate (IUPAC name) (437)+TX, (Z)-hexadec-13-en-11-yn-1-yl acetate (IUPAC name) (438)+TX, (Z)-icos-13-en-10-one (IUPAC name) (448)+TX, (Z)-tetradec-7-en-1-al (IUPAC name) (782)+TX, (Z)-tetradec-9-en-1-ol (IUPAC name) (783)+TX, (Z)-tetradec-9-en-1-yl acetate (IUPAC name) (784)+TX, (7E,9Z)-dodeca-7,9-dien-1-yl acetate (IUPAC name) (283)+TX, (9Z,11E)-tetradeca-9,11-dien-1-yl acetate (IUPAC name) (780)+TX, (9Z,12E)-tetradeca-9,12-dien-1-yl acetate (IUPAC name) (781)+TX, 14-methyloctadec-1-ene (IUPAC name) (545)+TX, 4-methylnonan-5-ol with 4-methylnonan-5-one (IUPAC name) (544)+TX, alpha-multistriatin (alternative name) [CCN]+TX, brevicomin (alternative name) [CCN]+TX, codlelure (alternative name) [CCN]+TX, codlemone (alternative name) (167)+TX, cuelure (alternative name) (179)+TX, disparlure (277)+TX, dodec-8-en-1-yl acetate (IUPAC name) (286)+TX, dodec-9-en-1-yl acetate (IUPAC name) (287)+TX, dodeca-8+TX, 10-dien-1-yl acetate (IUPAC name) (284)+TX, dominicalure (alternative name) [CCN]+TX, ethyl 4-methyloctanoate (IUPAC name) (317)+TX, eugenol (alternative name) [CCN]+TX, frontalin (alternative name) [CCN]+TX, gossyplure (alternative name) (420)+TX, grandlure (421)+TX, grandlure I (alternative name) (421)+TX, grandlure II (alternative name) (421)+TX, grandlure III (alternative name) (421)+TX, grandlure IV (alternative name) (421)+TX, hexalure [CCN]+TX, ipsdienol (alternative name) [CCN]+TX, ipsenol (alternative name) [CCN]+TX, japonilure (alternative name) (481)+TX, lineatin (alternative name) [CCN]+TX, litlure (alternative name) [CCN]+TX, looplure (alternative name) [CCN]+TX, medlure [CCN]+TX, megatomoic acid (alternative name) [CCN]+TX, methyl eugenol (alternative name) (540)+TX, muscalure (563)+TX, octadeca-2,13-dien-1-yl acetate (IUPAC name) (588)+TX, octadeca-3,13-dien-1-yl acetate (IUPAC name) (589)+TX, orfralure (alternative name) [CCN]+TX, oryctalure (alternative name) (317)+TX, ostramone (alternative name) [CCN]+TX, siglure [CCN]+TX, sordidin (alternative name) (736)+TX, sulcatol (alternative name) [CCN]+TX, tetradec-11-en-1-yl acetate (IUPAC name) (785)+TX, trimedlure (839)+TX, trimedlure A (alternative name) (839)+TX, trimedlure B$_1$ (alternative name) (839)+TX, trimedlure B$_2$ (alternative name) (839)+TX, trimedlure C (alternative name) (839) and trunc-call (alternative name) [CCN]+TX, an insect repellent selected from the group of substances consisting of 2-(octylthio)ethanol (IUPAC name) (591)+TX, butopyronoxyl (933)+TX, butoxy(polypropylene glycol) (936)+TX, dibutyl adipate (IUPAC name) (1046)+TX, dibutyl phthalate (1047)+TX, dibutyl succinate (IUPAC name) (1048)+TX, diethyltoluamide [CCN]+TX, dimethyl carbate [CCN]+TX, dimethyl phthalate [CCN]+TX, ethyl hexanediol (1137)+TX, hexamide [CCN]+TX, methoquin-butyl (1276)+TX, methylneodecanamide [CCN]+TX, oxamate [CCN] and picaridin [CCN]+TX, an insecticide selected from the group of substances consisting of 1-dichloro-1-nitroethane (IUPAC/Chemical Abstracts name) (1058)+TX, 1,1-dichloro-2,2-bis (4-ethylphenyl)ethane (IUPAC name) (1056), +TX, 1,2-dichloropropane (IUPAC/Chemical Abstracts name) (1062)+TX, 1,2-dichloropropane with 1,3-dichloropropene (IUPAC name) (1063)+TX, 1-bromo-2-chloroethane (IUPAC/Chemical Abstracts name) (916)+TX, 2,2,2-trichloro-1-(3,4-dichlorophenyl)ethyl acetate (IUPAC name) (1451)+TX, 2,2-dichlorovinyl 2-ethylsulfinylethyl methyl phosphate (IUPAC name) (1066)+TX, 2-(1,3-dithiolan-2-yl)phenyl dimethylcarbamate (IUPAC/Chemical Abstracts name) (1109)+ TX, 2-(2-butoxyethoxy)ethyl thiocyanate (IUPAC/Chemical Abstracts name) (935)+TX, 2-(4,5-dimethyl-1,3-dioxolan-2-yl)phenyl methylcarbamate (IUPAC/Chemical Abstracts name) (1084)+TX, 2-(4-chloro-3,5-xylyloxy)ethanol (IUPAC name) (986)+TX, 2-chlorovinyl diethyl phosphate (IUPAC name) (984)+ TX, 2-imidazolidone (IUPAC name) (1225)+TX, 2-isovalerylindan-1,3-dione (IUPAC name) (1246)+TX, 2-methyl(prop-2-ynyl)aminophenyl methylcarbamate (IUPAC name) (1284)+TX, 2-thiocyanatoethyl laurate (IUPAC name) (1433)+TX, 3-bromo-1-chloroprop-1-ene (IUPAC name) (917)+TX, 3-methyl-1-phenylpyrazol-5-yl dimethylcarbamate (IUPAC name) (1283)+ TX, 4-methyl(prop-2-ynyl)amino-3,5-xylyl methylcarbamate (IUPAC name) (1285)+TX, 5,5-dimethyl-3-oxocyclohex-1-enyl dimethylcarbamate (IUPAC name) (1085)+TX, abamectin (1)+TX, acephate (2)+TX, acetamiprid (4)+TX, acethion (alternative name) [CCN]+TX, acetoprole [CCN]+TX, acrinathrin (9)+TX, acrylonitrile (IUPAC name) (861)+TX, alanycarb (15)+TX, aldicarb (16)+TX, aldoxycarb (863)+ TX, aldrin (864)+TX, allethrin (17)+TX, allosamidin (alternative name) [CCN]+TX, allyxycarb (866)+TX, alpha-cypermethrin (202)+TX, alpha-ecdysone (alternative name) [CCN]+TX, aluminium phosphide (640)+ TX, amidithion (870)+TX, amidothioate (872)+TX, aminocarb (873)+TX, amiton (875)+TX, amiton hydrogen oxalate (875)+TX, amitraz (24)+TX, anabasine (877)+TX, athidathion (883)+TX, AVI 382 (compound code)+TX, AZ 60541 (compound code)+ TX, azadirachtin (alternative name) (41)+TX, azamethiphos (42)+TX, azinphos-ethyl (44)+TX, azinphos-methyl (45)+TX, azothoate (889)+TX, *Bacillus thuringiensis* delta endotoxins (alternative name) (52)+ TX, barium hexafluorosilicate (alternative name) [CCN]+TX, barium polysulfide (IUPAC/Chemical Abstracts name) (892)+TX, barthrin [CCN]+TX, Bayer 22/190 (development code) (893)+TX, Bayer 22408 (development code) (894)+TX, bendiocarb (58)+TX, benfuracarb (60)+TX, bensultap (66)+TX, beta-cyfluthrin (194)+TX, beta-cypermethrin (203)+TX, bifenthrin (76)+TX, bioallethrin (78)+TX, bioallethrin S-cyclopentenyl isomer (alternative name) (79)+TX, bioethanomethrin [CCN]+TX, biopermethrin (908)+ TX, bioresmethrin (80)+TX, bis(2-chloroethyl) ether (IUPAC name) (909)+TX, bistrifluron (83)+TX, borax (86)+TX, brofenvalerate (alternative name)+TX, bromfenvinfos (914)+TX, bromocyclen (918)+TX, bromo-DDT (alternative name) [CCN]+TX, bromophos (920)+TX, bromophos-ethyl (921)+TX, bufencarb (924)+TX, buprofezin (99)+TX, butacarb (926)+ TX, butathiofos (927)+TX, butocarboxim (103)+TX, butonate (932)+TX, butoxycarboxim (104)+TX, butylpyridaben (alternative name)+TX, cadusafos (109)+TX, calcium arsenate [CCN]+TX, calcium cyanide (444)+TX, calcium polysulfide (IUPAC name) (111)+TX, camphechlor (941)+TX, carbanolate (943)+ TX, carbaryl (115)+TX, carbofuran (118)+TX, carbon disulfide (IUPAC/Chemical Abstracts name) (945)+ TX, carbon tetrachloride (IUPAC name) (946)+TX, carbophenothion (947)+TX, carbosulfan (119)+TX, cartap (123)+TX, cartap hydrochloride (123)+TX, cevadine (alternative name) (725)+TX, chlorbicyclen (960)+TX, chlordane (128)+TX, chlordecone (963)+ TX, chlordimeform (964)+TX, chlordimeform hydrochloride (964)+TX, chlorethoxyfos (129)+TX, chlorfenapyr (130)+TX, chlorfenvinphos (131)+TX, chlorfluazuron (132)+TX, chlormephos (136)+TX, chloroform [CCN]+TX, chloropicrin (141)+TX, chlorphoxim (989)+TX, chlorprazophos (990)+TX, chlorpyrifos (145)+TX, chlorpyrifos-methyl (146)+TX, chlorthiophos (994)+TX, chromafenozide (150)+TX, cinerin 1 (696)+TX, cinerin II (696)+TX, cinerins (696)+TX, cis-resmethrin (alternative name)+TX, cis-methrin (80)+TX, clocythrin (alternative name)+TX, cloethocarb (999)+TX, closantel (alternative name) [CCN]+TX, clothianidin (165)+TX, copper acetoarsenite [CCN]+TX, copper arsenate [CCN]+TX, copper oleate [CCN]+TX, coumaphos (174)+TX, coumithoate (1006)+TX, crotamiton (alternative name) [CCN]+TX, crotoxyphos (1010)+TX, crufomate (1011)+TX, cryolite (alternative name) (177)+TX, CS 708 (development code) (1012)+TX, cyanofenphos (1019)+TX, cyanophos (184)+TX, cyanthoate (1020)+TX, cyclethrin [CCN]+TX, cycloprothrin (188)+TX, cyfluthrin (193)+TX, cyhalothrin (196)+TX, cypermethrin (201)+TX, cyphenothrin (206)+TX, cyromazine (209)+TX, cythioate (alternative name) [CCN]+TX, d-limonene (alternative name) [CCN]+TX, d-tetramethrin (alternative name) (788)+TX, DAEP (1031)+ TX, dazomet (216)+TX, DDT (219)+TX, decarbofuran (1034)+TX, deltamethrin (223)+TX, demephion (1037)+TX, demephion-O (1037)+TX, demephion-S (1037)+TX, demeton (1038)+TX, demeton-methyl (224)+TX, demeton-O (1038)+TX, demeton-O-methyl (224)+TX, demeton-S(1038)+TX, demeton-S-methyl (224)+TX, demeton-S-methylsulphon (1039)+TX, diafenthiuron (226)+TX, dialifos (1042)+TX, diamidafos (1044)+TX, diazinon (227)+TX, dicapthon (1050)+TX, dichlofenthion (1051)+TX, dichlorvos (236)+TX, dicliphos (alternative name)+TX, dicresyl (alternative name) [CCN]+TX, dicrotophos (243)+TX, dicyclanil (244)+TX, dieldrin (1070)+TX, diethyl 5-methylpyrazol-3-yl phosphate (IUPAC name) (1076)+TX, diflubenzuron (250)+TX, dilor (alternative name) [CCN]+TX, dimefluthrin [CCN]+TX, dimefox (1081)+TX, dimetan (1085)+TX, dimethoate (262)+ TX, dimethrin (1083)+TX, dimethylvinphos (265)+ TX, dimetilan (1086)+TX, dinex (1089)+TX, dinex-diclexine (1089)+TX, dinoprop (1093)+TX, dinosam (1094)+TX, dinoseb (1095)+TX, dinotefuran (271)+ TX, diofenolan (1099)+TX, dioxabenzofos (1100)+ TX, dioxacarb (1101)+TX, dioxathion (1102)+TX, disulfoton (278)+TX, dithicrofos (1108)+TX, DNOC (282)+TX, doramectin (alternative name) [CCN]+TX, DSP (1115)+TX, ecdysterone (alternative name) [CCN]+TX, El 1642 (development code) (1118)+TX, emamectin (291)+TX, emamectin benzoate (291)+TX, EMPC (1120)+TX, empenthrin (292)+TX, endosulfan (294)+TX, endothion (1121)+TX, endrin (1122)+TX, EPBP (1123)+TX, EPN (297)+TX, epofenonane (1124)+TX, eprinomectin (alternative name) [CCN]+TX, esfenvalerate (302)+TX, etaphos (alternative name) [CCN]+TX, ethiofencarb (308)+TX, ethion (309)+TX, ethiprole (310)+TX, ethoate-methyl (1134)+TX, ethoprophos (312)+TX, ethyl formate (IUPAC name) [CCN]+TX, ethyl-DDD (alternative name) (1056)+TX, ethylene dibromide (316)+TX, ethylene dichloride (chemical name) (1136)+TX, ethylene oxide [CCN]+TX, etofenprox (319)+TX, etrimfos (1142)+TX, EXD (1143)+TX, famphur (323)+TX, fenamiphos (326)+TX, fenazaflor (1147)+TX, fenchlorphos (1148)+TX, fenethacarb (1149)+TX, fenfluthrin (1150)+TX, fenitrothion (335)+TX, fenobucarb (336)+TX, fenoxacrim (1153)+TX, fenoxycarb (340)+TX, fenpirithrin (1155)+TX, fenpropathrin (342)+TX, fenpyrad (alternative name)+TX, fensulfothion (1158)+TX, fenthion (346)+TX, fenthion-ethyl [CCN]+TX, fenvalerate (349)+TX, fipronil (354)+TX, flonicamid (358)+TX, flubendiamide (CAS. Reg. No.: 272451-65-7)+TX, flucofuron (1168)+TX, flucycloxuron (366)+TX, flucythrinate (367)+TX, fluenetil (1169)+TX, flufenerim [CCN]+TX, flufenoxuron (370)+TX, flufenprox (1171)+TX, flumethrin (372)+TX, fluvalinate (1184)+TX, FMC 1137 (development code) (1185)+TX, fonofos (1191)+TX, formetanate (405)+TX, formetanate hydrochloride (405)+TX, formothion (1192)+TX, formparanate (1193)+TX, fosmethilan (1194)+TX, fospirate (1195)+TX, fosthiazate (408)+TX, fosthietan (1196)+TX, furathiocarb (412)+TX, furethrin (1200)+TX, gamma-cyhalothrin (197)+TX, gamma-HCH (430)+TX, guazatine (422)+TX, guazatine acetates (422)+TX, GY-81 (development code) (423)+TX, halfenprox (424)+TX, halofenozide (425)+TX, HCH (430)+TX, HEOD (1070)+TX, heptachlor (1211)+TX, heptenophos (432)+TX, heterophos [CCN]+TX, hexaflumuron (439)+TX, HHDN (864)+TX, hydramethylnon (443)+TX, hydrogen cyanide (444)+TX, hydroprene (445)+TX, hyquincarb (1223)+TX, imidacloprid (458)+TX, imiprothrin (460)+TX, indoxacarb (465)+TX, iodomethane (IUPAC name) (542)+TX, IPSP (1229)+TX, isazofos (1231)+TX, isobenzan (1232)+TX, isocarbophos (alternative name) (473)+TX, isodrin (1235)+TX, isofenphos (1236)+TX, isolane (1237)+TX, isoprocarb (472)+TX, isopropyl O-(methoxy-aminothiophosphoryl)salicylate (IUPAC name) (473)+TX, isoprothiolane (474)+TX, isothioate (1244)+TX, isoxathion (480)+TX, ivermectin (alternative name) [CCN]+TX, jasmolin I (696)+TX, jasmolin II (696)+TX, jodfenphos (1248)+TX, juvenile hormone I (alternative name) [CCN]+TX, juvenile hormone II (alternative name) [CCN]+TX, juvenile hormone III (alternative name) [CCN]+TX, kelevan (1249)+TX, kinoprene (484)+TX, lambda-cyhalothrin (198)+TX, lead arsenate [CCN]+TX, lepimectin (CCN)+TX, leptophos (1250)+TX, lindane (430)+TX, lirimfos (1251)+TX, lufenuron (490)+TX, lythidathion (1253)+TX, m-cumenyl methylcarbamate (IUPAC name) (1014)+TX, magnesium phosphide (IUPAC name) (640)+TX, malathion (492)+TX, malonoben (1254)+TX, mazidox (1255)+TX, mecarbam (502)+TX, mecarphon (1258)+TX, menazon (1260)+TX, mephosfolan (1261)+TX, mercurous chloride (513)+TX, mesulfenfos (1263)+TX, metaflumizone (CCN)+TX, metam (519)+TX, metam-potassium (alternative name) (519)+TX, metam-sodium (519)+TX, methacrifos (1266)+TX, methamidophos (527)+TX, methanesulfonyl fluoride (IUPAC/Chemical Abstracts name) (1268)+TX, methidathion (529)+TX, methiocarb (530)+TX, methocrotophos (1273)+TX, methomyl (531)+TX, methoprene (532)+TX, methoquin-butyl (1276)+TX, methothrin (alternative name) (533)+TX, methoxychlor (534)+TX, methoxyfenozide (535)+TX, methyl bromide (537)+TX, methyl isothiocyanate (543)+TX, methylchloroform (alternative name) [CCN]+TX, methylene chloride [CCN]+TX, metofluthrin [CCN]+TX, metolcarb (550)+TX, metoxadiazone (1288)+TX, mevinphos (556)+TX, mexacarbate (1290)+TX, milbemectin (557)+TX, milbemycin oxime (alternative name) [CCN]+TX, mipafox (1293)+TX, mirex (1294)+TX, monocrotophos (561)+TX, morphothion (1300)+TX, moxidectin (alternative name) [CCN]+TX, naftalofos (alternative name) [CCN]+TX, naled (567)+TX, naphthalene (IUPAC/Chemical Abstracts name) (1303)+TX, NC-170 (development code) (1306)+TX, NC-184 (compound code)+TX, nicotine (578)+TX, nicotine sulfate (578)+TX, nifluridide (1309)+TX, nitenpyram (579)+TX, nithiazine (1311)+TX, nitrilacarb (1313)+TX, nitrilacarb 1:1 zinc chloride complex (1313)+TX, NNI-0101 (compound code)+TX, NNI-0250 (compound code)+TX, nornicotine (traditional name) (1319)+TX, novaluron (585)+TX, noviflumuron (586)+TX, O-5-dichloro-4-iodophenyl O-ethyl ethylphosphonothioate (IUPAC name) (1057)+TX, O,O-diethyl O-4-methyl-2-oxo-2H-chromen-7-yl phosphorothioate (IUPAC name) (1074)+TX, O,O-diethyl O-6-methyl-2-propylpyrimidin-4-yl phosphorothioate (IUPAC name) (1075)+TX, O,O,O',O'-tetrapropyl dithiopyrophosphate (IUPAC name) (1424)+TX, oleic acid (IUPAC name) (593)+TX, omethoate (594)+TX, oxamyl (602)+TX, oxydemeton-methyl (609)+TX, oxydeprofos (1324)+TX, oxydisulfoton (1325)+TX, pp'-DDT (219)+TX, para-dichlorobenzene [CCN]+TX, parathion (615)+TX, parathion-methyl (616)+TX, penfluron (alternative name) [CCN]+TX, pentachlorophenol (623)+TX, pentachlorophenyl laurate (IUPAC name) (623)+TX, permethrin (626)+TX, petroleum oils (alternative name) (628)+TX, PH 60-38 (development code) (1328)+TX, phenkapton (1330)+TX, phenothrin (630)+TX, phenthoate (631)+TX, phorate (636)+TX, phosalone (637)+TX, phosfolan (1338)+TX, phosmet (638)+TX, phosnichlor (1339)+TX, phosphamidon (639)+TX, phosphine (IUPAC name) (640)+TX, phoxim (642)+TX, phoxim-methyl (1340)+TX, pirimetaphos (1344)+TX, pirimicarb (651)+TX, pirimiphos-ethyl (1345)+TX, pirimiphos-methyl (652)+TX, polychlorodicyclopentadiene isomers (IUPAC name) (1346)+TX, polychloroterpenes (traditional name) (1347)+TX, potassium arsenite [CCN]+TX, potassium thiocyanate [CCN]+TX, prallethrin (655)+TX, precocene I (alternative name) [CCN]+TX, precocene II (alternative name) [CCN]+TX, precocene III (alternative name) [CCN]+TX, primidophos (1349)+TX, profenofos (662)+TX, profluthrin [CCN]+TX, promacyl (1354)+TX, promecarb (1355)+TX, propaphos (1356)+TX, propetamphos (673)+TX, propoxur (678)+TX, prothidathion (1360)+TX, prothiofos (686)+TX, prothoate (1362)+TX, protrifenbute [CCN]+TX, pymetrozine (688)+TX, pyraclofos (689)+TX, pyrazophos (693)+TX, pyresmethrin (1367)+TX, pyrethrin I (696)+TX, pyrethrin II (696)+TX, pyrethrins (696)+TX, pyridaben (699)+TX, pyridalyl (700)+TX, pyridaphenthion (701)+TX, pyrimidifen (706)+TX, pyrimitate (1370)+TX, pyriproxyfen (708)+

TX, quassia (alternative name) [CCN]+TX, quinalphos (711)+TX, quinalphos-methyl (1376)+TX, quinothion (1380)+TX, quintiofos (1381)+TX, R-1492 (development code) (1382)+TX, rafoxanide (alternative name) [CCN]+TX, resmethrin (719)+TX, rotenone (722)+TX, RU 15525 (development code) (723)+TX, RU 25475 (development code) (1386)+TX, ryania (alternative name) (1387)+TX, ryanodine (traditional name) (1387)+TX, sabadilla (alternative name) (725)+TX, schradan (1389)+TX, sebufos (alternative name)+TX, selamectin (alternative name) [CCN]+TX, SI-0009 (compound code)+TX, SI-0205 (compound code)+TX, SI-0404 (compound code)+TX, SI-0405 (compound code)+TX, silafluofen (728)+TX, SN 72129 (development code) (1397)+TX, sodium arsenite [CCN]+TX, sodium cyanide (444)+TX, sodium fluoride (IUPAC/Chemical Abstracts name) (1399)+TX, sodium hexafluorosilicate (1400)+TX, sodium pentachlorophenoxide (623)+TX, sodium selenate (IUPAC name) (1401)+TX, sodium thiocyanate [CCN]+TX, sophamide (1402)+TX, spinosad (737)+TX, spiromesifen (739)+TX, spirotetrmat (CCN)+TX, sulcofuron (746)+TX, sulcofuron-sodium (746)+TX, sulfluramid (750)+TX, sulfotep (753)+TX, sulfuryl fluoride (756)+TX, sulprofos (1408)+TX, tar oils (alternative name) (758)+TX, tau-fluvalinate (398)+TX, tazimcarb (1412)+TX, TDE (1414)+TX, tebufenozide (762)+TX, tebufenpyrad (763)+TX, tebupirimfos (764)+TX, teflubenzuron (768)+TX, tefluthrin (769)+TX, temephos (770)+TX, TEPP (1417)+TX, terallethrin (1418)+TX, terbam (alternative name)+TX, terbufos (773)+TX, tetrachloroethane [CCN]+TX, tetrachlorvinphos (777)+TX, tetramethrin (787)+TX, theta-cypermethrin (204)+TX, thiacloprid (791)+TX, thiafenox (alternative name)+TX, thiamethoxam (792)+TX, thicrofos (1428)+TX, thiocarboxime (1431)+TX, thiocyclam (798)+TX, thiocyclam hydrogen oxalate (798)+TX, thiodicarb (799)+TX, thiofanox (800)+TX, thiometon (801)+TX, thionazin (1434)+TX, thiosultap (803)+TX, thiosultap-sodium (803)+TX, thuringiensin (alternative name) [CCN]+TX, tolfenpyrad (809)+TX, tralomethrin (812)+TX, transfluthrin (813)+TX, transpermethrin (1440)+TX, triamiphos (1441)+TX, triazamate (818)+TX, triazophos (820)+TX, triazuron (alternative name)+TX, trichlorfon (824)+TX, trichlormetaphos-3 (alternative name) [CCN]+TX, trichloronat (1452)+TX, trifenofos (1455)+TX, triflumuron (835)+TX, trimethacarb (840)+TX, triprene (1459)+TX, vamidothion (847)+TX, vaniliprole [CCN]+TX, veratridine (alternative name) (725)+TX, veratrine (alternative name) (725)+TX, XMC (853)+TX, xylylcarb (854)+TX, YI-5302 (compound code)+TX, zeta-cypermethrin (205)+TX, zetamethrin (alternative name)+TX, zinc phosphide (640)+TX, zolaprofos (1469) and ZXI 8901 (development code) (858)+TX, cyantraniliprole [736994-63-19+TX, chlorantraniliprole [500008-45-7]+TX, cyenopyrafen [560121-52-0]+TX, cyflumetofen [400882-07-7]+TX, pyrifluquinazon [337458-27-2]+TX, spinetoram [187166-40-1+187166-15-0]+TX, spirotetramat [203313-25-1]+TX, sulfoxaflor [946578-00-3]+TX, flufiprole [704886-18-0]+TX, meperfluthrin [915288-13-0]+TX, tetramethylfluthrin [84937-88-2]+TX, triflumezopyrim (disclosed in WO 2012/092115)+TX, fluxametamide (WO 2007/026965)+TX, epsilon-metofluthrin [240494-71-7]+TX, epsilon-momfluorothrin [1065124-65-3]+TX, fluazaindolizine [1254304-22-7]+TX, chloroprallethrin [399572-87-3]+TX, fluxametamide [928783-29-3]+TX, cyhalodiamide [1262605-53-7]+TX, tioxazafen [330459-31-9]+TX, broflanilide [1207727-04-5]+TX, flufiprole [704886-18-0]+TX, cyclaniliprole [1031756-98-5]+TX, tetraniliprole [1229654-66-3]+TX, guadipyr (described in WO2010/060231)+TX, cycloxaprid (described in WO 2005/077934)+TX, spiropidion+TX, Afidopyropen+TX, flupyrimin+TX, Momfluorothrin+TX, kappa-bifenthrin+TX, kappa-tefluthrin+TX, Dichloromezotiaz+TX, Tetrachloraniliprole+TX, benzpyrimoxan+TX;

a molluscicide selected from the group of substances consisting of bis(tributyltin) oxide (IUPAC name) (913)+TX, bromoacetamide [CCN]+TX, calcium arsenate [CCN]+TX, cloethocarb (999)+TX, copper acetoarsenite [CCN]+TX, copper sulfate (172)+TX, fentin (347)+TX, ferric phosphate (IUPAC name) (352)+TX, metaldehyde (518)+TX, methiocarb (530)+TX, niclosamide (576)+TX, niclosamide-olamine (576)+TX, pentachlorophenol (623)+TX, sodium pentachlorophenoxide (623)+TX, tazimcarb (1412)+TX, thiodicarb (799)+TX, tributyltin oxide (913)+TX, trifenmorph (1454)+TX, trimethacarb (840)+TX, triphenyltin acetate (IUPAC name) (347) and triphenyltin hydroxide (IUPAC name) (347)+TX, pyriprole [394730-71-3]+TX, a nematicide selected from the group of substances consisting of AKD-3088 (compound code)+TX, 1,2-dibromo-3-chloropropane (IUPAC/Chemical Abstracts name) (1045)+TX, 1,2-dichloropropane (IUPAC/Chemical Abstracts name) (1062)+TX, 1,2-dichloropropane with 1,3-dichloropropene (IUPAC name) (1063)+TX, 1,3-dichloropropene (233)+TX, 3,4-dichlorotetrahydrothiophene 1,1-dioxide (IUPAC/Chemical Abstracts name) (1065)+TX, 3-(4-chlorophenyl)-5-methylrhodanine (IUPAC name) (980)+TX, 5-methyl-6-thioxo-1,3,5-thiadiazinan-3-ylacetic acid (IUPAC name) (1286)+TX, 6-isopentenylaminopurine (alternative name) (210)+TX, abamectin (1)+TX, acetoprole [CCN]+TX, alanycarb (15)+TX, aldicarb (16)+TX, aldoxycarb (863)+TX, AZ 60541 (compound code)+TX, benclothiaz [CCN]+TX, benomyl (62)+TX, butylpyridaben (alternative name)+TX, cadusafos (109)+TX, carbofuran (118)+TX, carbon disulfide (945)+TX, carbosulfan (119)+TX, chloropicrin (141)+TX, chlorpyrifos (145)+TX, cloethocarb (999)+TX, cytokinins (alternative name) (210)+TX, dazomet (216)+TX, DBCP (1045)+TX, DCIP (218)+TX, diamidafos (1044)+TX, dichlofenthion (1051)+TX, dicliphos (alternative name)+TX, dimethoate (262)+TX, doramectin (alternative name) [CCN]+TX, emamectin (291)+TX, emamectin benzoate (291)+TX, eprinomectin (alternative name) [CCN]+TX, ethoprophos (312)+TX, ethylene dibromide (316)+TX, fenamiphos (326)+TX, fenpyrad (alternative name)+TX, fensulfothion (1158)+TX, fosthiazate (408)+TX, fosthietan (1196)+TX, furfural (alternative name) [CCN]+TX, GY-81 (development code) (423)+TX, heterophos [CCN]+TX, iodomethane (IUPAC name) (542)+TX, isamidofos (1230)+TX, isazofos (1231)+TX, ivermectin (alternative name) [CCN]+TX, kinetin (alternative name) (210)+TX, mecarphon (1258)+TX, metam (519)+TX, metam-potassium (alternative name) (519)+TX, metam-sodium (519)+TX, methyl bromide (537)+TX, methyl isothiocyanate (543)+TX, milbemycin oxime (alternative name) [CCN]+TX, moxidectin (alternative name) [CCN]+TX, *Myrothecium verrucaria* composition (alternative name) (565)+TX, NC-184 (compound code)+TX, oxamyl (602)+TX, phorate (636)+TX, phosphamidon (639)+TX, phosphocarb [CCN]+TX, sebufos (alternative name)+TX, selamectin (alternative name) [CCN]+TX, spinosad (737)+TX, terbam (alternative name)+TX, terbufos (773)+TX, tetrachlorothiophene (IUPAC/Chemical Abstracts name) (1422)+TX, thiafenox (alternative name)+TX, thionazin (1434)+TX, triazophos (820)+TX, triazuron (alternative name)+TX, xylenols [CCN]+TX, YI-5302 (compound code) and zeatin (alternative name) (210)+TX, fluensulfone [318290-98-1]+TX, fluopyram+TX, a nitrification inhibitor selected from the group of substances consisting of potassium ethylxanthate [CCN] and nitrapyrin (580)+TX, a plant activator selected from the group of substances consisting of acibenzolar (6)+TX, acibenzolar-S-methyl (6)+TX, probenazole (658) and *Reynoutria sachalinensis* extract (alternative name) (720)+TX, a rodenticide selected from the group of substances consisting of 2-isovalerylindan-1,3-dione (IUPAC name) (1246)+TX, 4-(quinoxalin-2-ylamino)benzenesulfonamide (IUPAC name) (748)+TX, alpha-chlorohydrin [CCN]+TX, aluminium phosphide (640)+TX, antu (880)+TX, arsenious oxide (882)+TX, barium carbonate (891)+TX, bisthiosemi (912)+TX, brodifacoum (89)+TX, bromadiolone (91)+TX, bromethalin (92)+TX, calcium cyanide (444)+TX, chloralose (127)+TX, chlorophacinone (140)+TX, cholecalciferol (alternative name) (850)+TX, coumachlor (1004)+TX, coumafuryl (1005)+TX, coumatetralyl (175)+TX, crimidine (1009)+TX, difenacoum (246)+TX, difethialone (249)+TX, diphacinone (273)+TX, ergocalciferol (301)+TX, flocoumafen (357)+TX, fluoroacetamide (379)+TX, flupropadine (1183)+TX, flupropadine hydrochloride (1183)+TX, gamma-HCH (430)+TX, HCH (430)+TX, hydrogen cyanide (444)+TX, iodomethane (IUPAC name) (542)+TX, lindane (430)+TX, magnesium phosphide (IUPAC name) (640)+TX, methyl bromide (537)+TX, norbormide (1318)+TX, phosacetim (1336)+TX, phosphine (IUPAC name) (640)+TX, phosphorus [CCN]+TX, pindone (1341)+TX, potassium arsenite [CCN]+TX, pyrinuron (1371)+TX, scilliroside (1390)+TX, sodium arsenite [CCN]+TX, sodium cyanide (444)+TX, sodium fluoroacetate (735)+TX, strychnine (745)+TX, thallium sulfate [CCN]+TX, warfarin (851) and zinc phosphide (640)+TX, a synergist selected from the group of substances consisting of 2-(2-butoxyethoxy)ethyl piperonylate (IUPAC name) (934)+TX, 5-(1,3-benzodioxol-5-yl)-3-hexylcyclohex-2-enone (IUPAC name) (903)+TX, farnesol with nerolidol (alternative name) (324)+TX, MB-599 (development code) (498)+TX, MGK 264 (development code) (296)+TX, piperonyl butoxide (649)+TX, piprotal (1343)+TX, propyl isomer (1358)+TX, S421 (development code) (724)+TX, sesamex (1393)+TX, sesamolin (1394) and sulfoxide (1406)+TX, an animal repellent selected from the group of substances consisting of anthraquinone (32)+TX, chloralose (127)+TX, copper naphthenate [CCN]+TX, copper oxychloride (171)+TX, diazinon (227)+TX, dicyclopentadiene (chemical name) (1069)+TX, guazatine (422)+TX, guazatine acetates (422)+TX, methiocarb (530)+TX, pyridin-4-amine (IUPAC name) (23)+TX, thiram (804)+TX, trimethacarb (840)+TX, zinc naphthenate [CCN] and ziram (856)+TX, a virucide selected from the group of substances consisting of imanin (alternative name) [CCN] and ribavirin (alternative name) [CCN]+TX, a wound protectant selected from the group of substances consisting of mercuric oxide (512)+TX, octhilinone (590) and thiophanate-methyl (802)+TX, and biologically active compounds selected from the group consisting of azaconazole (60207-31-0]+TX, bitertanol [70585-36-3]+TX, bromuconazole [116255-48-2]+TX, cyproconazole [94361-06-5]+TX, difenoconazole [119446-68-3]+TX, diniconazole [83657-24-3]+TX, epoxiconazole [106325-08-0]+TX, fenbuconazole [114369-43-6]+TX, fluquinconazole [136426-54-5]+TX, flusilazole [85509-19-9]+TX, flutriafol [76674-21-0]+TX, hexaconazole [79983-71-4]+TX, imazalil [35554-44-0]+TX, imibenconazole [86598-92-7]+TX, ipconazole [125225-28-7]+TX, metconazole [125116-23-6]+TX, myclobutanil [88671-89-0]+TX, pefurazoate [101903-30-4]+TX, penconazole [66246-88-6]+TX, prothioconazole [178928-70-6]+TX, pyrifenox [88283-41-4]+TX, prochloraz [67747-09-5]+TX, propiconazole [60207-90-1]+TX, simeconazole [149508-90-7]+TX, tebuconazole [107534-96-3]+TX, tetraconazole [112281-77-3]+TX, triadimefon [43121-43-3]+TX, triadimenol [55219-65-3]+TX, triflumizole [99387-89-0]+TX, triticonazole [131983-72-7]+TX, ancymidol [12771-68-5]+TX, fenarimol [60168-88-9]+TX, nuarimol [63284-71-9]+TX, bupirimate [41483-43-6]+TX, dimethirimol [5221-53-4]+TX, ethirimol [23947-60-6]+TX, dodemorph [1593-77-7]+TX, fenpropidine [67306-00-7]+TX, fenpropimorph [67564-91-4]+TX, spiroxamine [118134-30-8]+TX, tridemorph [81412-43-3]+TX, cyprodinil [121552-61-2]+TX, mepanipyrim [110235-47-7]+TX, pyrimethanil [53112-28-0]+TX, fenpiclonil [74738-17-3]+TX, fludioxonil [131341-86-1]+TX, benalaxyl [71626-11-4]+TX, furalaxyl [57646-30-7]+TX, metalaxyl [57837-19-1]+TX, R-metalaxyl [70630-17-0]+TX, ofurace [58810-48-3]+TX, oxadixyl [77732-09-3]+TX, benomyl [17804-35-2]+TX, carbendazim [10605-21-7]+TX, debacarb [62732-91-6]+TX, fuberidazole [3878-19-1]+TX, thiabendazole [148-79-8]+TX, chlozolinate [84332-86-5]+TX, dichlozoline [24201-58-9]+TX, iprodione [36734-19-7]+TX, myclozoline [54864-61-8]+TX, procymidone [32809-16-8]+TX, vinclozoline [50471-44-8]+TX, boscalid [188425-85-6]+TX, carboxin [5234-68-4]+TX, fenfuram [24691-80-3]+TX, flutolanil [66332-96-5]+TX, mepronil [55814-41-0]+TX, oxycarboxin [5259-88-1]+TX, penthiopyrad [183675-82-3]+TX, thifluzamide [130000-40-7]+TX, guazatine [108173-90-6]+TX, dodine [2439-10-3] [112-65-2] (free base)+TX, iminoctadine [13516-27-3]+TX, azoxystrobin [131860-33-8]+TX, dimoxystrobin [149961-52-4]+TX, enestroburin {Proc. BCPC, Int. Congr., Glasgow, 2003, 1, 93}+TX, fluoxastrobin [361377-29-9]+TX, kresoxim-methyl [143390-89-0]+TX, metominostrobin [133408-50-1]+TX, trifloxystrobin [141517-21-7]+TX, orysastrobin [248593-16-0]+TX, picoxystrobin [117428-22-5]+TX, pyraclostrobin [175013-18-0]+TX, ferbam [14484-64-1]+TX, mancozeb [8018-01-7]+TX, maneb [12427-38-2]+TX, metiram [9006-42-2]+TX, propineb [12071-83-9]+TX, thiram [137-26-8]+TX, zineb [12122-67-7]+TX, ziram [137-30-4]+TX, captafol [2425-06-1]+TX, captan [133-06-2]+TX, dichlofluanid [1085-98-9]+TX, fluoroimide [41205-21-4]+TX, folpet [133-07-3]+TX, tolylfluanid [731-27-1]+TX, bordeaux mixture

[8011-63-0]+TX, copperhydroxid [20427-59-2]+TX, copperoxychlorid [1332-40-7]+TX, coppersulfat [7758-98-7]+TX, copperoxid [1317-39-1]+TX, mancopper [53988-93-5]+TX, oxine-copper [10380-28-6]+TX, dinocap [131-72-6]+TX, nitrothal-isopropyl [10552-74-6]+TX, edifenphos [17109-49-8]+TX, iprobenphos [26087-47-8]+TX, isoprothiolane [50512-35-1]+TX, phosdiphen [36519-00-3]+TX, pyrazophos [13457-18-6]+TX, tolclofos-methyl [57018-04-9]+TX, acibenzo-lar-S-methyl [135158-54-2]+TX, anilazine [101-05-3]+TX, benthiavalicarb [413615-35-7]+TX, blasticidin-S [2079-00-7]+TX, chinomethionat [2439-01-2]+TX, chloroneb [2675-77-6]+TX, chlorothalonil [1897-45-6]+TX, cyflufenamid [180409-60-3]+TX, cymoxanil [57966-95-7]+TX, dichlone [117-80-6]+TX, diclocymet [139920-32-4]+TX, diclomezine [62865-36-5]+TX, dicloran [99-30-9]+TX, diethofencarb [87130-20-9]+TX, dimethomorph [110488-70-5]+TX, SYP-LI90 (Flumorph) [211867-47-9]+TX, dithianon [3347-22-6]+TX, ethaboxam [162650-77-3]+TX, etridiazole [2593-15-9]+TX, famoxadone [131807-57-3]+TX, fenamidone [161326-34-7]+TX, fenoxanil [115852-48-7]+TX, fentin [668-34-8]+TX, ferimzone [89269-64-7]+TX, fluazinam [79622-59-6]+TX, fluopicolide [239110-15-7]+TX, flusulfamide [106917-52-6]+TX, fenhexamid [126833-17-8]+TX, fosetyl-aluminium [39148-24-8]+TX, hymexazol [10004-44-1]+TX, iprovalicarb [140923-17-7]+TX, IKF-916 (Cyazofamid) [120116-88-3]+TX, kasugamycin [6980-18-3]+TX, methasulfocarb [66952-49-6]+TX, metrafenone [220899-03-6]+TX, pencycuron [66063-05-6]+TX, phthalide [27355-22-2]+TX, polyoxins [11113-80-7]+TX, probenazole [27605-76-1]+TX, propamocarb [25606-41-1]+TX, proquinazid [189278-12-4]+TX, pyroquilon [57369-32-1]+TX, quinoxyfen [124495-18-7]+TX, quintozene [82-68-8]+TX, sulfur [7704-34-9]+TX, tiadinil [223580-51-6]+TX, triazoxide [72459-58-6]+TX, tricyclazole [41814-78-2]+TX, triforine [26644-46-2]+TX, validamycin [37248-47-8]+TX, zoxamide (RH7281) [156052-68-5]+TX, mandipropamid [374726-62-2]+TX, isopyrazam [881685-58-1]+TX, sedaxane [874967-67-6]+TX, 3-difluoromethyl-1-methyl-1H-pyrazole-4-carboxylic acid (9-dichloromethylene-1,2,3,4-tetrahydro-1,4-methano-naphthalen-5-yl)-amide (disclosed in WO 2007/048556)+TX, 3-difluoromethyl-1-methyl-1H-pyrazole-4-carboxylic acid (3',4',5'-trifluoro-biphenyl-2-yl)-amide (disclosed in WO 2006/087343)+TX, [(3S, 4R,4aR,6S,6aS,12R,12aS,12bS)-3-[(cyclopropylcarbonyl)oxy]-1,3,4,4a,5,6,6a,12,12a, 12b-decahydro-6,12-dihydroxy-4,6a,12b-trimethyl-11-oxo-9-(3-pyridinyl)-2H,11Hnaphtho[2,1-b]pyrano[3,4-e]pyran-4-yl]methyl-cyclopropanecarboxylate [915972-17-7]+TX and 1,3,5-trimethyl-N-(2-methyl-1-oxopropyl)-N-[3-(2-methylpropyl)-4-[2,2,2-trifluoro-1-methoxy-1-(trifluoromethyl)ethyl]phenyl]-1H-pyrazole-4-carboxamide [926914-55-8]+TX, lancotrione [1486617-21-3]+TX, florpyrauxifen [943832-81-3]+TX, ipfentrifluconazole[1417782-08-1]+TX, mefentrifluconazole [1417782-03-6]+TX, quinofumelin [861647-84-9]+TX, chloroprallethrin [399572-87-3]+TX, cyhalodiamide [1262605-53-7]+TX, fluazaindolizine [1254304-22-7]+TX, fluxametamide [928783-29-3]+TX, epsilon-metofluthrin [240494-71-7]+TX, epsilon-momfluorothrin [1065124-65-3]+TX, pydiflumetofen [1228284-64-7]+TX, kappa-bifenthrin [439680-76-9]+TX, broflanilide [1207727-04-5]+TX, dicloromezotiaz [1263629-39-5]+TX, dipymetitrone [16114-35-5]+TX, pyraziflumid [942515-63-1]+TX and kappa-tefluthrin [391634-71-2]+TX; and microbials including: *Acinetobacter iwoffii*+TX, *Acremonium alternatum*+TX+TX, *Acremonium cephalosporium*+TX+TX, *Acremonium diospyri*+TX, *Acremonium obclavatum*+TX, *Adoxophyes orana* granulovirus (AdoxGV) (Capex®)+TX, *Agrobacterium radiobacter* strain K84 (Galltrol-A®)+TX, *Alternaria alternate*+TX, *Alternaria cassia*+TX, *Alternaria destruens* (Smolder®)+TX, *Ampelomyces quisqualis* (AQ10®)+TX, *Aspergillus flavus* AF36 (AF36®)+TX, *Aspergillus flavus* NRRL 21882 (Aflaguard®)+TX, *Aspergillus* spp.+TX, *Aureobasidium pullulans*+TX, *Azospirillum*+TX, (MicroAZ®+TX, TAZO B®)+TX, *Azotobacter*+TX, *Azotobacter chroocuccum* (Azotomeal®)+TX, *Azotobacter* cysts (Bionatural Blooming Blossoms®)+TX, *Bacillus amyloliquefaciens*+TX, *Bacillus cereus*+TX, *Bacillus chitinosporus* strain CM-1+TX, *Bacillus chitinosporus* strain AQ746+TX, *Bacillus licheniformis* strain HB-2 (Biostart™ Rhizoboost®)+TX, *Bacillus licheniformis* strain 3086 (EcoGuard®+TX, Green Releaf®)+TX, *Bacillus circulans*+TX, *Bacillus firmus* (BioSafe®+TX, BioNem-WP®+TX, VOTiVO®)+TX, *Bacillus firmus* strain 1-1582+TX, *Bacillus macerans*+TX, *Bacillus marismortui*+TX, *Bacillus megaterium*+TX, *Bacillus mycoides* strain AQ726+TX, *Bacillus papillae* (Milky Spore Powder®)+TX, *Bacillus pumilus* spp.+TX, *Bacillus pumilus* strain GB34 (Yield Shield®)+TX, *Bacillus pumilus* strain AQ717+TX, *Bacillus pumilus* strain QST 2808 (Sonata®+TX, Ballad Plus®)+TX, *Bacillus sphaericus* (VectoLex®)+TX, *Bacillus* spp.+TX, *Bacillus* spp. strain AQ175+TX, *Bacillus* spp. strain AQ177+TX, *Bacillus* spp. strain AQ178+TX, *Bacillus subtilis* strain QST 713 (CEASE®+TX, Serenade®+TX, Rhapsody®)+TX, *Bacillus subtilis* strain QST 714 (JAZZ®)+TX, *Bacillus subtilis* strain AQ153+TX, *Bacillus subtilis* strain AQ743+TX, *Bacillus subtilis* strain QST3002+TX, *Bacillus subtilis* strain QST3004+TX, *Bacillus subtilis* var. *amyloliquefaciens* strain FZB24 (Taegro®+TX, Rhizopro®)+TX, *Bacillus thuringiensis* Cry 2Ae+TX, *Bacillus thuringiensis* CrylAb+TX, *Bacillus thuringiensis aizawai* GC 91 (Agree®)+TX, *Bacillus thuringiensis israelensis* (BMP123®+TX, Aquabac®+TX, VectoBac®)+TX, *Bacillus thuringiensis kurstaki* (Javelin®+TX, Deliver®+TX, CryMax®+TX, Bonide®+TX, Scutella WP®+TX, Turilav WP®+TX, Astuto®+TX, Dipel WP®+TX, Biobit®+TX, Foray®)+TX, *Bacillus thuringiensis kurstaki* BMP 123 (Baritone®)+TX, *Bacillus thuringiensis kurstaki* HD-1 (Bioprotec-CAF/3P®)+TX, *Bacillus thuringiensis* strain BD #32+TX, *Bacillus thuringiensis* strain AQ52+TX, *Bacillus thuringiensis* var. *aizawai* (XenTari®+TX, DiPel®)+TX, bacteria spp. (GROWMEND®+TX, GROWSWEET®+TX, Shootup®)+TX, bacteriophage of *Claviapacter michiganensis* (AgriPhage®)+TX, Bakflor®+TX, *Beauveria bassiana* (Beaugenic®+TX, Brocaril WP®)+TX, *Beauveria bassiana* GHA (Mycotrol ES@+TX, Mycotrol O®+TX, BotaniGuard®)+TX, *Beauveria brongniartii* (Engerlingspilz®+TX, Schweizer *Beauveria*®+TX, Melocont®)+TX, *Beauveria* spp.+TX, *Botrytis cineria*+TX, *Bradyrhizobium japonicum* (TerraMax®)+TX, *Brevibacillus brevis*+TX, *Bacillus thuringiensis tenebrionis* (Novodor®)+TX, BtBooster+TX, *Burkholderia cepacia* (Deny®+

TX, Intercept®+TX, Blue Circle®)+TX, *Burkholderia gladii*+TX, *Burkholderia gladioli*+TX, *Burkholderia* spp.+TX, Canadian thistle fungus (CBH Canadian Bioherbicide®)+TX, *Candida* butyri+TX, *Candida famata*+TX, *Candida* fructus+TX, *Candida glabrata*+TX, *Candida guilliermondii*+TX, *Candida melibiosica*+TX, *Candida oleophila* strain 0+TX, *Candida parapsilosis*+TX, *Candida pelliculosa*+TX, *Candida pulcherrima*+TX, *Candida reukaufii*+TX, *Candida saitoana* (Bio-Coat®+TX, Biocure®)+TX, *Candida sake*+TX, *Candida* spp.+TX, *Candida* tenius+TX, *Cedecea dravisae*+TX, *Cellulomonas flavigena*+TX, *Chaetomium cochliodes* (Nova-Cide®)+TX, *Chaetomium globosum* (Nova-Cide®)+TX, *Chromobacterium subtsugae* strain PRAA4-1T (Grandevo®)+TX, *Cladosporium cladosporioides*+TX, *Cladosporium oxysporum*+TX, *Cladosporium chlorocephalum*+TX, *Cladosporium* spp.+TX, *Cladosporium tenuissimum*+TX, *Clonostachys rosea* (EndoFine®)+TX, *Colletotrichum acutatum*+TX, *Coniothyrium minitans* (Cotans WG®)+TX, *Coniothyrium* spp.+TX, *Cryptococcus albidus* (YIELDPLUS®)+TX, *Cryptococcus humicola*+TX, *Cryptococcus infirmo-miniatus*+TX, *Cryptococcus laurentii*+TX, *Cryptophlebia leucotreta* granulovirus (Cryptex®)+TX, *Cupriavidus campinensis*+TX, *Cydia pomonella* granulovirus (CYD-X®)+TX, *Cydia pomonella* granulovirus (Madex®+TX, Madex Plus®+TX, Madex Max/Carpovirusine®)+TX, *Cylindrobasidium laeve* (Stumpout®)+TX, Cylindrocladium+TX, *Debaryomyces hansenii*+TX, *Drechslera hawaiinensis*+TX, *Enterobacter cloacae*+TX, *Enterobacter iaceae*+TX, *Entomophtora virulenta* (Vektor®)+TX, *Epicoccum nigrum*+TX, *Epicoccum purpurascens*+TX, *Epicoccum* spp.+TX, *Filobasidium floriforme*+TX, *Fusarium acuminatum*+TX, *Fusarium chlamydosporum*+TX, *Fusarium oxysporum* (Fusaclean®/Biofox C®)+TX, *Fusarium proliferatum*+TX, *Fusarium* spp.+TX, *Galactomyces geotrichum*+TX, *Gliocladium catenulatum* (Primastop®+TX, Prestop®)+TX, *Gliocladium roseum*+TX, *Gliocladium* spp. (SoilGard®)+TX, *Gliocladium virens* (Soilgard®)+TX, Granulovirus (Granupom®)+TX, *Halobacillus halophilus*+TX, *Halobacillus litoralis*+TX, *Halobacillus trueperi*+TX, *Halomonas* spp.+TX, *Halomonas subglaciescola*+TX, *Halovibrio variabilis*+TX, *Hanseniaspora uvarum*+TX, *Helicoverpa armigera* nucleopolyhedrovirus (Helicovex®)+TX, *Helicoverpa zea* nuclear polyhedrosis virus (Gemstar®)+TX, Isoflavone—formononetin (Myconate®)+TX, *Kloeckera apiculata*+TX, *Kloeckera* spp.+TX, *Lagenidium giganteum* (Laginex®)+TX, *Lecanicillium longisporum* (Vertiblast®)+TX, *Lecanicillium muscarium* (Vertikil®)+TX, *Lymantria Dispar* nucleopolyhedrosis virus (Disparvirus®)+TX, *Marinococcus halophilus*+TX, *Meira geulakonigii*+TX, *Metarhizium anisopliae* (Met52®)+TX, *Metarhizium anisopliae* (Destruxin WP®)+TX, *Metschnikowia fruticola* (Shemer®)+TX, *Metschnikowia pulcherrima*+TX, *Microdochium dimerum* (Antibot®)+TX, *Micromonospora coerulea*+TX, *Microsphaeropsis ochracea*+TX, *Muscodor albus* 620 (Muscudor®)+TX, *Muscodor roseus* strain A3-5+TX, *Mycorrhizae* spp. (AMykor®+TX, Root Maximizer®)+TX, *Myrothecium verrucaria* strain AARC-0255 (DiTera®)+TX, BROS PLUS®+TX, *Ophiostoma piliferum* strain D97 (Sylvanex®)+TX, *Paecilomyces farinosus*+TX, *Paecilomyces fumosoroseus* (PFR-97®+TX, PreFeRal®)+TX, *Paecilomyces linacinus* (Biostat WP®)+TX, *Paecilomyces lilacinus* strain 251 (MeloCon WG®)+TX, *Paenibacillus polymyxa*+TX, *Pantoea agglomerans* (BlightBan C9-1®)+TX, *Pantoea* spp.+TX, *Pasteuria* spp. (Econem®)+TX, *Pasteuria nishizawae*+TX, *Penicillium aurantiogriseum*+TX, *Penicillium billai* (Jumpstart®+TX, TagTeam®)+TX, *Penicillium brevicompactum*+TX, *Penicillium frequentans*+TX, *Penicillium griseofulvum*+TX, *Penicillium purpurogenum*+TX, *Penicillium* spp.+TX, *Penicillium viridicatum*+TX, *Phlebiopsis gigantean* (Rotstop®)+TX, phosphate solubilizing bacteria (Phosphomeal®)+TX, *Phytophthora cryptogea*+TX, *Phytophthora palmivora* (Devine®)+TX, *Pichia anomala*+TX, *Pichia guilermondii*+TX, *Pichia membranaefaciens*+TX, *Pichia onychis*+TX, *Pichia stipites*+TX, *Pseudomonas aeruginosa*+TX, *Pseudomonas aureofasciens* (Spot-Less Biofungicide®)+TX, *Pseudomonas cepacia*+TX, *Pseudomonas chlororaphis* (AtEze®)+TX, *Pseudomonas corrugate*+TX, *Pseudomonas fluorescens* strain A506 (BlightBan A506®)+TX, *Pseudomonas putida*+TX, *Pseudomonas reactans*+TX, *Pseudomonas* spp.+TX, *Pseudomonas syringae* (Bio-Save®)+TX, *Pseudomonas viridiflava*+TX, *Pseudomons fluorescens* (Zequanox®)+TX, *Pseudozyma flocculosa* strain PF-A22 UL (Sporodex L®)+TX, *Puccinia canaliculata*+TX, *Puccinia thlaspeos* (Wood Warrior®)+TX, *Pythium paroecandrum*+TX, *Pythium oligandrum* (Polygandron®+TX, Polyversum®)+TX, *Pythium periplocum*+TX, *Rhanella aquatilis*+TX, *Rhanella* spp.+TX, *Rhizobia* (Dormal®+TX, Vault®)+TX, *Rhizoctonia*+TX, *Rhodococcus globerulus* strain AQ719+TX, *Rhodosporidium diobovatum*+TX, *Rhodosporidium toruloides*+TX, *Rhodotorula* spp.+TX, *Rhodotorula glutinis*+TX, *Rhodotorula graminis*+TX, *Rhodotorula mucilagnosa*+TX, *Rhodotorula rubra*+TX, *Saccharomyces cerevisiae*+TX, *Salinococcus roseus*+TX, *Sclerotinia minor*+TX, *Sclerotinia minor* (SARRITOR®)+TX, *Scytalidium* spp.+TX, *Scytalidium uredinicola*+TX, *Spodoptera exigua* nuclear polyhedrosis virus (Spod-X®+TX, Spexit®)+TX, *Serratia marcescens*+TX, *Serratia plymuthica*+TX, *Serratia* spp.+TX, *Sordaria fimicola*+TX, *Spodoptera littoralis* nucleopolyhedrovirus (Littovir®)+TX, *Sporobolomyces roseus*+TX, *Stenotrophomonas maltophilia*+TX, *Streptomyces ahygroscopicus*+TX, *Streptomyces albaduncus*+TX, *Streptomyces exfoliates*+TX, *Streptomyces galbus*+TX, *Streptomyces griseoplanus*+TX, *Streptomyces griseoviridis* (Mycostop®)+TX, *Streptomyces lydicus* (Actinovate®)+TX, *Streptomyces lydicus* WYEC-108 (ActinoGrow®)+TX, *Streptomyces violaceus*+TX, *Tilletiopsis minor*+TX, *Tilletiopsis* spp.+TX, *Trichoderma asperellum* (T34 Biocontrol®)+TX, *Trichoderma gamsii* (Tenet®)+TX, *Trichoderma atroviride* (Plantmate®)+TX, *Trichoderma hamatum* TH 382+TX, *Trichoderma harzianum* rifai (Mycostar®)+TX, *Trichoderma harzianum* T-22 (Trianum-P®+TX, PlantShield HC®+TX, RootShield®+TX, Trianum-G®)+TX, *Trichoderma harzianum* T-39 (Trichodex®)+TX, *Trichoderma inhamatum*+TX, *Trichoderma koningii*+TX, *Trichoderma* spp. LC 52 (Sentinel®)+TX, *Trichoderma lignorum*+TX, *Trichoderma longibrachiatum*+TX, *Trichoderma polysporum* (Binab T®)+TX, *Trichoderma taxi*+TX, *Trichoderma virens*+TX, *Trichoderma virens* (formerly *Gliocladium virens* GL-21) (SoilGuard®)+TX, *Trichoderma viride*+TX, *Trichoderma viride* strain ICC 080 (Remedier®)+

TX, *Trichosporon pullulans*+TX, *Trichosporon* spp.+ TX, *Trichothecium* spp.+TX, *Trichothecium roseum*+ TX, *Typhula phacorrhiza* strain 94670+TX, *Typhula phacorrhiza* strain 94671+TX, *Ulocladium atrum*+TX, *Ulocladium oudemansii* (Botry-Zen®)+TX, *Ustilago maydis*+TX, various bacteria and supplementary micronutrients (Natural II®)+TX, various fungi (Millennium Microbes®)+TX, *Verticillium chlamydosporium*+TX, *Verticillium lecanii* (Mycotal®+TX, Vertalec®)+TX, Vip3Aa20 (VIPtera®)+TX, *Virgibacilillus marismortui*+TX, *Xanthomonas campestris* pv. *poae* (Camperico®)+TX, *Xenorhabdus bovienii*+TX, *Xenorhabdus nematophilus*; and Plant extracts including: pine oil (Retenol®)+TX, azadirachtin (Plasma Neem Oil®+TX, AzaGuard®+ TX, MeemAzal®+TX, Molt-X®+TX, Botanical IGR (Neemazad®+TX, Neemix®)+TX, canola oil (Lilly Miller Vegol®)+TX, *Chenopodium ambrosioides* near *ambrosioides* (Requiem®)+TX, *Chrysanthemum* extract (Crisant®)+TX, extract of neem oil (Trilogy®)+TX, essentials oils of Labiatae (Botania®)+TX, extracts of clove rosemary peppermint and thyme oil (Garden insect Killer®)+TX, Glycinebetaine (Greenstim®)+TX, garlic+TX, lemongrass oil (GreenMatch®)+TX, neem oil+TX, *Nepeta cataria* (Catnip oil)+TX, *Nepeta catarina*+TX, nicotine+TX, oregano oil (MossBuster®)+TX, *Pedaliaceae oil* (Nematon®)+ TX, *Pyrethrum*+TX, *Quillaja saponaria* (NemaQ®)+ TX, *Reynoutria sachalinensis* (Regalia®+TX, Sakalia®)+TX, rotenone (Eco Roten®)+TX, *rutaceae* plant extract (Soleo®)+TX, soybean oil (Ortho Ecosense®)+ TX, tea tree oil (Timorex Gold®)+TX, *Thymus* oil+TX, AGNIQUE® MMF+TX, BugOil®+TX, mixture of rosemary sesame pepermint thyme and cinnamon extracts (EF 300®)+TX, mixture of clove rosemary and peppermint extract (EF 400®)+TX, mixture of clove pepermint garlic oil and mint (Soil Shot®)+TX, kaolin (Screen®)+TX, storage glucam of brown algae (Laminarin®); and pheromones including: blackheaded fireworm pheromone (3M Sprayable Blackheaded Fireworm Pheromone®)+ TX, Codling Moth Pheromone (Paramount dispenser-(CM)/Isomate C-Plus®)+TX, Grape Berry Moth Pheromone (3M MEC-GBM Sprayable Pheromone®)+TX, Leafroller pheromone (3M MEC—LR Sprayable Pheromone®)+TX, Muscamone (Snip7 Fly Bait®+TX, Starbar Premium Fly Bait®)+TX, Oriental Fruit Moth Pheromone (3M oriental fruit moth sprayable Pheromone®)+TX, Peachtree Borer Pheromone (Isomate-P®)+TX, Tomato Pinworm Pheromone (3M Sprayable Pheromone®)+TX, Entostat powder (extract from palm tree) (Exosex CM®)+TX, (E+TX,Z+TX,Z)-3+TX,8+TX,11 Tetradecatrienyl acetate+TX, (Z+TX,Z+TX,E)-7+TX,11+TX,13-Hexadecatrienal+TX, (E+TX,Z)-7+TX,9-Dodecadien-1-yl acetate+TX, 2-Methyl-1-butanol+TX, Calcium acetate+TX, Scenturion®+TX, Biolure®+TX, Check-Mate®+TX, Lavandulyl senecioate; and Macrobials including: *Aphelinus abdominalis*+TX, *Aphidius ervi* (Aphelinus-System®)+TX, *Acerophagus papaya*+TX, *Adalia bipunctata* (Adalia-System®)+TX, *Adalia bipunctata* (Adaline®)+TX, *Adalia bipunctata* (Aphidalia®)+TX, *Ageniaspis citricola*+TX, *Ageniaspis fuscicollis*+TX, *Amblyseius andersoni* (Anderline®+TX, Andersoni-System®)+TX, *Amblyseius californicus* (Amblyline®+TX, Spical®)+TX, *Amblyseius cucumeris* (Thripex®+TX, *Bugline cucumeris*®)+TX, *Amblyseius fallacis* (Fallacis®)+TX, *Amblyseius swirskii* (Bugline swirskii®+TX, Swirskii-Mite®)+TX, *Amblyseius womersleyi* (WomerMite®)+TX, *Amitus hesperidum*+ TX, *Anagrus atomus*+TX, *Anagyrus fusciventris*+TX, *Anagyrus kamali*+TX, *Anagyrus loecki*+TX, *Anagyrus pseudococci* (Citripar®)+TX, *Anicetus benefices*+TX, *Anisopteromalus calandrae*+TX, *Anthocoris nemoralis* (Anthocoris-System®)+TX, *Aphelinus abdominalis* (Apheline®+TX, Aphiline®)+TX, *Aphelinus asychis*+ TX, *Aphidius colemani* (Aphipar®)+TX, *Aphidius ervi* (Ervipar®)+TX, *Aphidius gifuensis*+TX, *Aphidius matricariae* (Aphipar-M®)+TX, *Aphidoletes aphidimyza* (Aphidend®)+TX, *Aphidoletes aphidimyza* (Aphidoline®)+TX, *Aphytis lingnanensis*+TX, *Aphytis melinus*+TX, *Aprostocetus hagenowii*+TX, *Atheta coriaria* (Staphyline®)+TX, *Bombus* spp.+TX, *Bombus terrestris* (Natupol Beehive®)+TX, *Bombus terrestris* (Beeline®+TX, Tripol®)+TX, *Cephalonomia stephanoderis*+TX, *Chilocorus nigritus*+TX, *Chrysoperla carnea* (Chrysoline®)+TX, *Chrysoperla carnea* (Chrysopa®)+TX, *Chrysoperla rufilabris*+TX, *Cirrospilus ingenuus*+TX, *Cirrospilus quadristriatus*+TX, *Citrostichus phyllocnistoides*+TX, *Closterocerus chamaeleon*+TX, *Closterocerus* spp.+TX, *Coccidoxenoides perminutus* (Planopar®)+TX, *Coccophagus cowperi*+TX, *Coccophagus lycimnia*+TX, *Cotesia flavipes*+TX, *Cotesia plutellae*+TX, *Cryptolaemus montrouzieri* (Cryptobug®+TX, Cryptoline®)+TX, *Cybocephalus nipponicus*+TX, *Dacnusa sibirica*+TX, *Dacnusa sibirica* (Minusa®)+TX, *Diglyphus isaea* (Diminex®)+TX, *Delphastus catalinae* (Delphastus®)+TX, *Delphastus pusillus*+TX, *Diachasmimorpha krausii*+TX, *Diachasmimorpha longicaudata*+TX, *Diaparsis jucunda*+TX, *Diaphorencyrtus aligarhensis*+TX, *Diglyphus isaea*+TX, *Diglyphus isaea* (Miglyphus®+TX, Digline®)+TX, *Dacnusa sibirica* (Dac-Digline®+TX, Minex®)+TX, *Diversinervus* spp.+TX, *Encarsia citrina*+TX, *Encarsia formosa* (Encarsia Max®+TX, Encarline®+TX, En-Strip®)+TX, *Eretmocerus eremicus* (Enermix®)+TX, *Encarsia guadeloupae*+TX, *Encarsia haitiensis*+TX, *Episyrphus balteatus* (Syrphidend®)+TX, *Eretmoceris siphonini*+TX, *Eretmocerus californicus*+TX, *Eretmocerus eremicus* (Ercal®+TX, Eretline e®)+TX, *Eretmocerus eremicus* (Bemimix®)+TX, *Eretmocerus hayati*+TX, *Eretmocerus mundus* (Bemipar®+TX, Eretline m®)+TX, *Eretmocerus siphonini*+TX, *Exochomus quadripustulatus*+TX, *Feltiella acarisuga* (Spidend®)+TX, *Feltiella acarisuga* (Feltiline®)+TX, *Fopius arisanus*+ TX, *Fopius ceratitivorus*+TX, Formononetin (Wirless Beehome®)+TX, *FranklinoThrips vespiformis* (Vespop®)+TX, *Galendromus occidentalis*+TX, *Goniozus legneri*+TX, *Habrobracon hebetor*+TX, *Harmonia axyridis* (HarmoBeetle®)+TX, *Heterorhabditis* spp. (Lawn Patrol®)+TX, *Heterorhabditis bacteriophora* (NemaShield HB®+TX, Nemaseek®+TX, Terranem-Nam®+TX, Terranem®+TX, Larvanem®+TX, B-Green®+TX, NemAttack®+TX, Nematop®)+TX, *Heterorhabditis megidis* (Nemasys H®+TX, BioNem H®+TX, Exhibitline Hm®+TX, Larvanem-M®)+TX, *Hippodamia convergens*+TX, *Hypoaspis aculeifer* (Aculeifer-System®+TX, Entomite-A®)+TX, *Hypoaspis miles* (Hypoline M®+TX, Entomite-M®)+TX, *Lbalia leucospoides*+TX, *Lecanoideus floccissimus*+ TX, *Lemophagus errabundus*+TX, *Leptomastidea abnormis*+TX, *Leptomastix dactylopii* (Leptopar®)+ TX, *Leptomastix epona*+TX, *Lindorus lophanthae*+

TX, *Lipolexis oregmae*+TX, *Lucilia caesar* (Natufly®)+TX, *Lysiphlebus testaceipes*+TX, *Macrolophus caliginosus* (Mirical-N®+TX, Macroline C®+TX, Mirical®)+TX, *Mesoseiulus longipes*+TX, *Metaphycus flavus*+TX, *Metaphycus lounsburyi*+TX, *Micromus angulatus* (Milacewing®)+TX, *Microterys flavus*+TX, *Muscidifurax raptorellus* and *Spalangia cameroni* (Biopar®)+TX, *Neodryinus typhlocybae*+TX, *Neoseiulus californicus*+TX, *Neoseiulus cucumeris* (THRYPEX®)+TX, *Neoseiulus fallacis*+TX, *Nesideocoris tenuis* (NesidioBug®+TX, Nesibug®)+TX, *Ophyra aenescens* (Biofly®)+TX, *Orius insidiosus* (Thripor-I®+TX, Oriline I®)+TX, *Orius laevigatus* (Thripor-L®+TX, Oriline I®)+TX, *Orius majusculus* (Oriline M®)+TX, *Orius strigicollis* (Thripor-S®)+TX, *Pauesia juniperorum*+TX, *Pediobius foveolatus*+TX, *Phasmarhabditis hermaphrodita* (Nemaslug®)+TX, *Phymastichus coffea*+TX, *Phytoseiulus macropilus*+TX, *Phytoseiulus persimilis* (Spidex®+TX, *Phytoline p*®)+TX, *Podisus maculiventris* (*Podisus*®)+TX, *Pseudacteon curvatus*+TX, *Pseudacteon obtusus*+TX, *Pseudacteon tricuspis*+TX, *Pseudaphycus maculipennis*+TX, *Pseudleptomastix mexicana*+TX, *Psyllaephagus pilosus*+TX, *Psyttalia concolor* (complex)+TX, *Quadrastichus* spp.+TX, *Rhyzobius lophanthae*+TX, *Rodolia cardinalis*+TX, *Rumina decollate*+TX, *Semielacher petiolatus*+TX, *Sitobion avenae* (Ervibank®)+TX, *Steinernema carpocapsae* (Nematac C®+TX, Millenium®+TX, BioNem C®+TX, NemAttack®+TX, Nemastar®+TX, Capsanem®)+TX, *Steinernema feltiae* (NemaShield®+TX, Nemasys F®+TX, BioNem F®+TX, *Steinernema*-System®+TX, NemAttack®+TX, Nemaplus®+TX, Exhibitline Sf®+TX, Scia-Rid®+TX, Entonem®)+TX, *Steinernema kraussei* (Nemasys L®+TX, BioNem L®+TX, Exhibitline Srb®)+TX, *Steinernema riobrave* (BioVector®+TX, BioVektor®)+TX, *Steinernema scapterisci* (Nematac S®)+TX, *Steinernema* spp.+TX, *Steinernematid* spp. (Guardian Nematodes®)+TX, *Stethorus punctillum* (*Stethorus*®)+TX, *Tamarixia radiate*+TX, *Tetrastichus setifer*+TX, *Thripobius semiluteus*+TX, *Torymus sinensis*+TX, *Trichogramma brassicae* (Tricholine B®)+TX, *Trichogramma brassicae* (Tricho-Strip®)+TX, *Trichogramma evanescens*+TX, *Trichogramma minutum*+TX, *Trichogramma ostriniae*+TX, *Trichogramma platneri*+TX, *Trichogramma pretiosum*+TX, *Xanthopimpla stemmator*; and other biologicals including: abscisic acid+TX, bioSea®+TX, *Chondrostereum purpureum* (Chontrol Paste®)+TX, *Colletotrichum gloeosporioides* (Collego®)+TX, Copper Octanoate (Cueva®)+TX, Delta traps (Trapline D®)+TX, *Erwinia amylovora* (Harpin) (ProAct®+TX, Ni-HIBIT Gold CST®)+TX, Ferri-phosphate (Ferramol®)+TX, Funnel traps (Trapline Y®)+TX, Gallex®+TX, Grower's Secret®+TX, Homo-brassonolide+TX, Iron Phosphate (Lilly Miller Worry Free Ferramol Slug & Snail Bait®)+TX, MCP hail trap (Trapline F®)+TX, *Microctonus hyperodae*+TX, *Mycoleptodiscus terrestris* (Des-X®)+TX, BioGain®+TX, Aminomite®+TX, Zenox®+TX, Pheromone trap (Thripline Ams®)+TX, potassium bicarbonate (MilStop®)+TX, potassium salts of fatty acids (Sanova®)+TX, potassium silicate solution (Sil-Matrix®)+TX, potassium iodide+potassiumthiocyanate (Enzicur®)+TX, SuffOil-X®+TX, Spider venom+TX, *Nosema locustae* (Semaspore Organic Grasshopper Control®)+TX, Sticky traps (Trapline YF®+TX, Rebell Amarillo®)+TX and Traps (Takitrapline y+B®)+TX;

or a biologically active compound or agent selected from: Brofluthrinate+TX, Diflovidazine+TX, Flometoquin+TX, Fluhexafon+TX, *Plutella xylostella* Granulosis virus+TX, *Cydia pomonella* Granulosis virus+TX, Imicyafos+TX, *Heliothis virescens* Nucleopolyhedrovirus+TX, *Heliothis punctigera* Nucleopolyhedrovirus+TX, *Helicoverpa zea* Nucleopolyhedrovirus+TX, *Spodoptera frugiperda* Nucleopolyhedrovirus+TX, *Plutella xylostella* Nucleopolyhedrovirus+TX, p-cymene+TX, Pyflubumide+TX, Pyrafluprole+TX, QRD 420+TX, QRD 452+TX, QRD 460+TX, Terpenoid blends+TX, Terpenoids+TX, Tetraniliprole+TX, and α-terpinene+TX;

or an active substance referenced by a code+TX, such as code AE 1887196 (BSC—BX60309)+TX, code NNI-0745 GR+TX, code IKI-3106+TX, code JT-L001+TX, code ZNQ-08056+TX, code IPPA152201+TX, code HNPC-A9908 (CAS: [660411-21-2])+TX, code HNPC-A2005 (CAS: [860028-12-2])+TX, code JS118+TX, code ZJ0967+TX, code ZJ2242+TX, code JS7119 (CAS: [929545-74-4])+TX, code SN-1172+TX, code HNPC-A9835+TX, code HNPC-A9955+TX, code HNPC-A3061+TX, code Chuanhua 89-1+TX, code IPP-10+TX, code ZJ3265+TX, code JS9117+TX, code ZJ3757+TX, code ZJ4042+TX, code ZJ4014+TX, code ITM-121+TX, code DPX-RAB55 (DKI-2301)+TX, code NA-89+TX, code MIE-1209+TX, code MCI-8007+TX, code BCS-CL73507+TX, code S-1871+TX, code DPX-RDS63+TX, Quinofumelin+TX, mefentrifluconazol+TX, fenpicoxamid+TX, fluindapyr+TX, inpyrfluxam+TX or indiflumetpyr+TX, isoflucypram+TX, pyrapropoyne+TX, florylpicoxamid+TX, metyltetraprole+TX, ipflufenoquin+TX, pyridachlometyl+TX or chlopyridiflu+TX, tetrachlorantraniliprole+TX, tetrachloraniliprole+TX, Tyclopyrazoflor+TX, flupyrimin+TX or pyrifluramide+TX, benzpyrimoxan+TX, Benzosufyl+TX or oxazosulfyl+TX, etpyrafen+TX, acynonapyr+TX or pyrinonafen+TX, oxotrione+TX, bixlozone+TX or clofendizone+TX or dicloroxizone+TX, cyclopyranil+TX or pyrazocyclonil+TX or cyclopyrazonil+TX, alpha-bromadiolone+TX, code AKD-1193+TX, Oxathiapiprolin+TX, Fluopyram+TX, Penflufen+TX, Fluoxopyrosad+TX, and Flupyradifurone+TX.

The references in brackets behind the active ingredients, e.g. [3878-19-1] refer to the Chemical Abstracts Registry number. The above described mixing partners are known. Where the active ingredients are included in "The Pesticide Manual" [The Pesticide Manual—A World Compendium; Thirteenth Edition; Editor: C. D. S. TomLin; The British Crop Protection Council], they are described therein under the entry number given in round brackets hereinabove for the particular compound; for example, the compound "abamectin" is described under entry number (1). Where "[CCN]" is added hereinabove to the particular compound, the compound in question is included in the "Compendium of Pesticide Common Names", which is accessible on the internet [A. Wood; Compendium of Pesticide Common Names, Copyright © 1995-2004]; for example, the compound "acetoprole" is described under the internet address http://www.alanwood.net/pesticides/acetoprole.html.

Most of the active ingredients described above are referred to hereinabove by a so-called "common name", the relevant "ISO common name" or another "common name" being used in individual cases. If the designation is not a "common name", the nature of the designation used instead is given in round brackets for the particular compound; in that case, the IUPAC name, the IUPAC/Chemical Abstracts name, a "chemical name", a "traditional name", a "compound name" or a "develoment code" is used or, if neither one of those designations nor a "common name" is used, an "alternative name" is employed. "CAS Reg. No" means the Chemical Abstracts Registry Number.

The active ingredient mixture of the compounds of formula I selected from the compounds defined in the Tables A-1 to A-15, B-1 to B-15, C-1 to C-15, D-1 to D-30, E-1 to E-15, F-1 to F-15, G-1 to G-15, H-1 to H-15, I-1 to I-15, J-1 to J-15. K-1 to K-15, L-1 to L-15 and M-1 to M-60, and Table P, with active ingredients described above comprises a compound selected from one compound defined in the Tables A-1 to A-15, B-1 to B-15, C-1 to C-15, D-1 to D-30, E-1 to E-15, F-1 to F-15, G-1 to G-15, H-1 to H-15, I-1 to I-15, J-1 to J-15. K-1 to K-15, L-1 to L-15 and M-1 to M-60, and Table P, and an active ingredient as described above preferably in a mixing ratio of from 100:1 to 1:6000, especially from 50:1 to 1:50, more especially in a ratio of from 20:1 to 1:20, even more especially from 10:1 to 1:10, very especially from 5:1 and 1:5, special preference being given to a ratio of from 2:1 to 1:2, and a ratio of from 4:1 to 2:1 being likewise preferred, above all in a ratio of 1:1, or 5:1, or 5:2, or 5:3, or 5:4, or 4:1, or 4:2, or 4:3, or 3:1, or 3:2, or 2:1, or 1:5, or 2:5, or 3:5, or 4:5, or 1:4, or 2:4, or 3:4, or 1:3, or 2:3, or 1:2, or 1:600, or 1:300, or 1:150, or 1:35, or 2:35, or 4:35, or 1:75, or 2:75, or 4:75, or 1:6000, or 1:3000, or 1:1500, or 1:350, or 2:350, or 4:350, or 1:750, or 2:750, or 4:750. Those mixing ratios are by weight.

The mixtures as described above can be used in a method for controlling pests, which comprises applying a composition comprising a mixture as described above to the pests or their environment, with the exception of a method for treatment of the human or animal body by surgery or therapy and diagnostic methods practised on the human or animal body.

The mixtures comprising a compound of formula I selected from the compounds defined in the Tables A-1 to A-15, B-1 to B-15, C-1 to C-15, D-1 to D-30, E-1 to E-15, F-1 to F-15, G-1 to G-15, H-1 to H-15, I-1 to I-15, J-1 to J-15. K-1 to K-15, L-1 to L-15 and M-1 to M-60, and Table P, and one or more active ingredients as described above can be applied, for example, in a single "ready-mix" form, in a combined spray mixture composed from separate formulations of the single active ingredient components, such as a "tank-mix", and in a combined use of the single active ingredients when applied in a sequential manner, i.e. one after the other with a reasonably short period, such as a few hours or days. The order of applying the compounds of formula I and the active ingredients as described above is not essential for working the present invention.

The compositions according to the invention can also comprise further solid or liquid auxiliaries, such as stabilizers, for example unepoxidized or epoxidized vegetable oils (for example epoxidized coconut oil, rapeseed oil or soya oil), antifoams, for example silicone oil, preservatives, viscosity regulators, binders and/or tackifiers, fertilizers or other active ingredients for achieving specific effects, for example bactericides, fungicides, nematocides, plant activators, molluscicides or herbicides.

The compositions according to the invention are prepared in a manner known per se, in the absence of auxiliaries for example by grinding, screening and/or compressing a solid active ingredient and in the presence of at least one auxiliary for example by intimately mixing and/or grinding the active ingredient with the auxiliary (auxiliaries). These processes for the preparation of the compositions and the use of the compounds I for the preparation of these compositions are also a subject of the invention.

The application methods for the compositions, that is the methods of controlling pests of the abovementioned type, such as spraying, atomizing, dusting, brushing on, dressing, scattering or pouring—which are to be selected to suit the intended aims of the prevailing circumstances—and the use of the compositions for controlling pests of the abovementioned type are other subjects of the invention. Typical rates of concentration are between 0.1 and 1000 ppm, preferably between 0.1 and 500 ppm, of active ingredient. The rate of application per hectare is generally 1 to 2000 g of active ingredient per hectare, in particular 10 to 1000 g/ha, preferably 10 to 600 g/ha.

A preferred method of application in the field of crop protection is application to the foliage of the plants (foliar application), it being possible to select frequency and rate of application to match the danger of infestation with the pest in question. Alternatively, the active ingredient can reach the plants via the root system (systemic action), by drenching the locus of the plants with a liquid composition or by incorporating the active ingredient in solid form into the locus of the plants, for example into the soil, for example in the form of granules (soil application). In the case of paddy rice crops, such granules can be metered into the flooded paddy-field.

The compounds of formula I of the invention and compositions thereof are also be suitable for the protection of plant propagation material, for example seeds, such as fruit, tubers or kernels, or nursery plants, against pests of the abovementioned type. The propagation material can be treated with the compound prior to planting, for example seed can be treated prior to sowing. Alternatively, the compound can be applied to seed kernels (coating), either by soaking the kernels in a liquid composition or by applying a layer of a solid composition. It is also possible to apply the compositions when the propagation material is planted to the site of application, for example into the seed furrow during drilling. These treatment methods for plant propagation material and the plant propagation material thus treated are further subjects of the invention. Typical treatment rates would depend on the plant and pest/fungi to be controlled and are generally between 1 to 200 grams per 100 kg of seeds, preferably between 5 to 150 grams per 100 kg of seeds, such as between 10 to 100 grams per 100 kg of seeds.

The term seed embraces seeds and plant propagules of all kinds including but not limited to true seeds, seed pieces, suckers, corns, bulbs, fruit, tubers, grains, rhizomes, cuttings, cut shoots and the like and means in a preferred embodiment true seeds.

The present invention also comprises seeds coated or treated with or containing a compound of formula I. The term "coated or treated with and/or containing" generally signifies that the active ingredient is for the most part on the surface of the seed at the time of application, although a greater or lesser part of the ingredient may penetrate into the seed material, depending on the method of application. When the said seed product is (re)planted, it may absorb the active ingredient. In an embodiment, the present invention makes available a plant propagation material adhered thereto with a compound of formula I. Further, it is hereby made available, a composition comprising a plant propagation material treated with a compound of formula I.

Seed treatment comprises all suitable seed treatment techniques known in the art, such as seed dressing, seed coating, seed dusting, seed soaking and seed pelleting. The seed treatment application of the compound formula I can be carried out by any known methods, such as spraying or by dusting the seeds before sowing or during the sowing/planting of the seeds.

The compounds of the invention can be distinguished from other similar compounds by virtue of greater efficacy at low application rates and/or different pest control, which can be verified by the person skilled in the art using the experimental procedures, using lower concentrations if necessary, for example 10 ppm, 5 ppm, 2 ppm, 1 ppm or 0.2 ppm; or lower application rates, such as 300, 200 or 100, mg of AI per $m^2$. The greater efficacy can be observed by an increased safety profile (against non-target organisms above and below ground (such as fish, birds and bees), improved physico-chemical properties, or increased biodegradability).

In each aspect and embodiment of the invention, "consisting essentially" and inflections thereof are a preferred embodiment of "comprising" and its inflections, and "consisting of" and inflections thereof are a preferred embodiment of "consisting essentially of" and its inflections.

The disclosure in the present application makes available each and every combination of embodiments disclosed herein.

BIOLOGICAL EXAMPLES

The Examples which follow serve to illustrate the invention. Certain compounds of the invention can be distinguished from known compounds by virtue of greater efficacy at low application rates, which can be verified by the person skilled in the art using the experimental procedures outlined in the Examples, using lower application rates if necessary, for example 50 ppm, 24 ppm, 12.5 ppm, 6 ppm, 3 ppm, 1.5 ppm, 0.8 ppm or 0.2 ppm.

Example B1: *Diabrotica balteata* (Corn Root Worm)

Maize sprouts placed onto an agar layer in 24-well microtiter plates were treated with aqueous test solutions prepared from 10'000 ppm DMSO stock solutions by spraying. After drying, the plates were infested with L2 larvae (6 to 10 per well). The samples were assessed for mortality and growth inhibition in comparison to untreated samples 4 days after infestation.

The following compounds gave an effect of at least 80% control in at least one of the two categories (mortality or growth inhibition) at an application rate of 200 ppm: P1, P3, P5, P6, P7, P9, P11, P12, P13, P15, P16, P18, P19, P20, P21, P22, P23, P24, P25 and P33.

Example B2: *Euschistus heros* (Neotropical Brown Stink Bug)

Soybean leaves on agar in 24-well microtiter plates were sprayed with aqueous test solutions prepared from 10'000 ppm DMSO stock solutions. After drying the leaves were infested with N2 nymphs. The samples were assessed for mortality and growth inhibition in comparison to untreated samples 5 days after infestation.

The following compounds gave an effect of at least 80% control in at least one of the two categories (mortality or growth inhibition) at an application rate of 200 ppm: P5, P12, P14, P15, P16, P17, P20, P21, P22 and P23.

Example B3: *Frankliniella occidentalis* (Western Flower *Thrips*) Feeding/Contact Activity Sunflower leaf discs were placed on agar in 24-well microtiter plates and sprayed with aqueous test solutions prepared from 10'000 DMSO stock solutions. After drying the leaf discs were infested with a *Frankliniella* population of mixed ages. The samples were assessed for mortality 7 days after infestation.

The following compounds resulted in at least 80% mortality at an application rate of 200 ppm: P19.

Example B4: *Chilo suppressalis* (Striped Rice Stemborer)

24-well microtiter plates with artificial diet were treated with aqueous test solutions prepared from 10'000 ppm DMSO stock solutions by pipetting. After drying, the plates were infested with L2 larvae (6-8 per well). The samples were assessed for mortality, anti-feeding effect, and growth inhibition in comparison to untreated samples 6 days after infestation. Control of *Chilo suppressalis* by a test sample is given when at least one of the categories mortality, anti-feedant effect, and growth inhibition is higher than the untreated sample.

The following compounds resulted in at least 80% control in at least one of the three categories (mortality, anti-feedant effect or growth inhibition) at an application rate of 200 ppm: P5, P12, P13, P14, P15, P16, P17, P18, P19, P20, P21, P22, P23, P24, P32, P33 and P36.

Example B5: *Plutella xylostella* (Diamond Back Moth)

24-well microtiter plates with artificial diet were treated with aqueous test solutions prepared from 10'000 ppm DMSO stock solutions by pipetting. After drying, *Plutella* eggs were pipetted through a plastic stencil onto a gel blotting paper and the plate was closed with it. The samples were assessed for mortality and growth inhibition in comparison to untreated samples 8 days after infestation.

The following compounds gave an effect of at least 80% control in at least one of the two categories (mortality or growth inhibition) at an application rate of 200 ppm: P2, P3, P5, P6, P7, P8, P9, P10, P11, P12, P13, P14, P15, P16, P17, P19, P20, P21, P22, P23, P24, P25, P26, P27, P32, P33 and P35.

Example B6: *Myzus persicae* (Green Peach Aphid) Feeding/Contact Activity

Sunflower leaf discs were placed onto agar in a 24-well microtiter plate and sprayed with aqueous test solutions prepared from 10'000 ppm DMSO stock solutions. After drying, the leaf discs were infested with an aphid population of mixed ages. The samples were assessed for mortality 6 days after infestation.

The following compounds resulted in at least 80% mortality at an application rate of 200 ppm: P23 and P24.

Example B7: *Myzus persicae* (Green Peach Aphid) Systemic Activity

Roots of pea seedlings infested with an aphid population of mixed ages were placed directly into aqueous test solutions prepared from 10'000 DMSO stock solutions. The samples were assessed for mortality 6 days after placing seedlings into test solutions.

The following compounds resulted in at least 80% mortality at a test rate of 24 ppm: P14, P22 and P23.

Example B8: *Myzus persicae* (Green Peach Aphid). Intrinsic Activity

Test compounds prepared from 10'000 ppm DMSO stock solutions were applied by pipette into 24-well microtiter plates and mixed with sucrose solution. The plates were closed with a stretched Parafilm. A plastic stencil with 24 holes was placed onto the plate and infested pea seedlings were placed directly on the Parafilm. The infested plate was closed with a gel blotting paper and another plastic stencil and then turned upside down. The samples were assessed for mortality 5 days after infestation.

The following compounds resulted in at least 80% mortality at a test rate of 12 ppm: P5, P12, P14, P15, P16, P17, P19, P20, P21, P22, P23 and P24.

Example B9: *Spodoptera littoralis* (Egyptian Cotton Leaf Worm)

Cotton leaf discs were placed onto agar in 24-well microtiter plates and sprayed with aqueous test solutions prepared from 10'000 DMSO stock solutions. After drying the leaf discs were infested with five L1 larvae. The samples were assessed for mortality, anti-feeding effect, and growth inhibition in comparison to untreated samples 3 days after infestation. Control of *Spodoptera littoralis* by a test sample is given when at least one of the categories mortality, anti-feedant effect, and growth inhibition is higher than the untreated sample.

The following compounds resulted in at least 80% control in at least one of the three categories (mortality, anti-feedant effect or growth inhibition) at an application rate of 200 ppm: P3, P5, P7, P9, P10, P11, P12, P13, P14, P15, P16, P17, P18, P19, P20, P21, P22, P23, P24, P25, P32 and P33.

Example B10: *Spodoptera littoralis* (Egyptian Cotton Leaf Worm)

Test compounds were applied by pipette from 10'000 ppm DMSO stock solutions into 24-well plates and mixed with agar. Lettuce seeds were placed onto the agar and the multi well plate was closed by another plate which contained also agar. After 7 days the compound was absorbed by the roots and the lettuce grew into the lid plate. The lettuce leaves were then cut off into the lid plate. *Spodoptera* eggs were pipetted through a plastic stencil onto a humid gel blotting paper and the lid plate was closed with it. The samples were assessed for mortality, anti-feedant effect and growth inhibition in comparison to untreated samples 6 days after infestation.

The following compounds gave an effect of at least 80% control in at least one of the three categories (mortality, anti-feeding, or growth inhibition) at a test rate of 12.5 ppm: P14, P16, P20, P21, P22 and P23.

Example B11: *Tetranychus urticae* (Two-Spotted Spider Mite): Feeding/Contact Activity Bean leaf discs on agar in 24-well microtiter plates were sprayed with aqueous test solutions prepared from 10'000 ppm DMSO stock solutions. After drying the leaf discs were infested with a mite population of mixed ages. The samples were assessed for mortality on mixed population (mobile stages) 8 days after infestation.

The following compounds resulted in at least 80% mortality at an application rate of 200 ppm: P18, P23 and P24.

Example B12: *Thrips tabaci* (Onion *Thrips*) Feeding/Contact Activity

Sunflower leaf discs were placed on agar in 24-well microtiter plates and sprayed with aqueous test solutions prepared from 10'000 ppm DMSO stock solutions. After drying the leaf discs were infested with a *Thrips* population of mixed ages. The samples were assessed for mortality 6 days after infestation.

The following compounds resulted in at least 80% mortality at an application rate of 200 ppm: P5.

Example B13: *Myzus persicae* (Green Peach Aphid)

Test compounds prepared from 10'000 ppm DMSO stock solutions were applied by a liquid handling robot into 96-well microtiter plates and mixed with a sucrose solution. Parafilm was stretched over the 96-well microtiter plate and a plastic stencil with 96 holes was placed onto the plate. Aphids were sieved into the wells directly onto the Parafilm. The infested plates were closed with a gel blotting card and a second plastic stencil and then turned upside down. The samples were assessed for mortality 5 days after infestation.

The following compounds resulted in at least 80% mortality at an application rate of 50 ppm: P5, P14, P15, P16, P17, P18, P19, P20, P21, P22, P23, P24 and P25.

Example B14: *Plutella xylostella* (Diamondback Moth)

96-well microtiter plates containing artificial diet were treated with aqueous test solutions, prepared from 10'000 ppm DMSO stock solutions, by a liquid handling robot. After drying, eggs (~30 per well) were infested onto a netted lid which was suspended above the diet. The eggs hatch and L1 larvae move down to the diet. The samples were assessed for mortality 9 days after infestation.

The following compounds gave an effect of at least 80% average mortality at an application rate of 500 ppm: P1, P2, P3, P5, P6, P7, P8, P9, P10, P11, P14, P15, P16, P17, P18, P19, P20, P21, P22, P23, P25, P26, P27 and P28.

The invention claimed is:

1. A compound of the formula I

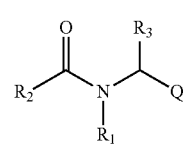

wherein:

Q is

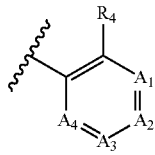

$A_1$, $A_2$, $A_3$ and $A_4$ are independently $CR_5$ or N, provided not more than three of $A_1$, $A_2$, $A_3$ and $A_4$ are N;

$R_1$ is hydrogen, $C_1$-$C_6$alkyl, $C_1$-$C_6$cyanoalkyl, aminocarbonyl$C_1$-$C_6$alkyl, hydroxycarbonyl$C_1$-$C_6$alkyl, $C_1$-$C_6$nitroalkyl, trimethylsilane$C_1$-$C_6$alkyl, $C_1$-$C_6$haloalkyl, $C_2$-$C_6$alkenyl, $C_2$-$C_6$haloalkenyl, $C_2$-$C_6$alkynyl, $C_2$-$C_6$haloalkynyl; $C_3$-$C_4$cycloalkyl$C_1$-$C_2$alkyl- wherein the $C_3$-$C_4$cycloalkyl is optionally substituted with 1 or 2 halo atoms; oxetan-3-yl-$CH_2$—; or benzyl optionally substituted with halo or $C_1$-$C_6$haloalkyl;

$R_2$ is phenyl, pyridine, pyrimidine, pyrazine or pyridazine, wherein the phenyl, pyridine, pyrimidine, pyrazine or pyridazine is optionally substituted with one to three substituents, provided the substituent(s) are not on either carbon adjacent to the carbon C═O is attached, and each substituent is independently selected from: $C_1$-$C_3$alkyl, $C_1$-$C_3$haloalkyl, $C_1$-$C_3$thiohaloalkyl, $C_1$-$C_3$alkoxy, $C_1$-$C_3$haloalkoxy, halogen, $NO_2$, $SF_5$, CN, $CONH_2$, COOH and C(S) $NH_2$;

$R_3$ is $C_1$-$C_3$alkyl or $C_1$-$C_3$haloalkyl;

$R_4$ is pyridine, pyrimidine, pyrazine or pyridazine, wherein the pyridine, pyrimidine, pyrazine or pyridazine is optionally substituted with one to three substituents, independently selected, from $C_1$-$C_3$alkyl, $C_1$-$C_3$haloalkyl, $C_1$-$C_3$alkoxy, $C_3$-$C_4$cycloalkyl, halogen or hydroxy;

$R_5$ is hydrogen, halogen, CN, $C_1$-$C_3$alkyl, $C_1$-$C_3$haloalkyl, $C_3$-$C_4$cycloalkyl, $C_1$-$C_3$alkoxy, $C_1$-$C_3$haloalkoxy, $C_1$-$C_3$alkoxycarbonyl, or di($C_1$-$C_3$alkoxy) methane; with the proviso that $R_4$ is not pyridin-3-yl, if $A_1$, $A_2$, $A_3$ and $A_4$ are all CH; or a stereoisomer, enantiomer, tautomer and N-oxide of the compound of formula I, or agrochemically acceptable salt thereof.

2. The compound according to claim 1, wherein $R_3$ is methyl.

3. The compound according to claim 1, wherein $R_1$ is hydrogen; $C_1$-$C_6$alkyl optionally substituted with one substituent selected from: CN, $CONH_2$, COOH, $NO_2$, and —Si$(CH_3)_3$; $C_1$-$C_6$haloalkyl; $C_2$-$C_6$alkenyl; $C_2$-$C_6$alkynyl; $C_2$-$C_6$haloalkynyl; $C_3$-$C_4$cycloalkyl-$C_1$-$C_2$alkyl- wherein the $C_3$-$C_4$cycloalkyl- is optionally substituted with 1 or 2 halo atoms; oxetan-3-yl-$CH_2$—; or benzyl optionally substituted with halo or $C_1$-$C_3$haloalkyl.

4. The compound according to claim 1, wherein $R_2$ is one of $Z_1$ to $Z_{10}$

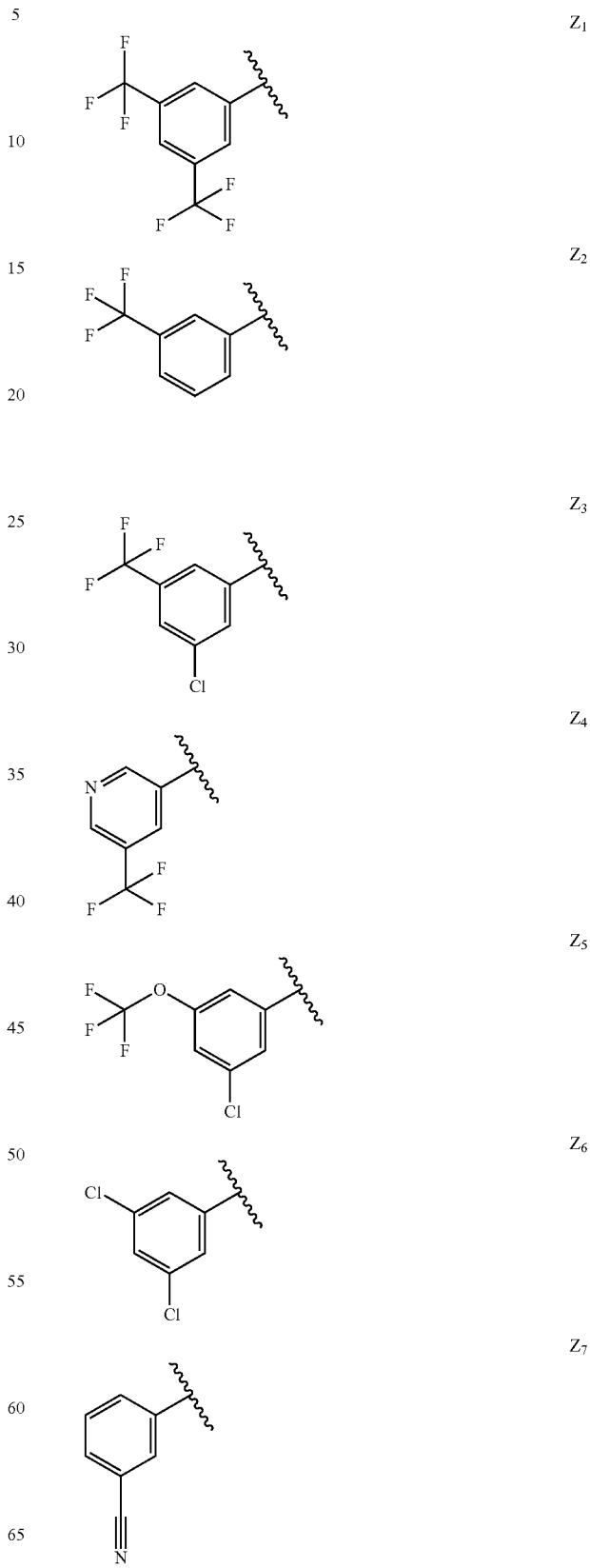

-continued

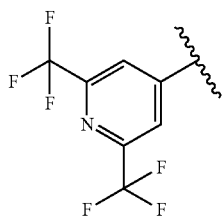

$Z_8$

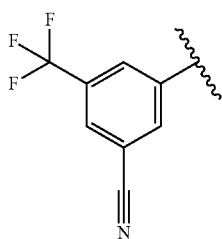

$Z_9$

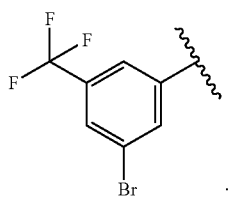

$Z_{10}$

5. The compound according to claim 1, wherein Q is selected from Q-1 to Q-12

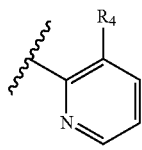
Q-1

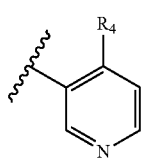
Q-2

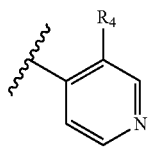
Q-3

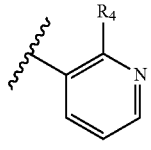
Q-4

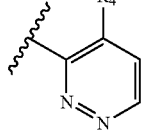
Q-5

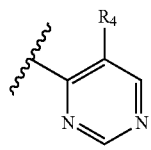
Q-6

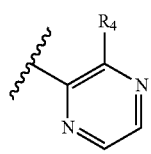
Q-7

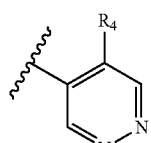
Q-8

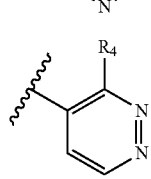
Q-9

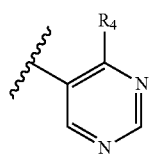
Q10

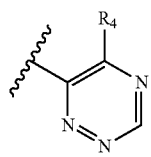
Q-11

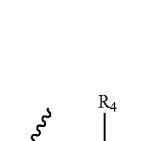
Q-12

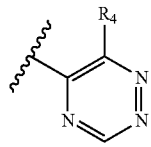

wherein $R_4$ is pyridine, pyrimidine, pyrazine or pyridazine, wherein the pyridine, pyrimidine, pyrazine or pyridazine is optionally substituted with one to three substituents, independently selected, from $C_1$-$C_3$alkyl, $C_1$-$C_3$haloalkyl, $C_1$-$C_3$alkoxy, $C_3$-$C_4$cycloalkyl, halogen and hydroxyl.

6. The compound according to claim 1, wherein $R_4$ is 2-pyridine or 2-pyrimidine optionally substituted by a substituent from halogen and $C_1$-$C_3$alkoxy.

7. The compound according to claim 1, wherein $R_1$ is cyclopropyl-$CH_2$—, $CH\equiv CCH_2$—, hydrogen, or Me.

8. The compound according to claim 2, wherein $R_2$ is one of $Z_1$ to $Z_{10}$
$Z_1$
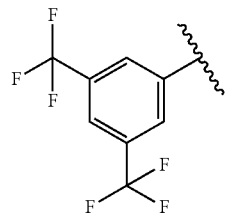
$Z_2$
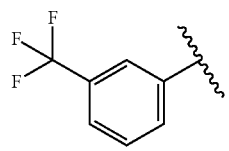
$Z_3$
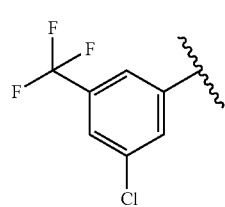
$Z_4$
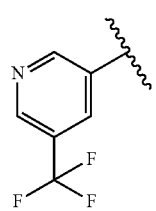
$Z_5$
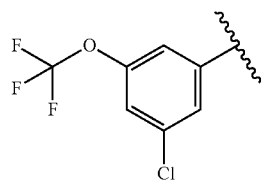
$Z_6$
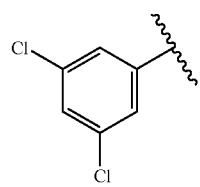
$Z_7$
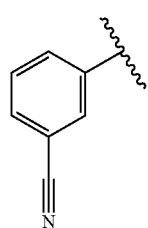
-continued
$Z_8$
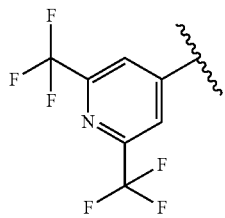
$Z_9$
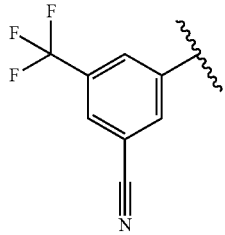
$Z_{10}$
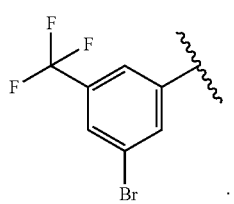
9. The compound according to claim 3, wherein $R_2$ is one of $Z_1$ to $Z_{10}$
$Z_1$
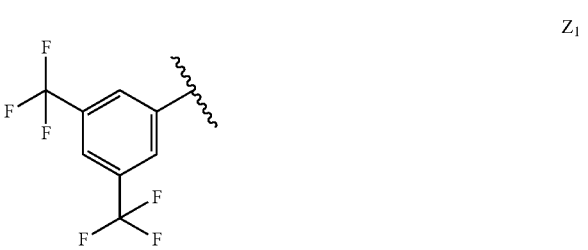
$Z_2$
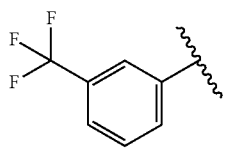
$Z_3$
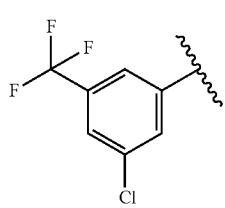
$Z_4$
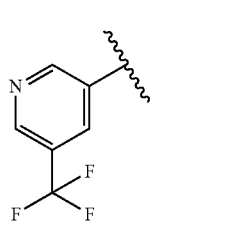

-continued
Z5
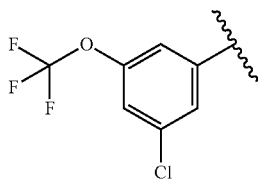
Z6
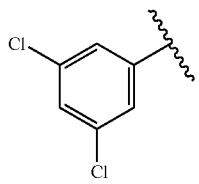
Z7
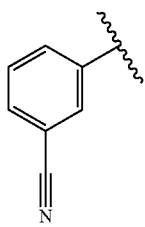
Z8
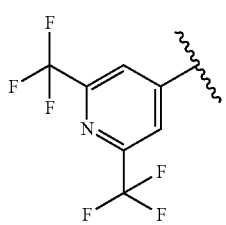
Z9
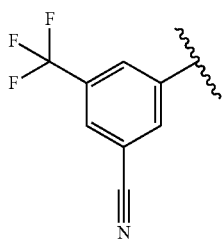
Z10
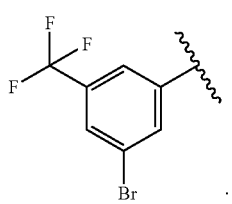
10. The compound according to claim 2, wherein Q is selected from Q-1 to Q-12
Q-1
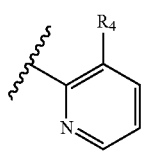
-continued
Q-2
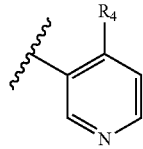
Q-3
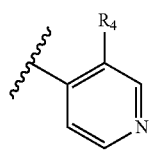
Q-4
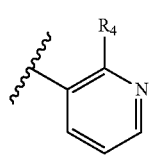
Q-5
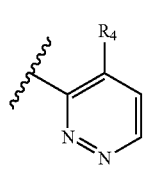
Q-6
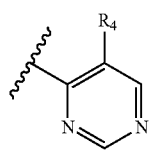
Q-7
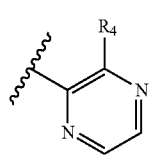
Q-8
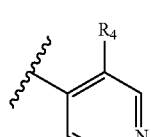
Q-9
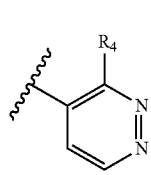
Q10
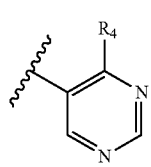
Q-11
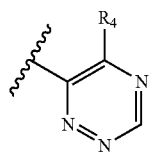

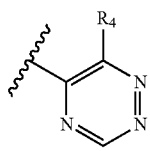
Q-12 wherein $R_4$ is pyridine, pyrimidine, pyrazine or pyridazine, wherein the pyridine, pyrimidine, pyrazine or pyridazine is optionally substituted with one to three substituents, independently selected, from $C_1$-$C_3$alkyl, $C_1$-$C_3$haloalkyl, $C_1$-$C_3$alkoxy, $C_3$-$C_4$cycloalkyl, halogen or hydroxyl.

11. The compound according to claim 3, wherein Q is selected from Q-1 to Q-12

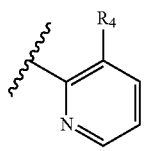
Q-1

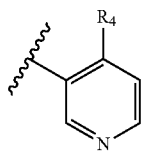
Q-2

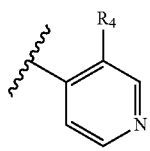
Q-3

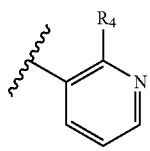
Q-4

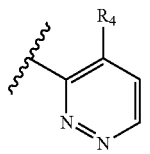
Q-5

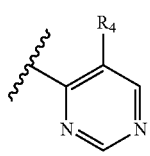
Q-6

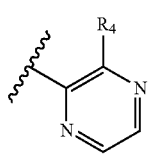
Q-7

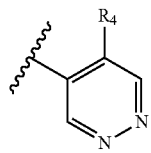
Q-8

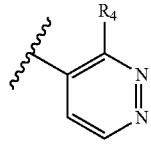
Q-9

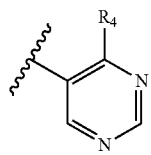
Q10

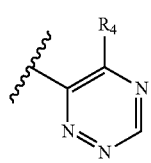
Q-11

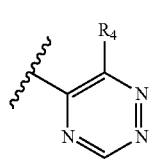
Q-12 wherein $R_4$ is pyridine, pyrimidine, pyrazine or pyridazine, wherein the pyridine, pyrimidine, pyrazine or pyridazine is optionally substituted with one to three substituents, independently selected, from $C_1$-$C_3$alkyl, $C_1$-$C_3$haloalkyl, $C_1$-$C_3$alkoxy, $C_3$-$C_4$cycloalkyl, halogen or hydroxyl.

12. The compound according to claim 4, wherein Q is selected from Q-1 to Q-12

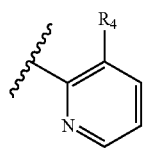
Q-1

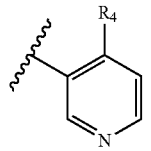
Q-2

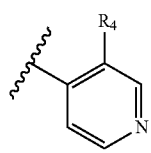
Q-3

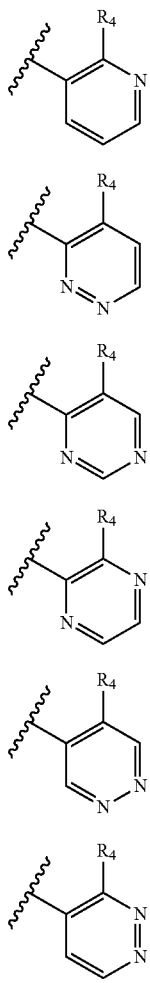

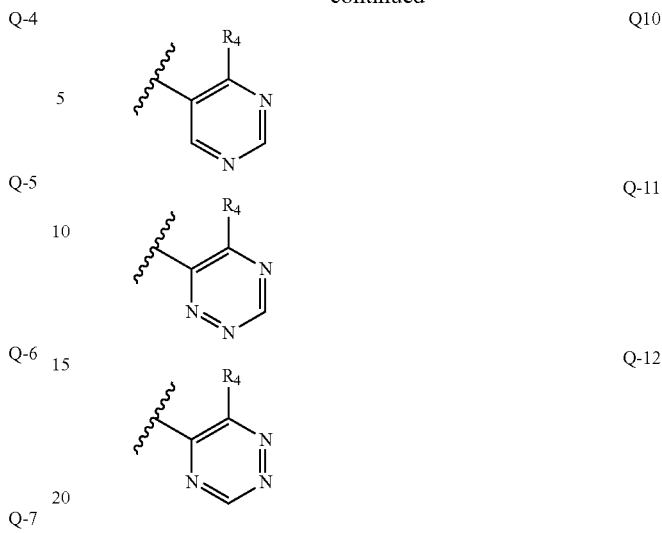

wherein R₄ is pyridine, pyrimidine, pyrazine or pyridazine, wherein the pyridine, pyrimidine, pyrazine or pyridazine is optionally substituted with one to three substituents, independently selected, from $C_1$-$C_3$alkyl, $C_1$-$C_3$haloalkyl, $C_1$-$C_3$alkoxy, $C_3$-$C_4$cycloalkyl, halogen or hydroxyl.

13. A composition comprising a compound as defined in claim 1, one or more auxiliaries and diluent, and optionally one more other active ingredient.

14. A plant propagation material, comprising, or treated with or adhered thereto, a compound as defined in claim 1.

15. A method of combating and controlling insects, acarines, nematodes or molluscs which comprises applying to a pest, to a locus of a pest, or to a plant susceptible to attack by a pest an insecticidally, acaricidally, nematicidally or molluscicidally effective amount of a compound as defined in claim 1.

* * * * *